(12) United States Patent
Fu et al.

(10) Patent No.: US 10,183,458 B2
(45) Date of Patent: Jan. 22, 2019

(54) INSULATED PACKAGING AND METHOD OF MAKING SAME

(71) Applicant: LBP Manufacturing LLC, Cicero, IL (US)

(72) Inventors: Thomas Z. Fu, Naperville, IL (US); Matthew R. Cook, Oak Brook, IL (US); Earle R. Ellis, Bolingbrook, IL (US)

(73) Assignee: LBP Manufacturing LLC, Cicero, IL (US)

( * ) Notice: Subject to any disclaimer, the term of this patent is extended or adjusted under 35 U.S.C. 154(b) by 0 days.

(21) Appl. No.: 15/662,990

(22) Filed: Jul. 28, 2017

(65) Prior Publication Data

US 2017/0326830 A1    Nov. 16, 2017

Related U.S. Application Data

(63) Continuation of application No. 13/944,556, filed on Jul. 17, 2013, now abandoned, which is a
(Continued)

(51) Int. Cl.
*B31B 50/00* (2017.01)
*B31B 70/62* (2017.01)
(Continued)

(52) U.S. Cl.
CPC .......... *B31B 70/62* (2017.08); *B29C 35/0805* (2013.01); *B29C 44/1228* (2013.01); *B29C 44/445* (2013.01); *B31B 50/00* (2017.08); *B31B 50/04* (2017.08); *B31B 50/28* (2017.08); *B31B 50/81* (2017.08); *B31B 50/88* (2017.08); *B31B 70/64* (2017.08); *B31B 70/74* (2017.08); *B31B 70/79* (2017.08); *B65D 81/3823* (2013.01); *B65D 81/3869* (2013.01);
(Continued)

(58) Field of Classification Search
CPC ............ B29C 35/0805; B29C 44/1228; B29C 44/445
See application file for complete search history.

(56) References Cited

U.S. PATENT DOCUMENTS

| | | |
|---|---|---|
| 1,295,300 A | 2/1919 | Galibert |
| 2,556,740 A | 6/1951 | Polsen et al. |

(Continued)

FOREIGN PATENT DOCUMENTS

| | | |
|---|---|---|
| CA | 2647912 A1 | 11/2007 |
| CA | 2766553 A1 | 12/2010 |

(Continued)

*Primary Examiner* — Daniel McNally
(74) *Attorney, Agent, or Firm* — Fitch, Even, Tabin & Flannery LLP

(57) ABSTRACT

Insulated packaging is provided including an inner substrate and an outer substrate attached to the inner substrate to form an air gap therebetween. An expandable material including expandable microspheres is provided with the expandable material disposed between the inner substrate and the outer substrate. An adhesive material different than the expandable material is disposed between the inner substrate and the outer substrate to attach the inner substrate to the outer substrate. A method for forming the insulated packaging is also provided.

19 Claims, 43 Drawing Sheets

Related U.S. Application Data continuation-in-part of application No. 13/532,489, filed on Jun. 25, 2012, now Pat. No. 9,522,772, which is a continuation-in-part of application No. 12/490,121, filed on Jun. 23, 2009, now Pat. No. 9,648,969, which is a continuation-in-part of application No. 11/728,973, filed on Mar. 27, 2007, now Pat. No. 9,056,712, application No. 15/662,990, filed on Jul. 28, 2017, which is a continuation-in-part of application No. 15/160,035, filed on May 20, 2016, which is a continuation of application No. 14/739,804, filed on Jun. 15, 2015, now Pat. No. 9,580,228, which is a continuation of application No. 11/728,973, filed on Mar. 27, 2007, now Pat. No. 9,056,712.

(60) Provisional application No. 61/674,110, filed on Jul. 20, 2012, provisional application No. 60/789,297, filed on Apr. 3, 2006.

(51) Int. Cl.
  B65D 81/38 (2006.01)
  B29C 44/12 (2006.01)
  B29C 44/44 (2006.01)
  B29C 35/08 (2006.01)
  B31B 50/04 (2017.01)
  B31B 50/28 (2017.01)
  B31B 50/88 (2017.01)
  B31B 50/81 (2017.01)
  B31B 70/64 (2017.01)
  B31B 70/74 (2017.01)
  B29K 105/16 (2006.01)
  B05B 13/02 (2006.01)
  B31B 105/00 (2017.01)
  B31B 50/74 (2017.01)

(52) U.S. Cl.
  CPC ...... *B65D 81/3874* (2013.01); *B05B 13/0242* (2013.01); *B29C 2035/0855* (2013.01); *B29K 2105/165* (2013.01); *B31B 50/745* (2017.08); *B31B 50/756* (2017.08); *B31B 2105/00* (2017.08); *B31B 2105/0022* (2017.08)

(56) References Cited

U.S. PATENT DOCUMENTS

| | | | |
|---|---|---|---|
| 2,661,889 A | 12/1953 | Phinney | |
| 2,853,222 A | 9/1958 | Gallagher | |
| 2,998,501 A * | 8/1961 | Edberg | B29C 35/14 156/379.6 |
| 3,037,897 A | 6/1962 | Pelley | |
| 3,237,834 A | 3/1966 | Davis | |
| 3,537,929 A | 11/1970 | Keith et al. | |
| 3,555,232 A | 1/1971 | Bleackley | |
| 3,715,551 A | 2/1973 | Peterson | |
| 3,749,874 A | 7/1973 | Edgar | |
| 3,756,452 A | 9/1973 | Buhayar et al. | |
| 3,813,801 A | 6/1974 | Schaaf | |
| 3,843,860 A | 10/1974 | Jory et al. | |
| 3,988,521 A | 10/1976 | Fumel | |
| 4,261,501 A | 4/1981 | Watkins | |
| 4,435,344 A | 3/1984 | Iioka | |
| 4,483,889 A * | 11/1984 | Andersson | B32B 5/18 427/389.9 |
| 4,783,287 A | 11/1988 | Eichberger et al. | |
| 5,145,107 A | 9/1992 | Silver | |
| 5,249,736 A | 10/1993 | Eisman | |
| 5,326,019 A | 7/1994 | Wolff | |
| 5,385,260 A | 1/1995 | Gatcomb | |
| 5,431,333 A | 7/1995 | Lorenz | |
| 5,490,631 A | 2/1996 | Iioka et al. | |
| 5,542,599 A | 8/1996 | Sobol | |
| 5,685,480 A | 11/1997 | Choi | |
| 5,697,550 A | 12/1997 | Varano | |
| 5,705,238 A * | 1/1998 | Andersen | C08L 1/28 206/524.3 |
| 5,775,577 A | 7/1998 | Titus | |
| 5,826,786 A | 10/1998 | Dickert | |
| 5,834,744 A | 11/1998 | Risman | |
| 5,908,152 A | 6/1999 | Tullis | |
| 5,950,917 A | 9/1999 | Smith | |
| 5,952,068 A | 9/1999 | Neale | |
| 5,993,705 A * | 11/1999 | Grishchenko | B29C 44/12 264/134 |
| 6,027,018 A | 2/2000 | Yocum | |
| 6,039,682 A | 3/2000 | Dees | |
| 6,152,363 A | 11/2000 | Rule, Jr. | |
| 6,182,890 B1 | 2/2001 | Sattler | |
| 6,186,394 B1 | 2/2001 | Dees | |
| 6,224,954 B1 | 5/2001 | Mitchell | |
| 6,257,485 B1 | 7/2001 | Sadlier | |
| 6,265,040 B1 * | 7/2001 | Neale | B65D 81/3823 229/403 |
| 6,267,837 B1 | 7/2001 | Mitchell | |
| 6,277,454 B1 | 8/2001 | Neale | |
| 6,287,247 B1 | 9/2001 | Dees | |
| 6,287,410 B1 | 9/2001 | Klemarewski | |
| 6,437,303 B1 | 8/2002 | Dorr et al. | |
| 6,536,657 B2 | 3/2003 | VanHandel | |
| 6,586,075 B1 | 7/2003 | Mitchell | |
| 6,729,534 B2 | 5/2004 | VanHandel | |
| 6,787,245 B1 | 9/2004 | Hayes | |
| 6,802,938 B2 | 10/2004 | Mohan | |
| 6,811,843 B2 | 11/2004 | DeBraal | |
| 6,913,433 B2 | 7/2005 | Riesterer et al. | |
| 6,919,111 B2 | 7/2005 | Swoboda | |
| 6,926,197 B2 | 8/2005 | Hed | |
| 7,002,122 B2 | 2/2006 | Eves, II et al. | |
| 7,026,588 B2 | 4/2006 | Delmotte et al. | |
| 7,074,466 B2 | 7/2006 | DeBraal | |
| 7,281,650 B1 | 10/2007 | Milan | |
| 7,451,911 B2 | 11/2008 | Stepanek, Jr. | |
| 7,464,856 B2 | 12/2008 | VanHandel | |
| 7,464,857 B2 | 12/2008 | VanHandel | |
| 7,470,876 B2 | 12/2008 | Drozd | |
| 7,597,246 B2 | 10/2009 | Stepanek, Jr. | |
| 7,600,669 B2 | 10/2009 | VanHandel | |
| 7,614,993 B2 | 11/2009 | VanHandel | |
| 8,529,723 B2 | 9/2013 | Fu et al. | |
| 8,747,603 B2 | 6/2014 | Huang | |
| 9,056,712 B2 | 6/2015 | Cook et al. | |
| 9,522,772 B2 | 12/2016 | Fu et al. | |
| 9,580,228 B2 | 2/2017 | Fu et al. | |
| 9,580,629 B2 | 2/2017 | Huang | |
| 9,591,937 B2 | 3/2017 | Fu et al. | |
| 2002/0068139 A1 * | 6/2002 | Polak | B32B 5/18 428/36.5 |
| 2002/0071947 A1 | 6/2002 | Soane | |
| 2002/0172784 A1 | 11/2002 | DeBraal et al. | |
| 2002/0172818 A1 | 11/2002 | DeBraal | |
| 2002/0182347 A1 | 12/2002 | DeBraal | |
| 2003/0003251 A1 | 1/2003 | DeBraal | |
| 2004/0011801 A1 | 1/2004 | Rodriguez | |
| 2005/0003122 A1 | 1/2005 | Debraal | |
| 2005/0230405 A1 | 10/2005 | Dix | |
| 2005/0236468 A1 | 10/2005 | Sadlier | |
| 2006/0131316 A1 | 6/2006 | Bresler | |
| 2006/0144915 A1 | 7/2006 | Sadlier | |
| 2006/0196923 A1 | 9/2006 | Tedford | |
| 2007/0017440 A1 | 1/2007 | Tang et al. | |
| 2007/0029036 A1 | 2/2007 | Fort | |
| 2007/0090116 A1 | 4/2007 | Xue Bin | |
| 2007/0098962 A1 | 5/2007 | Laprade | |
| 2008/0023538 A1 | 1/2008 | Robertson | |
| 2008/0078825 A1 | 4/2008 | Puls et al. | |
| 2008/0087677 A1 | 4/2008 | Robertson | |
| 2008/0121681 A1 | 5/2008 | Wiedmeyer | |
| 2008/0251487 A1 | 10/2008 | Semersky et al. | |
| 2009/0121007 A1 | 5/2009 | VanHandel | |
| 2009/0214837 A1 | 8/2009 | Albenice | |

(56) References Cited

U.S. PATENT DOCUMENTS

| | | |
|---|---|---|
| 2009/0272736 A1 | 11/2009 | Cole |
| 2009/0294520 A1 | 12/2009 | Stepanek |
| 2009/0321508 A1 | 12/2009 | Fu |
| 2010/0015374 A1 | 1/2010 | Fulwiler |
| 2010/0032474 A1 | 2/2010 | Burton |
| 2010/0044424 A1 | 2/2010 | VanHandel |
| 2010/0196610 A1 | 8/2010 | Chang et al. |
| 2011/0081509 A1 | 4/2011 | Chang |
| 2012/0048450 A1 | 3/2012 | Fu et al. |
| 2012/0092091 A1 | 4/2012 | Kang |
| 2013/0303351 A1 | 11/2013 | Fu et al. |
| 2014/0087109 A1 | 3/2014 | Huang |
| 2015/0174791 A1 | 6/2015 | Dauphin |
| 2017/0130399 A1 | 5/2017 | Huang |

FOREIGN PATENT DOCUMENTS

| | | |
|---|---|---|
| CN | 201062138 | 5/2008 |
| DE | 2043418 A1 | 3/1972 |
| EP | 0818305 A2 | 1/1998 |
| EP | 2025629 | 2/2009 |
| FR | 2516447 A1 | 5/1983 |
| FR | 2865476 A1 | 7/2005 |
| GB | 1116349 A | 6/1968 |
| GB | 2463881 A | 3/2010 |
| JP | 45000274 | 1/1970 |
| JP | 48004632 | 2/1973 |
| JP | S536183 A | 1/1978 |
| JP | H0699967 | 4/1994 |
| JP | H08175576 | 7/1996 |
| JP | H09328124 A | 12/1997 |
| JP | 2000302178 A | 10/2000 |
| JP | 2002173182 A | 6/2002 |
| JP | 2003154589 A | 5/2003 |
| JP | 2003155077 A | 5/2003 |
| JP | 2003531928 A | 10/2003 |
| JP | 2005119733 A | 5/2005 |
| JP | 2005517078 A | 6/2005 |
| JP | 2007056080 A | 3/2007 |
| JP | 2008127029 A | 6/2008 |
| JP | 2009132400 | 6/2009 |
| JP | 2009184721 | 8/2009 |
| JP | 2009221327 | 10/2009 |
| KR | 20110123720 A | 11/2011 |
| TW | 215666 | 11/1993 |
| WO | 2000006637 A1 | 2/2000 |
| WO | 2000015405 A1 | 3/2000 |
| WO | 0211967 A1 | 2/2002 |
| WO | 2004113613 A1 | 12/2004 |
| WO | 2005102847 A1 | 11/2005 |
| WO | 2006113403 A2 | 10/2006 |
| WO | 2007018899 A2 | 2/2007 |
| WO | 2007027712 A1 | 3/2007 |
| WO | 2007126783 A1 | 11/2007 |
| WO | 2008124193 A1 | 10/2008 |
| WO | 2010039466 A2 | 4/2010 |
| WO | 2010151456 A1 | 12/2010 |
| WO | 2012033998 A2 | 3/2012 |
| ZA | 9900835 | 2/1999 |

\* cited by examiner

INSULATED PACKAGING AND METHOD OF MAKING SAME

CROSS-REFERENCE TO RELATED APPLICATIONS

This application is a continuation application of U.S. patent application Ser. No. 13/944,556, filed Jul. 17, 2013, and titled "MICROWAVE HEATING OF HEAT-EXPANDABLE MATERIALS FOR MAKING PACKAGING SUBSTRATES AND PRODUCTS," which claims the benefit under 35 U.S.C. § 119(e) of U.S. Provisional patent application No. 61/674,110, filed Jul. 20, 2012. U.S. patent application Ser. No. 13/944,556 further claims priority as a continuation-in-part (CIP) of U.S. patent application Ser. No. 13/532,489, filed Jun. 25, 2012, and titled "INSULATING PACKAGING," which is a CIP of U.S. patent application Ser. No. 12/490,121, filed Jun. 23, 2009, and titled "INSULATING PACKAGING," which is a CIP of U.S. patent application Ser. No. 11/728,973, filed Mar. 27, 2007, and titled "THERMALLY ACTIVATABLE INSULATING PACKAGING," which claims priority to U.S. Provisional patent application No. 60/789,297, filed Apr. 3, 2006, and titled "TEMPERATURE ACTIVATABLE INSULATING PACKAGING." This application also is a CIP of U.S. patent application Ser. No. 15/160,035, filed May 20, 2016, and titled "THERMALLY ACTIVATABLE INSULATING PACKAGING," which is a continuation of U.S. patent application Ser. No. 14/739,804, filed Jun. 15, 2015, and titled "THERMALLY ACTIVATABLE INSULATING PACKAGING," which is a continuation of U.S. patent application Ser. No. 11/728,973, filed Mar. 27, 2007, and titled "THERMALLY ACTIVATABLE INSULATING PACKAGING," which claims priority to U.S. Provisional patent application No. 60/789,297, filed Apr. 3, 2006, and titled "TEMPERATURE ACTIVATABLE INSULATING PACKAGING." All of the foregoing applications are incorporated by reference in their entirety herein.

BACKGROUND

Consumers frequently purchase ready-made products, such as food and beverages, and other products, in containers made from packaging substrates in disposable containers. Thermally insulated containers may be designed for hot or cold liquids or foods, such as hot coffee, iced-tea, hamburger, sandwiches, or pizza. These containers can maintain the temperature of the liquid or food contents by reducing heat or cold transfer from the contents through the container to the consumer's hand.

BRIEF SUMMARY

To help insulate the hand of the consumer from the heat of a hot beverage, or keep the desirable temperature of the contents of a food or beverage container longer, heat-expandable adhesives and coatings have been developed by the inventors for use with packaging substrates, for example, with multilayer micro-fluted board, paper or paperboard. Such expandable adhesives and coatings can expand upon being heated over a range of certain temperatures.

A package, container, or container sleeve includes a side wall, the side wall having an inner surface and an outer surface. At least one of the inner surface or the outer surface of the side wall may include a layer of an insulating material. The layer of insulating material may be at least a partial coating of the side wall surface. The material may be adapted to be expanded to provide thermal insulation.

A clamshell container includes a bottom portion and a top portion. The bottom portion includes a bottom wall and a side wall attached to the bottom wall. The bottom wall and the side wall form a bottom recessed area. The top portion is connected with the bottom portion along a fold line. The top portion is configured to fold over at least part of the bottom portion at the fold line to form a storage area between the top portion and the bottom recessed area. The top portion and the bottom portion are constructed of a first layer and a second layer attached to the first layer by an insulating material. The insulating material includes microencapsulated particles to expand and provide thermal insulation.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead is placed upon illustrating principles. In the figures, like referenced numerals may refer to like parts throughout the different figures unless otherwise specified.

DETAILED DESCRIPTION

Figure 1:
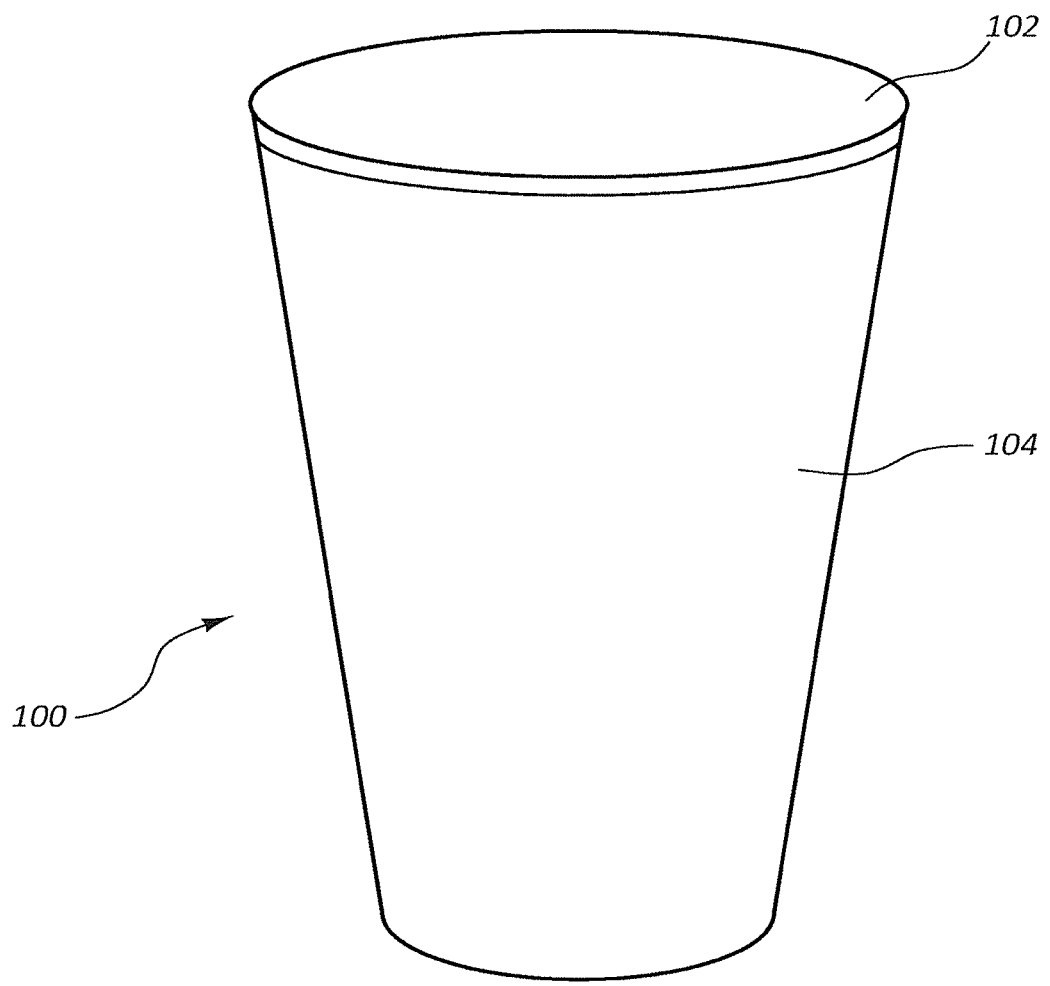
FIGS. 1 and 1A are perspective views of a cup assembled with an outer wall.
Figure 1A:
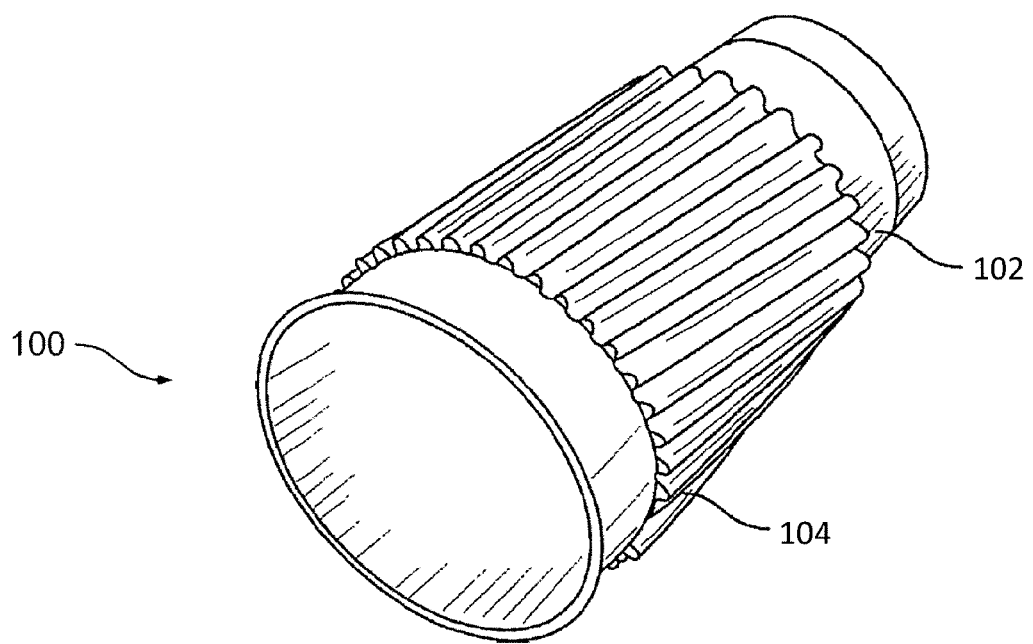

A variety of packaging and containers may be constructed of, and/or insulated with an insulating material. Examples of packaging or containers may include, for example, a clamshell carton, a box, a folding carton, a bowl or soup holder, a French fry receptacle, or various other containers or packaging. Packaging or containers may be made of or include one or more of corrugated paper, uncorrugated paper, corrugated board, uncorrugated board, solid paperboard, laminated paperboard, multilayer paper or paperboard, or various other papers, paperboards, cardboards, or other products.

The insulating material may be fixed to a die cut blank or other material component of a container or it may be applied to a removable sleeve. Insulating material, such as thermally-expandable and/or void containing additive materials may be applied to the die cut blank or other material component of a container or an outer wall or both. Insulating materials that are not expandable, or that are expanded in ways other than by temperature may also be used, for example, pressure sensitive materials, light sensitive materials, microwave sensitive materials and others. The insulating material may be expanded before reaching an end user, such as when the container and/or container sleeve are manufactured, and/or the insulating material may be expanded only on end use and only in response to, for example, temperature or pressure. The insulating material may be used to aid with insulating capabilities of the container and/or container sleeve, and/or to add rigidity to the container and/or the container sleeve, such as to reduce a thickness of the material components of container and/or container sleeve.

A method is disclosed for utilizing microwave energy to heat, activate and expand heat-expandable adhesives and coatings, which can be either onto and/or within a substrate material used to subsequently be converted to a product, or placed directly onto or within a packaging product during its manufacturing processes. The substrate material can be either monolayer or multilayer in the form of rolls, sheet or blanks made of materials such as paper, paperboard, coated paper, fluted board material, plastic film, woven material, textile, nonwoven material, and/or metalized substrates, or any combination of these materials.

The multilayer sheet or roll web substrates can be bonded together by heat-expandable adhesives and coatings. The product can be a variety of packaging or non-packaging products, for example, but not limited to, double wall paper hot cups, paper bags, clamshell, hot cup insulating sleeves, take-out folding carton and boxes. The method may include heating up the packaging products made of such materials after the products are formed, or after the products are packed in a shipping container, or after the containers are loaded onto a pallet. A microwave heater utilizes microwave energy to activate the heat-expandable adhesive or coating, causing the heat-expandable adhesive or coating to expand efficiently. The expansion of the adhesives or coating can help increase thermal insulation and rigidity of a laminated or coated material, which helps convert the materials to packages or containers, and improve the insulation of the fluid and solid contents of the containers. The expansion of the adhesives or coating can also help reduce packaging material by allowing the use of less material while maintaining the thermal insulation and rigidity required of a laminated or coated material.

The method above can be automated to activate and expand the heat-expandable adhesives and coatings on or in substrate material (or called the "pre-activation") or on or in a product after it is formed (call the "post-activation"). The heat-expandable adhesive or coating may be formulated with a composition containing heat-expandable microencapsulated particles, like microspheres or microtubes or other shapes, and other components, such as starch or other natural or synthetic binders and other additives as needed for a specific application. For example, the heat-expandable adhesive or coating may be prepared within one or a combination of: viscosity modifier, moisture modifier, defoamer, dispersants, anti-mold agents, and salts. Some examples of a microencapsulated particle include: Dualite supplied by Henkel, Expancel supplied by AkzoNobel, the Microspheres F and FN series supplied by Matsumoto, and the Microspheres supplied by Kureha.

The microwave heater may heat the material at any of various points of the manufacturing process after the application of the heat-expandable adhesive or coating. A multilayered sheet material may be laminated with any combination of suitable materials aforementioned, and conveyed to final processing, such as to be printed, die cut, formed, and/or otherwise assembled into product containers.

Heat may be applied to the material by the microwave heater at any or a combination of these manufacturing points or stages, e.g., at or between various workstations along the manufacturing process. For example, microwave heat may be applied to the substrates while being layered and laminated, after the heat-expandable adhesives or coatings have been applied. Furthermore, microwave heat may be applied to individual product containers containing unexpanded microspheres after they have been formed, e.g., during conveyance of the products to a workstation for packing the products into a shipping container.

Alternatively or in addition, microwave heat may be applied through a shipping container, e.g., a regular slotted carton into which a number of products have been packed. Further, microwave heat may be applied through a loaded pallet onto which a number of shipping containers are stacked. The heat-expandable adhesives or coatings incorporated within or layered on the substrates of the products may not be expanded (or may not be fully expanded) until application of the microwave heat at these later stages of the manufacturing process before shipping.

A package container may be constructed of and/or insulated with an insulating material. The insulating material may be made of multilayer laminated substrate(s) or a coated substrate containing a heat-expandable adhesive or coating. The heat-expandable adhesive or coating may be expanded either before or after formation of the package container from the multilayer substrate(s) by application of microwave heat. Other sources of heat or thermal energy such as hot air or infrared (IR) may also be applied in addition to the microwave heat.

The heat-expandable adhesive or coating may be applied onto the container or within a container material or between container layers, or may be applied to an outer wall of a container, or to a combination of these. The insulating material containing the heat-expandable adhesive or coating may be expanded before reaching an end user, such as when the container and/or a container sleeve are manufactured, and/or the insulating material may be expanded only at end use and only in response to, for example, some level of temperature of a hot beverage or food served within the container. The expanded insulating material may be used to aid with insulating capabilities of the container and/or the container sleeve, and/or to add rigidity to the container and/or the container sleeve, and could help reduce the thickness of the material components of the container and/or the container sleeve.

The sheet material used to make the package, container, and/or container sleeve may be manufactured on a conveyor-type machine system, in an automated assembly-line process, one example of which will be discussed in more detail later. The heat-expandable adhesive or coating may be applied by many conventional application methods, such as non-contact like spray, and/or contact-like rod, roll, nozzle or slot extrusion, pad and brush coating methods or otherwise applied onto sheet material, for example, but not limited to, onto a corrugated medium before a liner is laminated onto it. The heat-expandable adhesive or coating may thus be located between two layers of some sort of sheet material before being expanded during the manufacturing process. When the insulating material is a coating, the insulating material may be applied to a monolayer (or single) sheet or to an outside surface of or within a multilayered sheet before expansion by heat. Other embodiments are likewise possible, as discussed later, such as applying microwave heat after the formation of a multilayer substrate, or after the formation of a product, or before shipment of the containers from a warehouse to expand the expandable adhesive or coating at some other point during or after the manufacturing process.

In some embodiments, the heat-expandable adhesives/coatings are heated during a conveyor-type machine assembly process so the expansion occurs when the containers are manufactured. With conventional machine systems, the common source of heat has been by a hot air and/or infrared (IR). Conventional heating methods, such as a hot air oven and/or an infrared heater installed in-line on a machine system alone are sometimes not effective to adequately activate heat-expandable microencapsulated particles—like microspheres or microtubes that are added to the heat-expandable adhesive(s) or coatings—at production speed, typically 150 feet per minute (fpm) to 600 fpm. This is due, in part, to the space and heat power limitations and the heating mechanism of these methods primarily based on conduction, convection, and radiation with heat transfer from outside to inside of the material being heated. With these conventional sources of heating, accordingly, technical issues are exhibited in the mode of thermal energy transfer, which leads to inefficient and constrained expansion of the heat-expandable microparticles. For example, the outer part of the coating may be dried and solidify first, significantly constraining the expansion of the expandable microparticles.

It is proposed in the present disclosure to apply microwave energy from an industrial microwave heater adapted to apply microwave energy over and through the substrate material or packaging product containing the heat-expandable adhesives or coating passing through it during the process. Accordingly, the microwaves from the microwave heater can penetrate into and energize the expandable adhesive or coating inside the substrate, causing them to heat up more uniformly, volumetrically and quickly than they would from the conductive, convectional or surface radiant heat. This is due to the volumetric microwave heating of the heat-expandable adhesives/coatings in a relatively short time. For example, heat-expandable microspheres mixed into the adhesives/coatings may expand rapidly when the mixture in which the microspheres are located heats up quickly from exposure to the powerful microwave energy.

The heat-expandable adhesive or coating may contain expandable microencapsulated microparticles, like microspheres or microtubes from multiple different sources. Non-limiting examples include commercial products like Dualite, MicroPearl, and Expancel discussed earlier, and thermally expandable microtubes that may be used in formulating expandable materials.

The heat-expandable adhesives/coatings may include starch-based glues, may be synthetic or natural material-based, such as polyacrylates, polyvinyl acetates, polyvinyl alcohol, starch, polylactic acid, and other material, and may be applied to many different substrate materials, such as paper, paperboard, corrugated board, plastic films, metalized films, textile, woven or nonwoven materials and other materials from which to make laminates or coated substrates. The heat-expandable adhesives or coatings may also facilitate material reduction, reducing adverse environmental impact of packaging by reducing material while maintaining bulk and thermal insulative performance in packaging products. These laminated or coated substrates in turn can be converted into many useful food and non-food packaging products, for example, but not limited to, folding carton containers, hot and cold cups, boxes, paper clamshells, fluted sleeves, microfluted clamshells, E-fluted box, bag, and bag-in-boxes and other packaging products (referred to generally as containers). The multilayer materials with expanded material provide more flexibility for someone to expand the choices for caliber and basis weight of different substrates than what are commonly available and supplied by existing material suppliers.

These heat-expandable adhesives/coatings can be applied in conventional corrugating laminator, printing press, coater, coating applicator, or other application methods, and expanded with the assistance of an industrial microwave heater to boost efficiency and speed. The heat-expandable coatings can be applied onto paper substrates in full coverage or in pattern of any practical design, and subsequently expanded by the microwave heater to create a cellular or foamed structure in the coating layer with different end-use benefits, some of which will be explained below.

FIG. 1 illustrates a container 100, such as a cup, with an inner wall 102 and an outer wall 104. The blank for the outer wall 104 may be in the form of a container sleeve or a wall or body of a container 100. The inner wall 102 could be formed from a laminated board with expandable insulating material on the outer surface thereof. The insulating material could also be positioned between the inner wall 102 and the outer wall 104. The outer wall 104 may not be needed when the inner wall 102 coated with the insulating material includes adequate bulk and insulation. The container is not limited to a cup and may be any other container, including but not limited to, a bulk coffee container, a soup tub, press-formed containers, plate, sleeve (e.g., single face corrugated, double face corrugated, uncorrugated, cardboard, etc.), folding cartons, trays, bowls, clamshells, and others with or without covers or sleeves. The container 100 may be a cylindrical cup or a container having other geometrical configurations, including conical, rectangular, square, oval, and the like. The outer wall or die cut blank 104 is not limited to a corrugated die cut blank, and may be constructed of any kind of paperboard, paper, foil, film, fabric, foam, plastic, and etc. The outer wall 104 may be made of any nominal paper stock, including but not limited to, natural single-face, white-topped single face, coated bleached top single-face, corrugate, fluted corrugate, paperboard, coated paper, coated paperboard, or any combination of these materials any one of which may be virgin or recycled. The outer wall 104 may be removable from the container 100 or the outer wall 104 may be adhered to the container 100. The outer wall 104 may be adhered, for example, by laminating the outer wall 104 blank onto the container, using a hot melt, cold melt, glue and/or any other adhesive or sealing mechanisms. Alternatively or in addition, the outer wall 104 blank may be adhered with an insulating material, such as a microsphere material. If the outer wall 104 is attached to the cup during manufacture, it may increase efficiency by eliminating an assembly step by the commercial end-user. Further, it may decrease the amount of storage space required by the commercial end-user, e.g., storing one item such as a double or multi-wall container as opposed to two, a container and a separate insulating sleeve.

FIG. 1 is not necessarily drawn to scale. For example, the outer wall 104 may cover a larger or smaller portion of the container's 100 surface than illustrated. For example, the outer wall 104 may provide full body coverage. Increasing the surface area of the outer wall 104 may provide a larger insulated area as well as a larger print surface. Although the drawing illustrates the outer wall 104 on a cup, the outer wall 104 may be added to any other containers, such as but not limited to, a bulk beverage container, press-formed container, and soup tub. Alternatively or additionally, the outer wall 104 may be added to a container sleeve.

Figure 2:
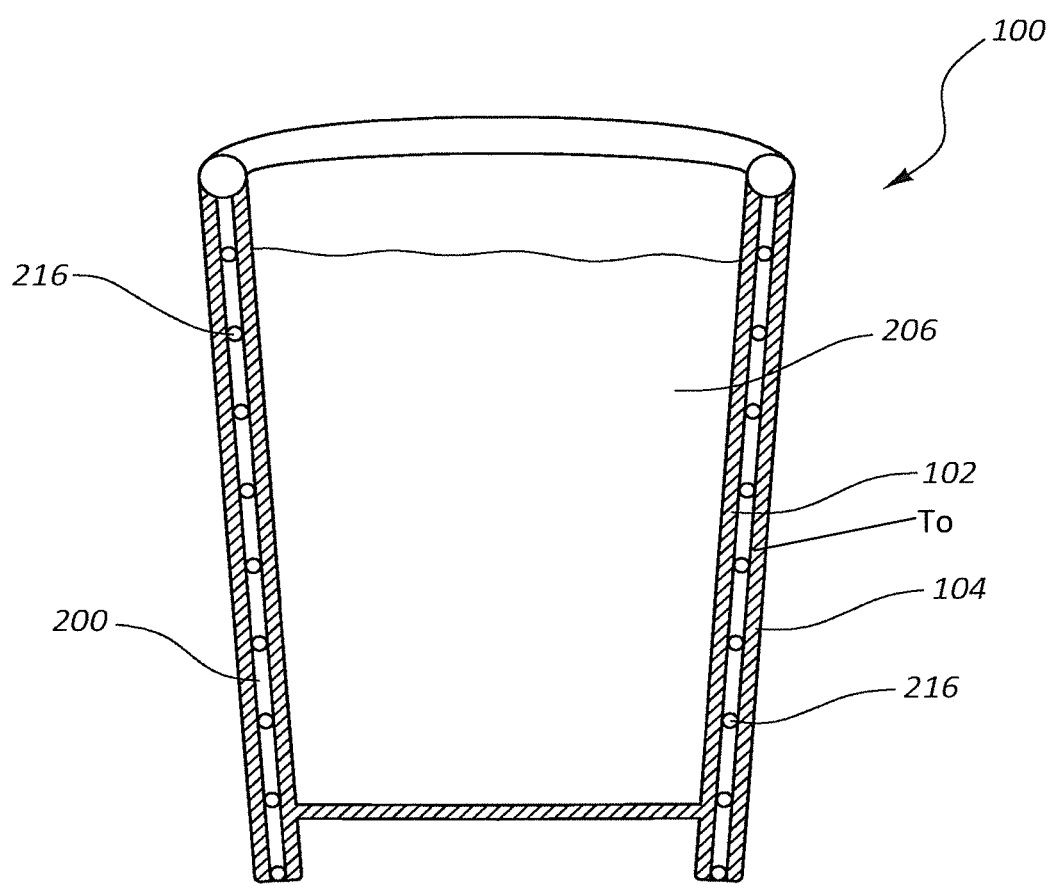
FIG. 2 is a side cutaway view of a double wall cup.

FIG. 2 is a side cutaway view of a container 100, which may be a double wall cup. The container 100 may provide a jacket of air 200 between an outer wall 104 and contents 206, such as a hot or cold beverage or food, of the container 100. The air jacket 200 may provide thermal insulation as measured by an outside surface temperature $T_O$. The air jacket 200 may partially or completely surround the container 100. When the container 100 is grabbed, a pressure exerted on the outer wall 104 may act to collapse the outer wall 104 at pressure points to reduce the air jacket 200 and potentially initiate contact with an inner wall 102 of the container 100. The air jacket 200 may collapse under pressure points and may give a sense of low rigidity, and the contact may create hot spots on the outer wall 104 if a thermally expandable coating 216 is not used.

An insulating material 216 applied between the inner wall 102 and the outer wall 104 may reduce or eliminate this effect. If a sufficient amount of insulating material 216 is used, the insulating material 216 may act to provide rigidity without compromising the thermal insulation of the air jacket 200 to the outer wall 104 such that the outer wall 104 does not collapse, completely or partially. The insulating material 216 may add mechanical strength to the container 100. Lighter weight materials may be used to produce the container 100 due to mechanical strength added by the insulating material 216, such that the source of a substrate forming the container 100 may be reduced. The insulating material 216 may be applied in spots, such as dots, or another pattern, either on the inner wall 102, the outer wall 104, or both, such that the insulating material 216 defines an air gap 200 and prevents the outer wall 104 from collapsing onto the inner wall 102 under holding pressure. The insulating material 216 may also provide a rigid feel to the user, while allowing a reduction of a substrate material, for example the inner wall 102 or outer wall 104.

As previously discussed, FIG. 2 is a side cutaway view of a container 100. The container 100 may be a double wall cup with an inner wall 102 and an outer wall 104 or a single wall cup with a laminated board (including the inner wall 102 and the outer wall 104) and an expandable insulating material 216 between two material layers such as papers. A space or air jacket 200 between the inner wall 102 and the outer wall 104 may be filled partially or wholly with the expandable insulating material, which may at least partially fill up after expansion of the insulating material from the application of heat such as from a microwave heater. The container 100 may be adapted to hold a liquid 206, whether hot or cold, as well as solid materials such as food. For cold beverage or food, the enhanced insulation of the container walls will help not only keep the beverage or food cold longer, but also reduce or eliminate moisture condensation on the outside of the container. The outer wall 104 can be joined with the inner wall 102 at the top and bottom to provide an enclosed gap in between. The insulating material 216 may expand when the unexpanded heat-expandable microspheres (or other forming agents) added in it are activated by heat after the container 100 is formed.

The insulating material 216 may expand when activated, or may be pre-expanded, for example, by the inclusion of air or inert gas, in situ air voids, microspheres, expandable microspheres or other foaming agents. The insulating material 216 may be activated by, for example, temperature, pressure, moisture, or otherwise. In one example, the insulating material 216 may be thermally-activatable, by a hot or cold temperature. The insulating material 216 may be an expandable insulating material or adhesive. Additionally or alternatively, the insulating material 216 may include but is not limited to, binder, expandable microspheres or other micro-encapsulated particles, pigment and other additives, adhesives (e.g., hot melt, pressure sensitive), inert gas foamed hot melt, aqueous coating containing heat expandable microspheres, starch-based adhesives, natural polymer adhesives, PVC, foam coatings, biodegradable glues, synthetic material, or any combination of these or other materials. The insulating material 216 may include in-situ air voids, microspheres, microparticles, fibers, expandable fibers, dissolving particles, and etc. In one example, the insulating material 216 with heat-expandable microencapsulated microspheres may include a starch composition with a few, such as one to ten percent microspheres mixed into the insulating material 216. The insulating material 216 may be biodegradable, compostable, and/or recyclable.

The insulating material 216 may be expandable when wet or semi-dry, or dry depending on different formulations. The insulating material 216 may include any synthetic or natural binder material including aqueous based materials, solvent based, high solids, or 100% solid materials. The amount of solid content is typically 20% to 80% of the material, and more preferably 40% to 70% or 30% to 60%. Other ingredients may be added to the binder and/or insulating material 216, including but not limited to, pigments or dyes, mineral or organic fillers/extenders, surfactants for dispersion, thickeners or solvents to control viscosity for optimized application, foaming agents, defoaming agents, additives like waxes or slip aids, moisturizer, salts for enhanced absorption of microwave energy, and the like. Alternatively, the binder and/or insulating material 216 may be an adhesive. The insulating material 216 may have several properties, including but not limited to thermal insulation to keep container contents hot or cold, absorption of condensation and/or liquid, and/or it may expand on contact with hot material (such as, over 150° F. or more), and may remain inactive until reaching a predetermined designed activation temperature. For example, the insulating material 216 would remain inactive at about room temperature. The insulating material 216 may be repulpable, recyclable, and/or biodegradable.

In a further example, the insulating material 216 includes a synthetic or bio-based foam formed with an inert gas such as nitrogen gas. The inert gas, such as nitrogen gas, may be injected into the insulating material 216. For example, an inert gas, such as nitrogen gas, may be injected into a hot-melt adhesive, starch-based adhesive, or natural polymer adhesive may be used. The gas may be applied onto the outer surface of the inner wall 102 before placing the outer wall 104 to give these materials foam structure, and therefore improve the mechanical and thermal insulation properties of the double wall container. The gas may be injected into the insulating material 216, for example, before it is applied to the outer wall 104, or during application to outer wall 104.

Alternatively or additionally, the insulating material 216 may be a coating or adhesive that is combined with a blowing agent or foaming agent. The blowing or foaming agent may generate a gas upon heating which may activate the insulating material 216 to assume, for example, air voids, a cellular structure, or otherwise. Alternatively, the blowing or foaming agent may be a material that decomposes to release a gas under certain conditions such as temperature or pressure. Heating may occur during filling of the container with contents 206, such as hot food or beverage. Alternatively, heating may occur from an external source—such as a microwave or water bath.

Figure 3:
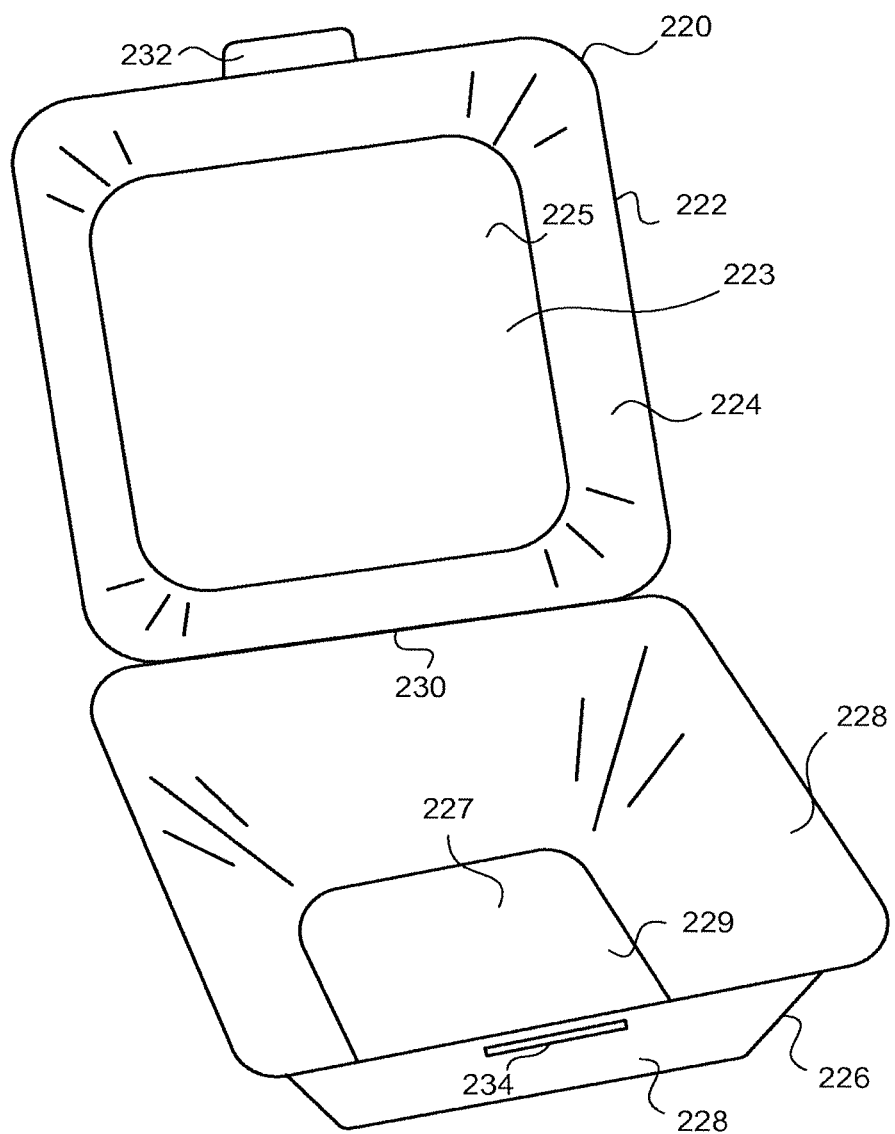
FIG. 3 is a perspective view of a container.
Figure 4:
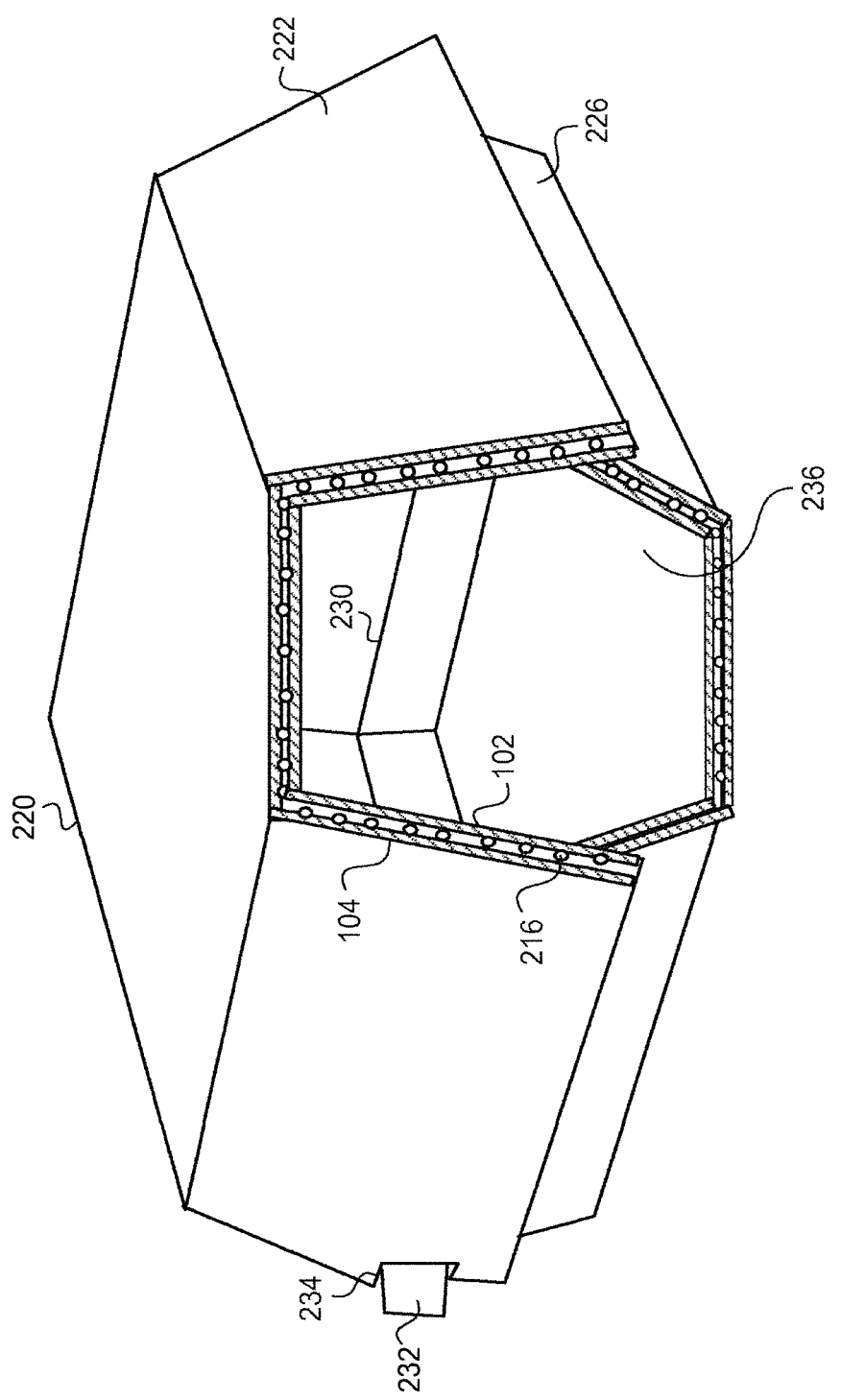
FIG. 4 is a cross-section perspective view of a container.
Figure 6:
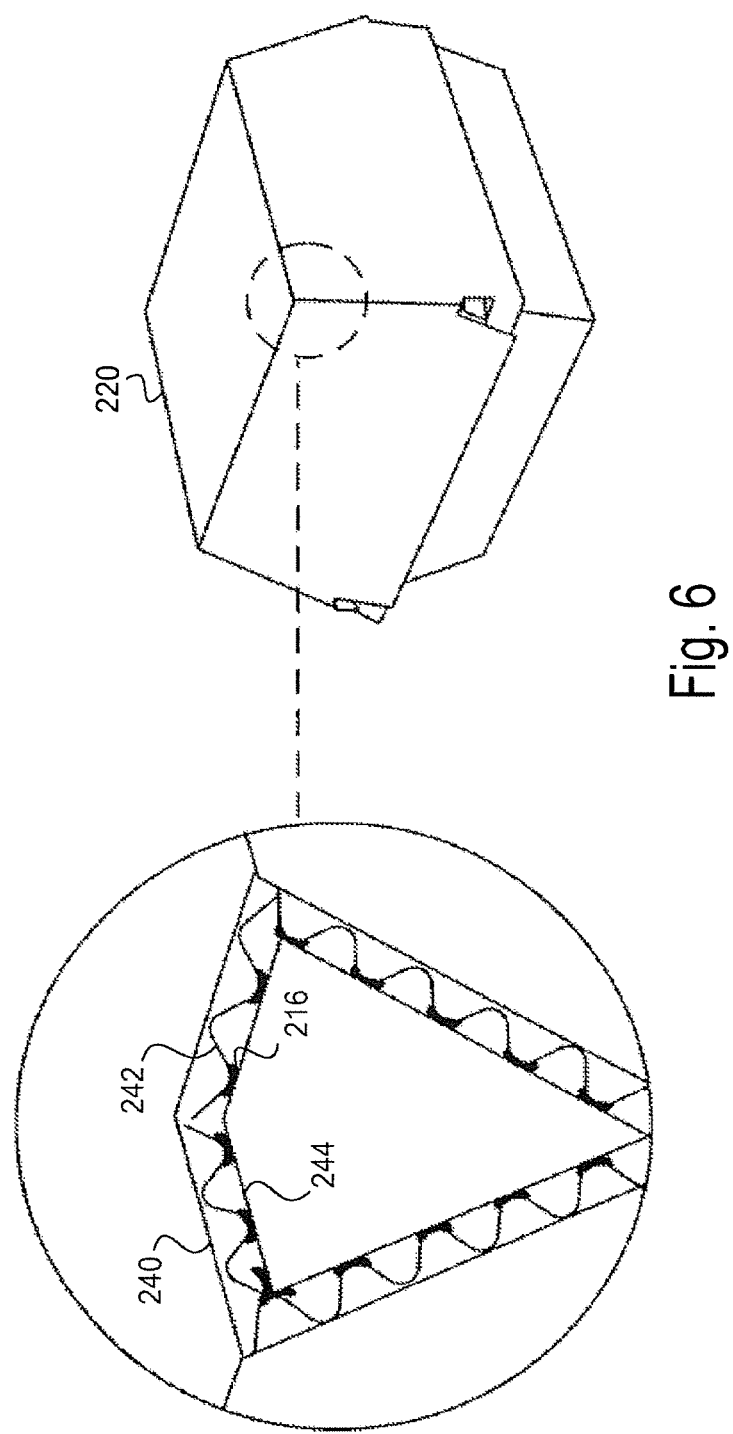
FIG. 6 is a cutaway view of a container.
Figure 7:
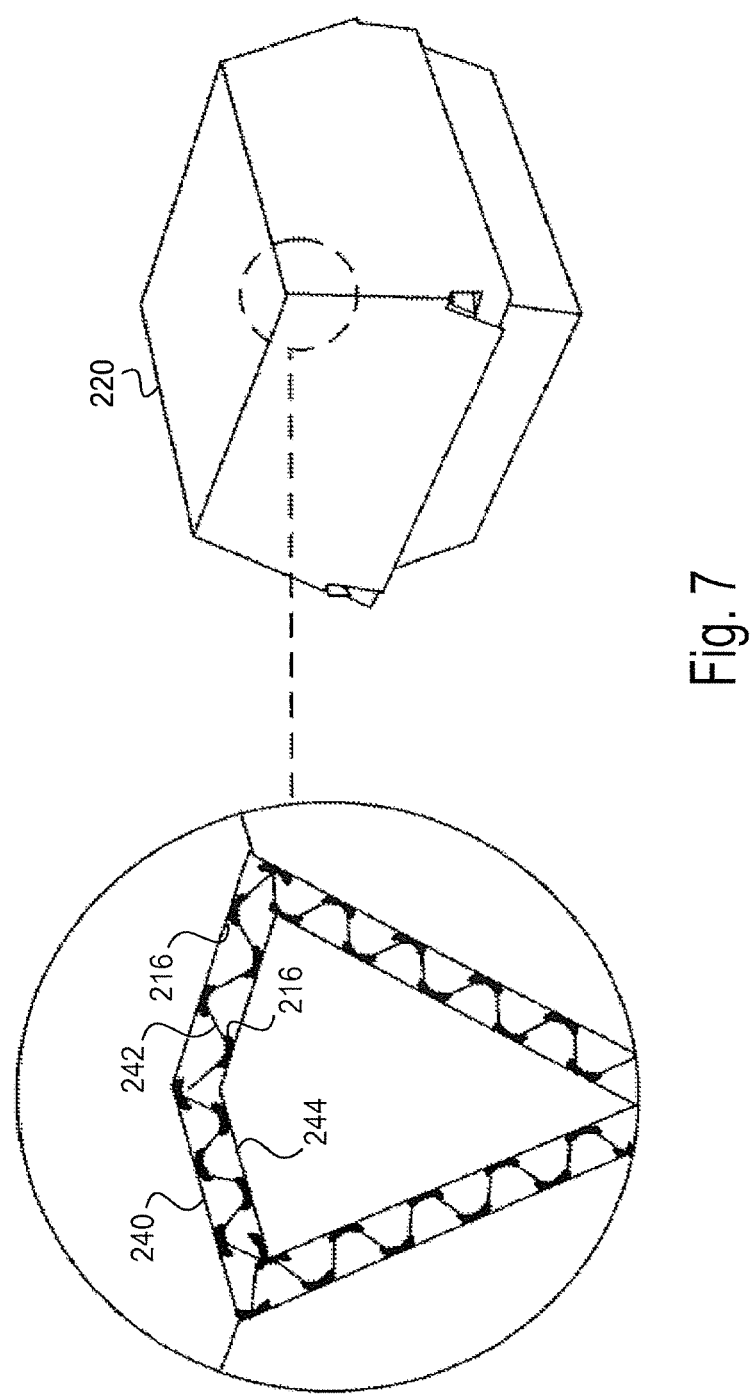
FIG. 7 is a cutaway view of a container.
Figure 8:
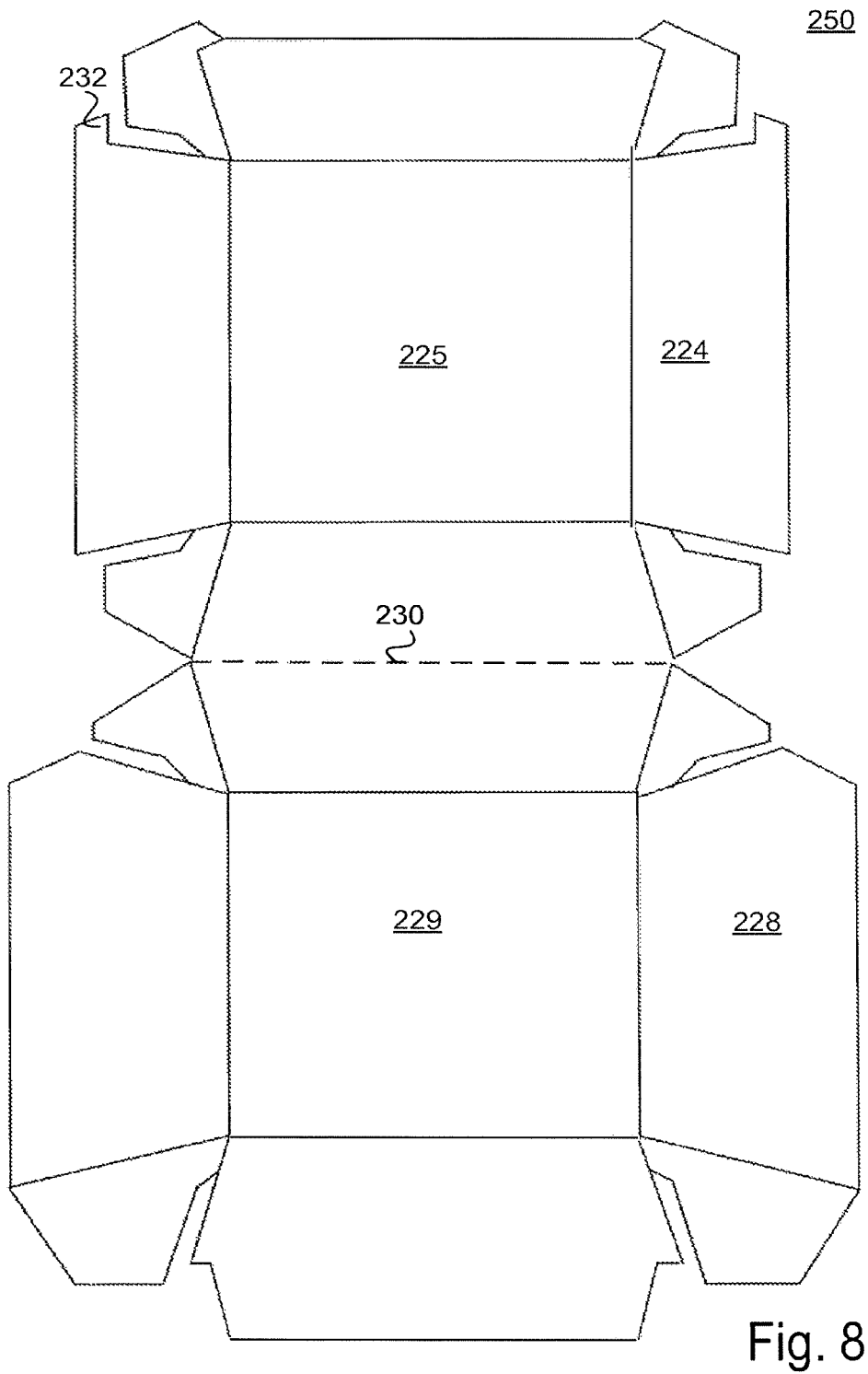
FIG. 8 is a view of a blank of a container.

FIG. 3 is a perspective diagram of an example container 220 in an open position. FIGS. 4-7 are perspective cross-section diagrams of example containers 220 in a closed position. FIG. 8 is an example of a blank 250 that may be used to create a container 220. The container 220 may be a corrugated clamshell carton or box, a foldable carton, or various other shapes.

The container 220 may be constructed from or using one or more blanks, such as blank 250. The blank 250 may be constructed of any kind of paperboard, paper, foil, film, fabric, foam, plastic, or various other materials. As an example, a blank may be made of or include one or more paperboard or paper layers, such as an inner wall 102 and an outer wall 104. The paper layer walls 102 and 104 may be or include one or more of a nominal paper stock, a natural single-face, white-topped single face, coated bleached top single face corrugated paper, double face corrugated paper, uncorrugated paper, cardboard, fluted corrugated paper or any combination of these.

Insulating material 216 may be applied between the inner wall 102 and the outer wall 104 of the container 220. The insulating material 216 may be the same or similar to the insulating material used with the cup 100. The insulating material may provide rigidity without compromising the thermal insulation of the container 220, and/or may add mechanical strength to the container 220. Lighter weight materials may be used to produce the container 220 due to mechanical strength added by the insulating material 216, such that the source of a substrate forming the container 220 may be reduced.

The insulating material 216 may expand when activated, or may be preexpanded, for example, by the inclusion of air or inert gas, in situ air voids, microspheres, expandable microspheres, thermally expandable microparticles, or other foaming agents. An inert gas, such as nitrogen gas, may be injected into the insulating material 216. The insulating material 216 may be an expandable insulating material or adhesive. Additionally or alternatively, the insulating material 216 may include but is not limited to, a binder, expandable microspheres or other microencapsulated particles, pigment and other additives, adhesives (e.g., hot melt, pressure sensitive), inert gas foamed hot melt, aqueous coating containing heat expandable microspheres, starch-based adhesives, natural polymer adhesives, PVC, foam coatings, biodegradable glues, or any combination of these or other materials.

The insulating material 216 may include in-situ air voids, microspheres, microparticles, fibers, expandable fibers, dissolving particles, and etc. The insulating material 216 may be a coating or adhesive that is combined with a blowing agent or foaming agent. The blowing or foaming agent may generate a gas upon heating which may activate the insulating material 216 to assume, for example, air voids, a cellular structure, or otherwise. Alternatively, the blowing or foaming agent may be a material that decomposes to release a gas under certain conditions such as temperature or pressure. Heating may occur during filling of the container 220 with contents, such as hot food or beverage. Alternatively, heating may occur from an external source, such as a microwave or water bath.

The insulating material 216 may be applied in various spots on the blank, such as dots, or another pattern, either on the inner wall 102, the outer wall 104, or both. For example, the insulating material 216 may be applied in a linear or other pattern between two flat or uncorrugated layers, such that that the insulating material 216 may define an air gap and prevents the outer wall 104 from collapsing onto the inner wall 102 under holding pressure. The insulating material 216 may also provide a rigid feel to the user, while allowing a reduction of a substrate material, for example the inner wall 102 or outer wall 104.

Figure 5:
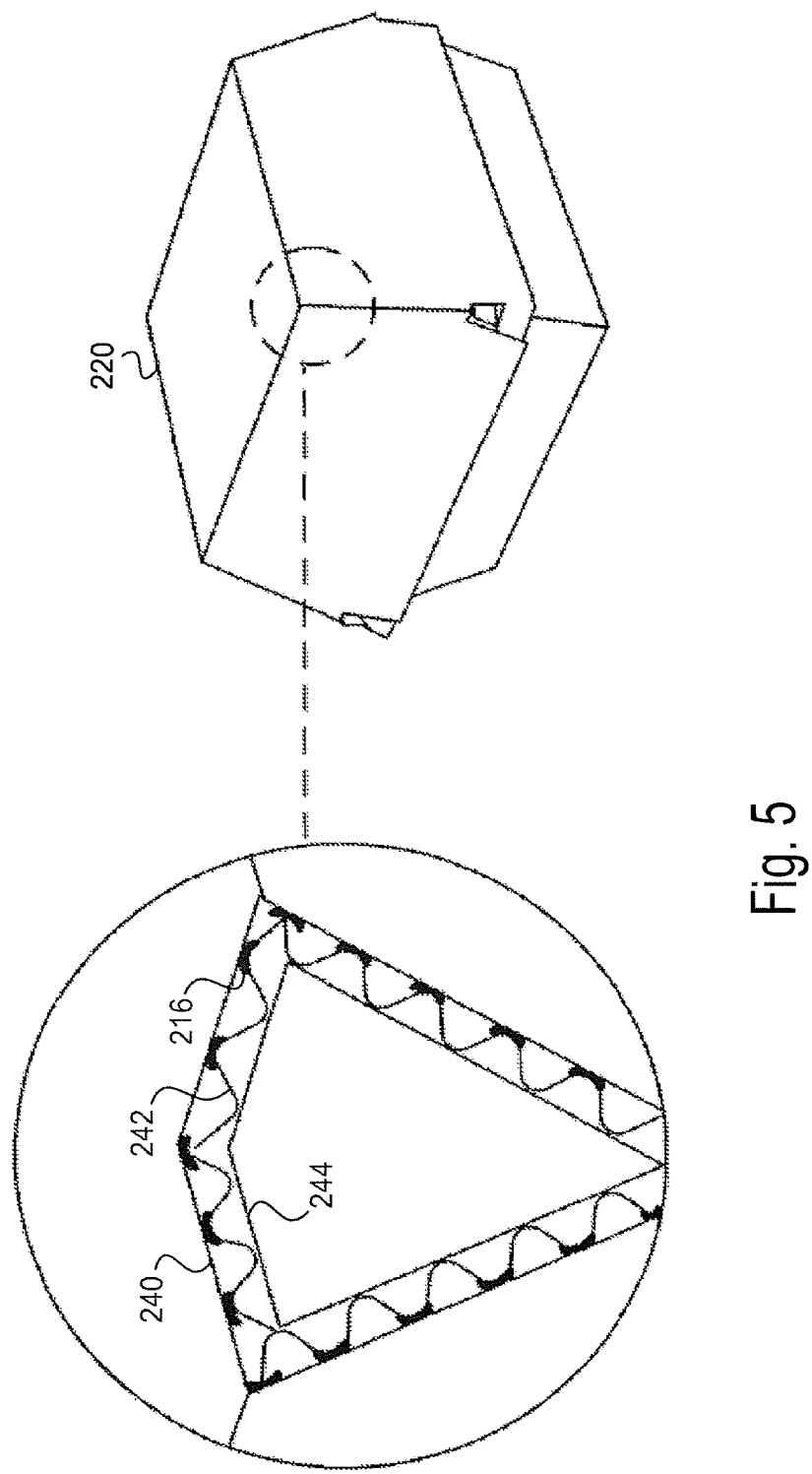
FIG. 5 is a cutaway view of a container.

The container 220 may additionally or alternatively be constructed using one or more fluted or corrugated layers, such as a fluted or corrugated layer 242. The fluted or corrugated layer 242 may be positioned next to one or more flat layers. For example, the fluted or corrugated layer 242 may be positioned between two flat layers 240 and 244. In other examples, the fluted or corrugated layer 242 may be connected with none or only one flat layer.

Where the container is constructed using one or more fluted or corrugated layers, the fluted or corrugated layers may be attached or otherwise connected to one or more flat layer using the insulating material 216. FIG. 5 shows an example container 220 with a fluted or corrugated layer 242 attached to an outer layer 240 using the insulating material 216. FIG. 6 shows an example container 220 with a fluted or corrugated layer 242 attached to an inner layer 244 using the insulating material 215. FIG. 7 shows an example container 220 with a fluted or corrugated layer 242 attached to an outer layer 240 and an inner layer 242 using the insulating material 216. The container 220 may be made of paperboard that may include a single wall microfluted board including a top liner, a bottom liner and a microfluted medium layer bonded to the top and/or bottom liners by a glue containing thermally expandable microspheres. The expandable microspheres may be expanded by heat, and once expanded, may help enhance the thermal insulation and rigidity of the board and the packaging container made of it.

The insulating material 216 may, in some examples, be applied at a point where the fluted or corrugated layer 242 contacts a flat layer, such as the outer layer 240 or the inner layer 244. The insulating material 216 may be applied to a tip, hill, or edge of the flutes or corrugations of the fluted or corrugated layer 242. The tip, hill, or edge of the flute or corrugation may be applied to the flat layer 240 or 244, and the insulating material applied to the tip, hill, or edge may bind the fluted or corrugated layer 242 to the flat layer 240 or 244. The insulating material may be heated to expand and provide insulation between a cargo area 236 and an outer layer 240 of the container 220. Other variations of construction of a blank or substrate used to make the container 220 are possible.

The container 220 may include a top portion 222 and a bottom portion 226. The top portion 222 and the bottom portion 226 may be connected, attached, or in communication with each other. The top portion 222 and the bottom portion 226 may be separated from each other, or adjoined to each other, by a hinge line or fold line 230. In some examples, the top portion 222 and the bottom portion 226 may be made of two layers of flat paperboard attached by insulating material 216, or made of multilayer paperboard, such as paperboard including a single wall microfluted board including a top liner, a bottom liner and a microfluted medium layer bonded to the top and/or bottom liners by a glue containing thermally expandable microspheres.

The top portion 222 may include a pocket, recession, cavity, or recessed area 223. The recessed area 223 may be formed by one or more side walls 224 and a top wall 225 of the top portion 222, and may be configured or capable of holding material, such as food or a liquid. The top wall 225 may be square, rectangular, or various other shapes. One or more edges of the top wall 225 may connect with one or more side walls, such as side wall 224. The side walls 224 may form a right angle, or an obtuse angle, with the top wall 225. For example, the side walls 224 may be angled, forming a concave recession or cavity in the top portion 222.

The bottom portion 226 may also or alternatively include a pocket, recession, cavity, or recessed area 227. The recessed area 227 may be formed by one or more side walls 228 and a bottom wall 229 of the bottom portion 226, and may be configured or capable of holding material, such as food or a liquid. The bottom wall 229 may be square, rectangular, or various other shapes. One or more edges of the bottom wall 229 may connect with one or more side walls, such as side wall 228. In some systems, a side wall 228 may refer to a plurality of side wall panels that may attach to edges of the bottom wall 229, such that the side wall 228 may surround the bottom wall 229. In other systems, a side wall 228 may refer to one wall of a set of side walls that may attach to or surround the bottom wall 229. Other variations are possible.

The one or more side wall 228 may form a right angle, or an obtuse angle, with the bottom wall 229. For example, side walls 228 may be angled, forming a concave recession or cavity in the bottom portion 226. The bottom wall 229 may be flat, or may include one or more ridges or dividers which may segregate one portion of the cavity 227 of the bottom portion 226 from another portion of the cavity. A portion or segment of the container 220 that includes a recessed area may be referred to as a containment portion.

The recessed areas 223 and 227 may be configured so that when the container 220 is arranged in an open position where the top portion 222 is not folded along the fold line 230, the recessed area 223 and the recessed area 227 both recess in the same direction. The recessed areas 223 and 227 may additionally or alternatively be configured such that when the container 220 is arranged in a closed position where the top portion 222 is folded along the fold line 230 over the bottom portion 226, the recessed area 223 recesses in an opposite direction of the recessed area 227. In the closed position, the recessed area 223 and the recessed area 227 may form a storage area 236 bounded by the top portion 222 and the bottom portion 226. In the closed position, the top portion 222 may operate as a cover over the bottom portion 226.

In other variations, one of the top portion 222 or the bottom portion 226 may be flat and/or may not include a recessed area. For example, the top portion 222 may only include a top wall 225 without any side walls. In some containers 220, the top portion 222 may be flat or relatively flat, and the bottom portion 226 may be a containment portion with a recessed area 227. The top portion 222 may be folded over the bottom portion 226 and may operate as a cover over the recessed area 227. Other variations are possible.

The container 220 may include one or more attachment mechanisms, such as attachment mechanism 232 and attachment mechanism 234. Attachment mechanism 232 may be connected, attached, or otherwise in communication with the top portion 222. The attachment mechanism 232 may be positioned on a side or edge (sometimes referred to as an "attachment edge") of the top portion 222 opposite the side with the fold line 230. Attachment mechanism 234 may be connected, attached, or otherwise in communication with the bottom portion 226, such as on an attachment edge of the bottom portion 226 opposite an edge with the fold line 230. The attachment mechanisms 232 and 234 may be generally centered along an edge of the top and bottom portions 222 and 226, or may be positioned in various other positions, such as at or near a corner of the top and bottom portions 222 and 226. The attachment mechanisms 232 and 234 may be positioned such that when the top portion 222 is folded over the bottom portion 226 along the fold line 230, the attachment mechanism 232 may align with or line up with the attachment mechanism 234. Various other positions are possible.

Attachment mechanisms 232 and 234 may be complimentary attachment mechanisms, such that attachment mechanism 232 may be configured to attach or connect with attachment mechanism 234 when the attachment mechanisms 232 and 234 are aligned. For example, the attachment mechanism 232 may be a tab, and the attachment mechanism 234 may be a slot configured to receive the tab 232. In other containers, the attachment mechanisms may alternatively be or include snaps, buttons, slots, tabs, hooks, fasteners, male and female fasteners or attachment devices, or various other attachment mechanisms.

When aligned and attached with each other, the attachment mechanisms 232 and 234 may secure the top portion 222 to the bottom portion 226. The top portion 222 and the bottom portion 226 may form the storage area 236. The storage area 236 may be partially or completely encased by and/or cover the top portion 222 and the bottom portion 226.

Figure 9:
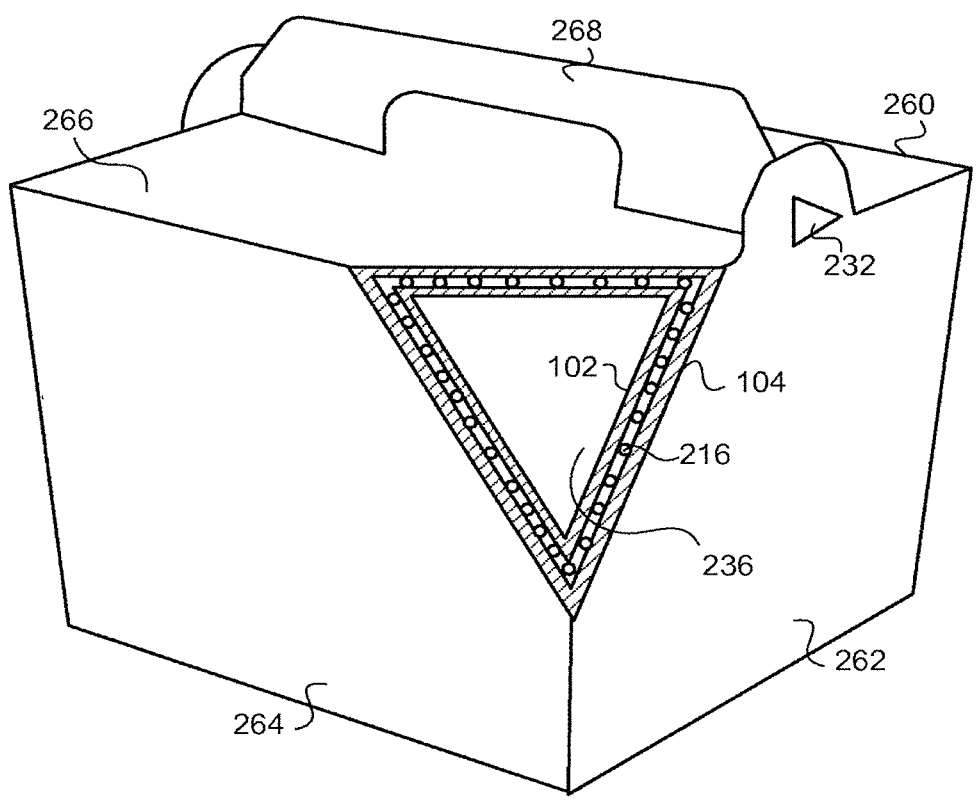
FIG. 9 is a cross-section perspective view of a folding carton.

FIG. 9 is a perspective cross-section diagram of an example folded carton 260 in a closed position. The folded carton 260 may be constructed from or using one or more blank. The blank may be made of the same material or substrate as the blank 250 for the container 220, and/or may be constructed of any kind of paperboard, paper, foil, film, fabric, foam, plastic, or various other materials, and may be similar to or resemble the blank used to form a container 220. The blank may be made of or include one or more paperboard or paper layers, such as an inner wall 102 and an outer wall 104, which may be similar to or resemble the inner wall 102 and outer wall 104 of the container 220. Insulating material 216 may be applied between the inner wall 102 and the outer wall 104 of the folded carton 260. The insulating material 216 may be the same or similar to the insulating material used with the cup 100 or the container 220. In other examples, the folded carton 260 may be made of paperboard including a single wall microfluted board including a top liner, a bottom liner and a microfluted medium layer bonded to the top and/or bottom liners by a glue containing thermally expandable microspheres. Other variations are possible.

The folded carton 260 may include one or more side walls 262 and 264. Side walls may be construed from the blank, and may include an inner wall 102 and an outer wall 104. The side walls 262 and 264 may be connected or attached to each other, a bottom wall, and/or a cover. The side walls 262 and 264, the bottom wall, and/or the cover may bound or form a storage area 236. The storage area 236 may be configured to receive and store material, such as food or beverages.

The cover 266 may be retractable or removable. The cover 266 may be lifted or opened to access the storage area 236. The cover 266 may be secured to a side wall 262 of the folded carton 260 using one or more attachment mechanism 232. In other variations, the storage area 236 may be accessed by or through one of the side walls 262 or 264 or the bottom wall.

The folded carton 260 may include a handle 268. The handle 268 may be attached to or protrude from the cover 266 or a side wall 262 or 264. The handle 268 may be used to carry or transport the folded carton 260. Various other types of containers may include, be constructed with, or use one or more blank, such as a paperboard blank with insulating material applied between two paper layers.

Figure 10:
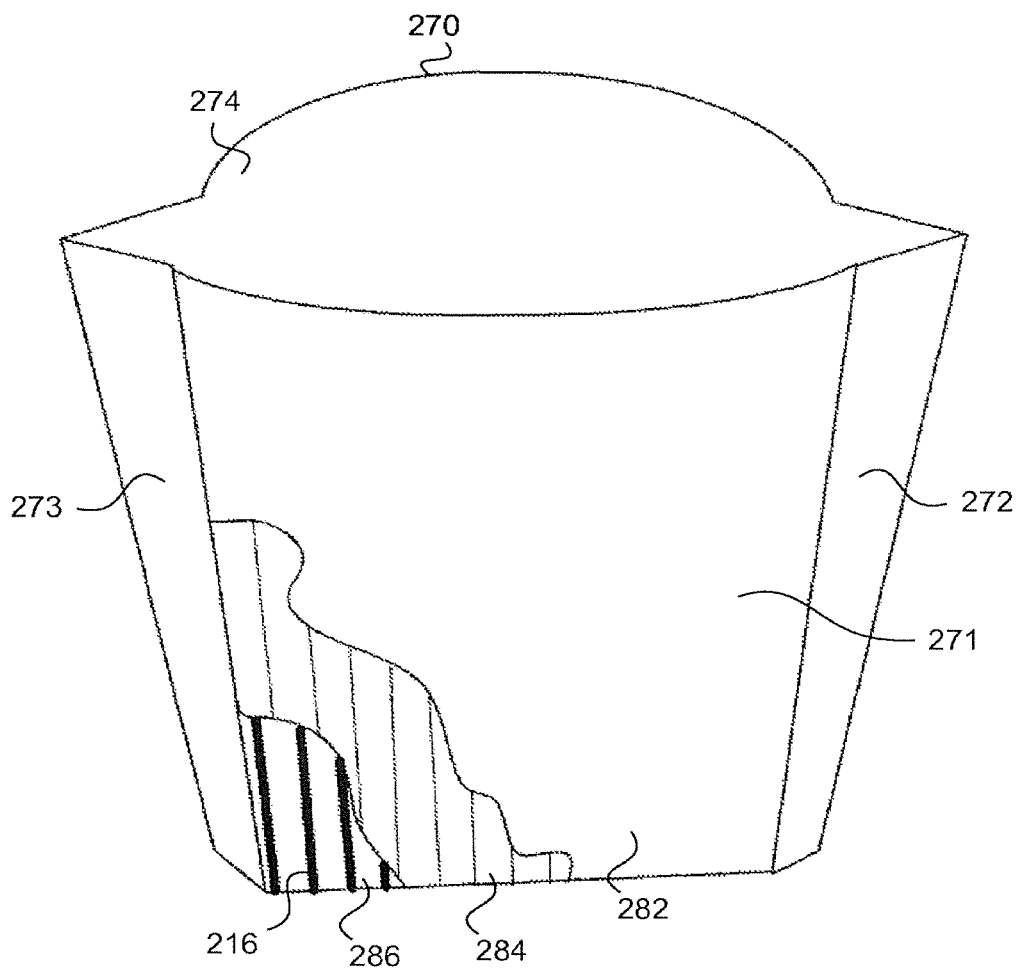
FIG. 10 is a cutaway view of a carton.
Figure 11:
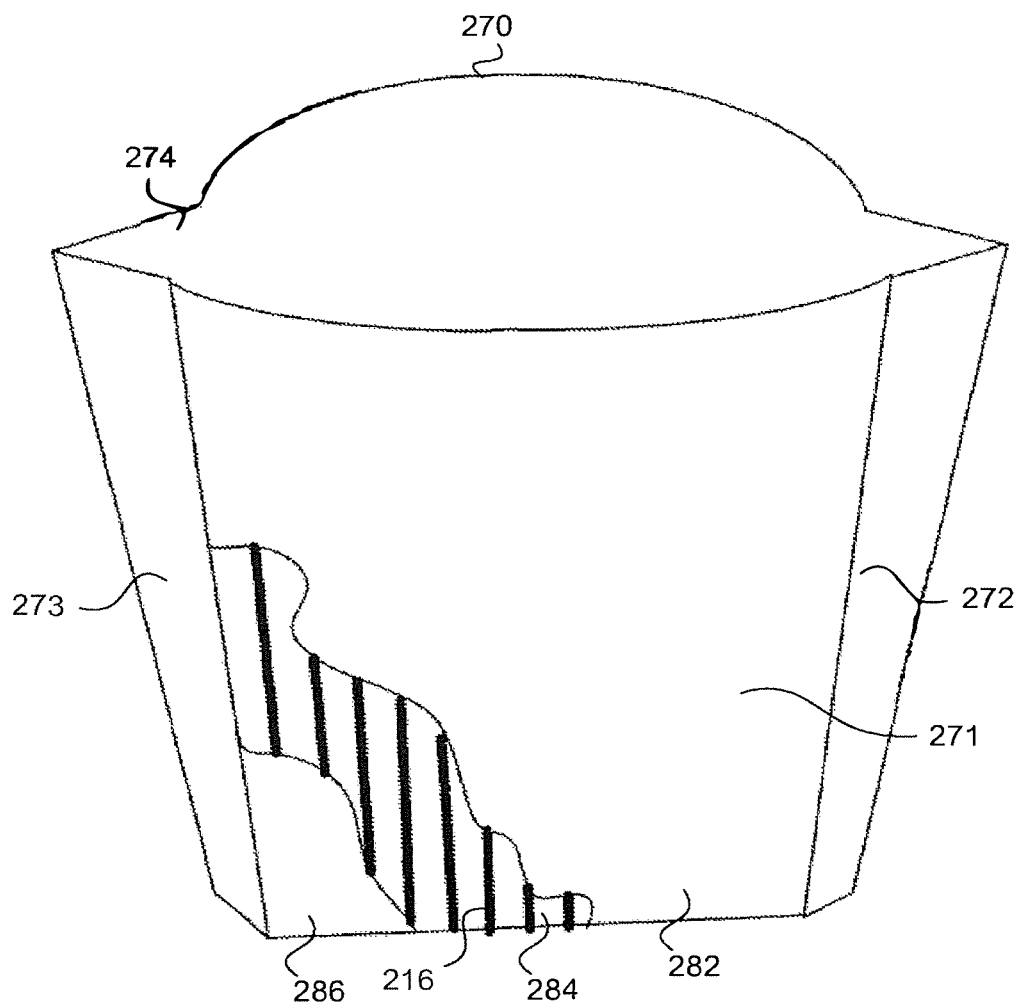
FIG. 11 is a cutaway view of a carton.
Figure 12:
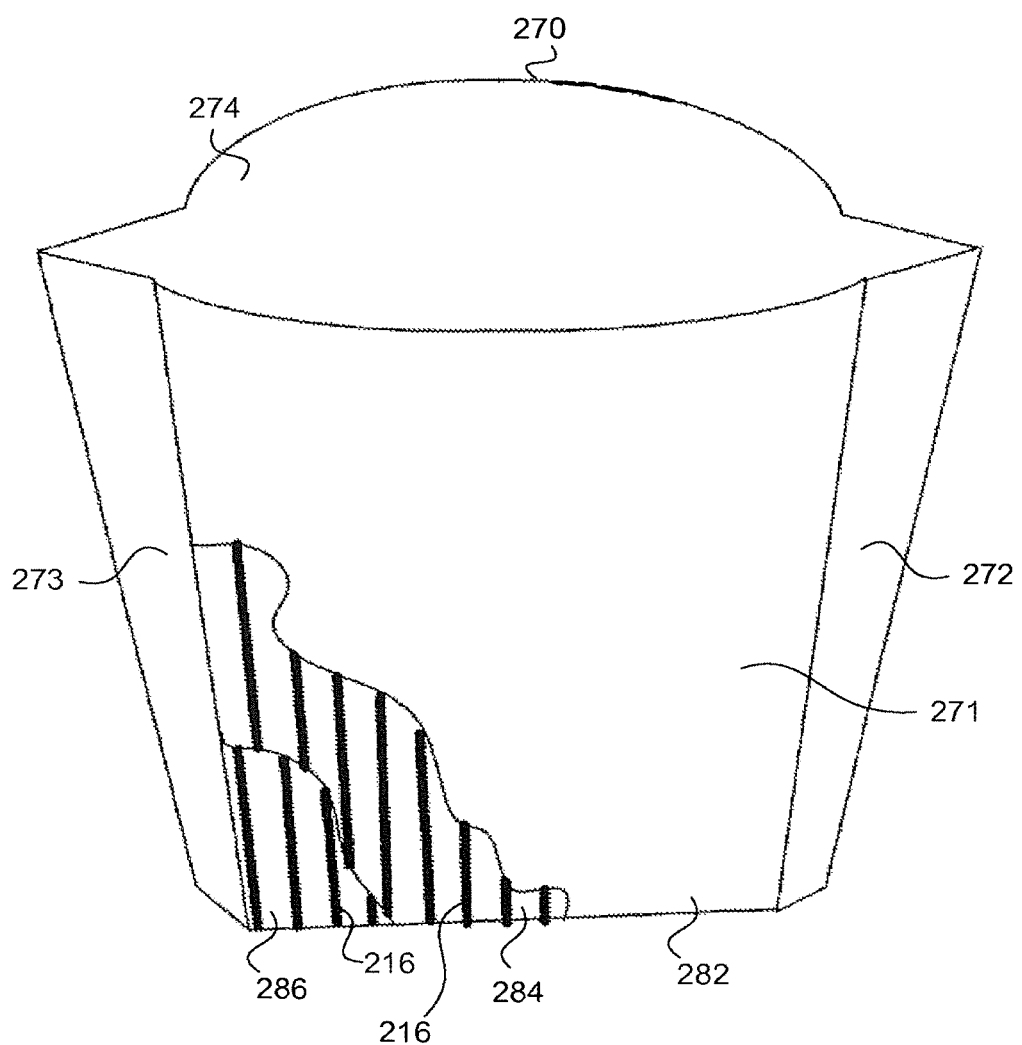
FIG. 12 is a cutaway view of a carton.
Figure 13:
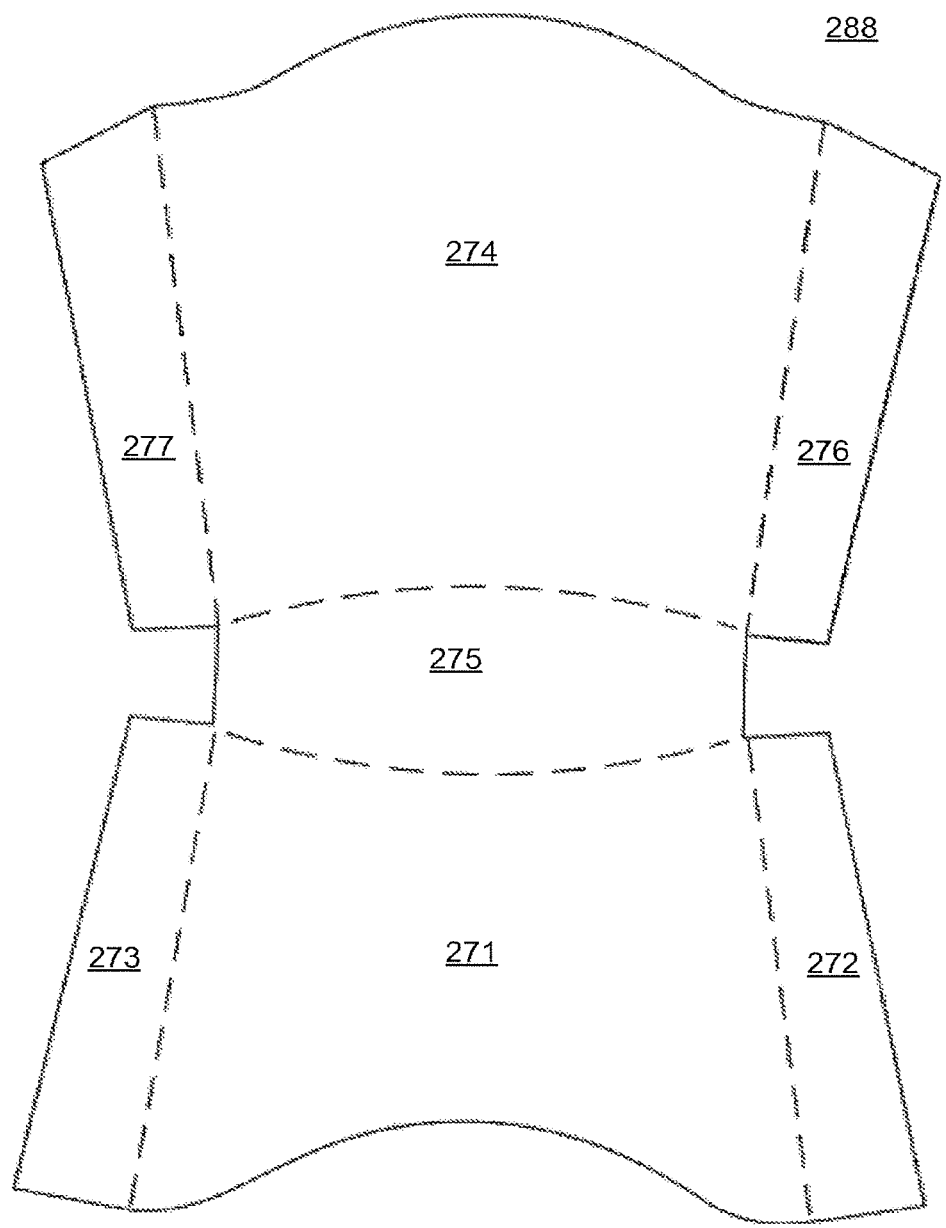
FIG. 13 is a view of a blank of a carton.

FIGS. 10-12 are perspective views of another example carton 270 with a cutout portion. FIG. 13 is a view of an example blank 288 for a carton 270. The carton 270 may, for example, be a French fry carton or other carton.

The carton 270 may include one or more bottom walls 275 and one or more side walls 271, 272, 273, 274, 275, and 276. In some examples, side walls 272 and 276 may be adjoined to form one side wall, while side walls 273 and 277 may be adjoined to form an opposite side wall. Other configurations are possible.

The carton 270 be constructed from or using one or more blank 288. The blank 288 may be made of the same material or substrate as the blank 250 for the container 220, and/or may be constructed of any kind of paperboard, paper, foil, film, fabric, foam, plastic, or various other materials, and may be similar to or resemble the blank used to form a container 220. The blank 288 may be made of paperboard including a single wall microfluted board including an outer liner or outer layer 282, an inner liner or inner layer 286, and a middle layer 284. The outer layer 282 and the inner layer 286 may be flat, such as flat paperboard. The middle layer 284 may be a microfluted or otherwise corrugated medium such as paperboard. The middle layer 284 may be bonded to the outer and/or inner liners 282 and 286, such as by a glue containing thermally expandable microspheres. FIG. 10 shows an example where the middle layer 284 is bound to the inner layer 286 by insulating material 216 applied in a linear pattern along the tips or hills of the fluted middle layer 284. FIG. 11 shows an example where the middle layer 284 is bound to the outer layer 282 by insulating material 216 applied in a linear pattern along the tips or hills of the fluted middle layer 284. FIG. 12 shows an example where the middle layer 284 is bound to both the outer layer 282 and the inner layer 286 by insulating material 216.

In other variations, the blank 288 may be made of or include one or more paperboard or paper layers, such as an inner wall 102 and an outer wall 104, which may be similar to or resemble the inner wall 102 and outer wall 104 of the container 220. Insulating material 216 may be applied between the inner wall 102 and the outer wall 104 of the folded carton 260. The insulating material 216 may be the same or similar to the insulating material used with the cup 100 or the container 220.

The cartons 270 may form a cavity or recessed area between the side walls 271, 272, 273, 274, 276, and 277 and the bottom wall 275. One or more holes, gaps, or openings may exist along a side of the bottom wall 275, such that liquid or grease placed within the recessed area of the carton 270 may escape the carton 270. The carton 270 may include an opening along a top edge of the side walls, such that one or more items may be placed within the carton 270 and stored. For example, hot food may be placed within the cavity of the carton 270. The use of the insulating material 216 with the packaging for the carton 270 may provide rigidity to the walls of the carton and insulating properties, while resulting in a vast reduction in substrate materials. In addition to the container 220, the folded carton 260, and the carton 270, the insulating material 216 may be used with other packaging materials to create various other compartments, carriers, or containers, such as soup tubs, sandwich boxes, beverage containers or carriers, and other containers.

Figure 14:
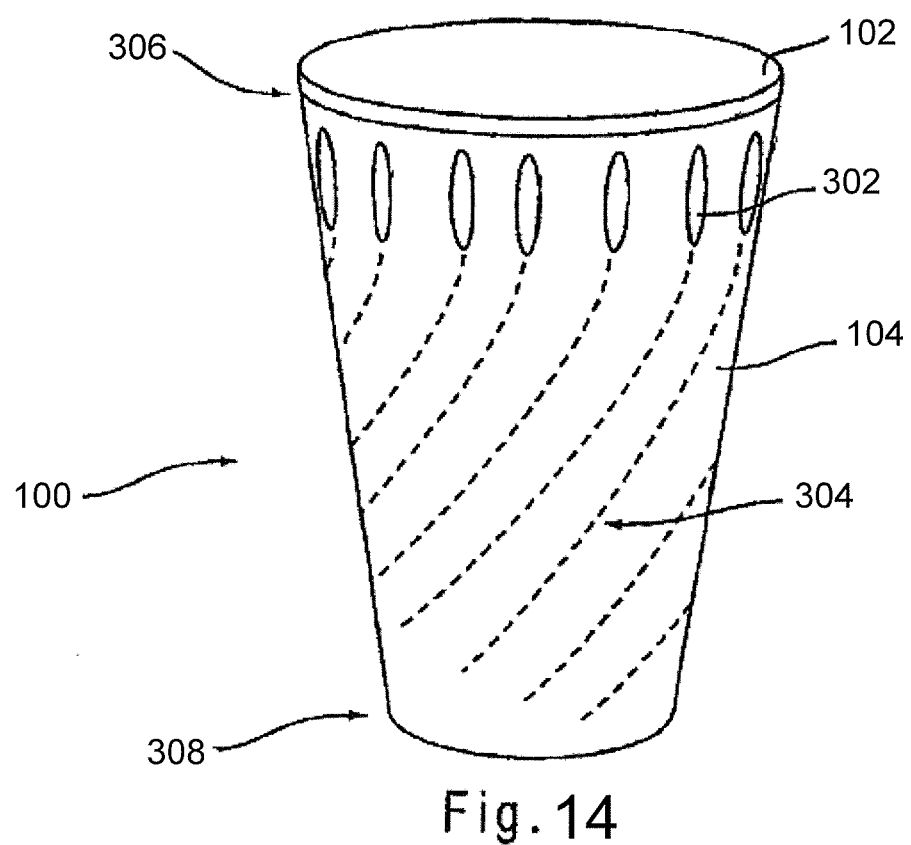
FIG. 14 is a perspective view of an integrated container with channels assembled with a full-body die cut blank with openings.
Figure 15:
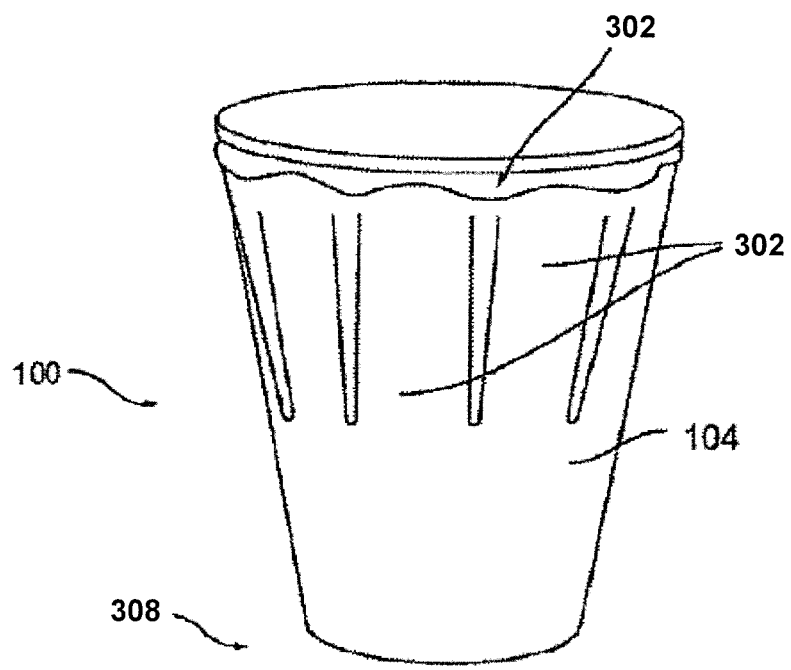
FIG. 15 is a perspective view of an integrated container with channels.

FIGS. 14 and 15 illustrate a container 100 with an outer wall 104. The container 100 may be constructed as a double-wall cup assembly. The container 100 may be a cylindrical cup, container sleeve or container having other geometrical configurations, including conical, rectangular, etc. The outer wall 104 may fully or partially cover the body of the container 100. The container 100 and outer wall 104 may be integrated into a double wall cup and the insulating, expandable material 216 and/or adhesive may be applied between the inner wall or container body 102 and the outer wall 104. The activatable insulating material may additionally have adhesive properties and thus may form the only attachment between the container and the blank. The outer wall 104 may be made of any nominal paper stock, including but not limited to, natural single-face, white-topped single face, coated bleached top single-face or any combination of these. Alternatively or additionally, the outer wall 104 may be made with foil, film, fabric, plastic, or other materials. The outer wall 104 and/or container may be repulpable, recyclable and/or biodegradable.

The outer wall 104 may include, for example, corrugated, flute (e.g., E-flute, F-flute, N-flute, or G-flute) uncorrugated or embossed air channels or grooves. The air channels or grooves may be in a vertical, diagonal, or other direction and may channel heat away from the hands. The air channels may be positioned parallel to each other. Additionally or alternatively, air channels may be formed by the application of the insulating material 216. For example, the insulating material 216 may be applied to the outer wall 104 in a striped, swirled, or dotted pattern such that air channels are formed or expanded before, during or after activation by, e.g., heat or pressure. The insulating material 216 may include blowing agents, foaming agents, and/or other agents that, upon activation, dissolve, generate gas, or disintegrate, and thus create air voids or foam structure.

The outer wall 104 may be removable from the container 100, such as a sleeve, or the outer wall 104 may be adhered to the container 100, such as in a double wall container. For example, a one piece or a double wall container, such as a cup, or a double wall container sleeve may be manufactured by laminating the outer wall 104 onto the container or container sleeve blank, using an a hot melt and insulating, expandable material 216 (e.g., void containing, foamed, or other) to secure the insulating material 216, or may be secured by any other adhesive or sealing method. Alternatively, the thermally-activated material may be used to adhere the blank to the cup. If the outer wall 104 is permanently attached to the container 100 during manufacture (e.g., creating an integrated double wall cup or one-piece container, or double wall sleeve), it may increase efficiency by eliminating an assembly step by the commercial end-user. Further, it may decrease the amount of storage space required by the commercial end-user, e.g., storing one item as opposed to two.

The outer wall 104 may be removable from the container. For example, a die cut blank, such as a sleeve, may be manufactured to be stored separately and removable from the container 100.

The outer wall 104 may remain open ended on one side or on opposing sides, which may permit airflow. For example, in FIG. 14 the container may contain openings 302 near the top of the outer wall 104. For example, in FIG. 15, the container may contain openings 302 near the top or bottom 308 of the outer wall 104. The opening may be formed into the outer wall 104, for example as holes, and air channels may be created allowing air flow when the space between the inner wall 102 and the outer wall 104 is expanded by activation of the insulating, expandable material 216. Airflow may be further manipulated, for example, upward and away from the holding fingers by corrugated, flute corrugated, or other air channels created by the interaction of the pattern of the insulating material 216 and the outer wall 104. For example, the pattern of application of the insulating, expandable material 216 may create air channels 304, 302 for the release of heat.

FIG. 14 illustrates an alternate non-limiting example of how application of the insulating, expandable material 216 may form openings 302 near the top 306 of the container 100. The channels may be formed by expansion of the insulating material 216. There may be openings on opposing ends of the container 100, such as at the top 306 and the bottom 308. The openings may be formed by wrapping the outer wall 104 on the container without completing the seal at the top 306 or bottom 308.

Figure 16:
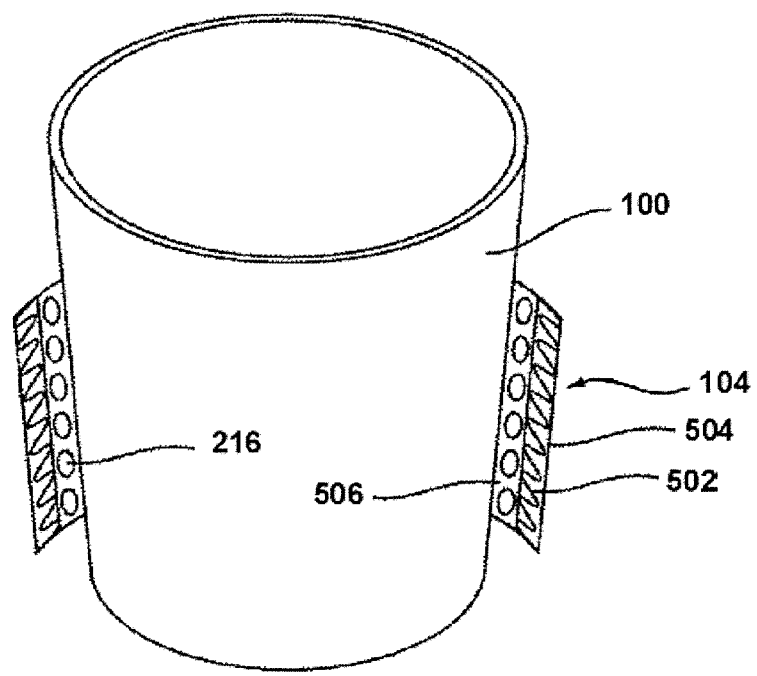
FIG. 16 is a cross section view of a sleeve with a cup.

FIG. 16 illustrates a cross section of an outer wall 104, such as a sleeve or wrap, assembled with the container 100. This figure is meant to be illustrative and not limiting. The cup may be replaced with any container, for example, a press-formed tray, a soup tub, or a bulk beverage container. The outer wall 104 may have an inner face 506 and an outer face 504. An insulating, expandable material 216 may be applied to the inner face 506, the outer face 504, and/or to a surface 502 between the inner face 506 and the outer face 504, such as to an inner wall of the sleeve. The inner face 506 and outer face 504 do not necessarily contain a space therebetween. In one non-limiting example, the expandable material may be applied between the container wall 102 and the outer wall 104 and may result in an integrated container 100.

A insulating material 216, such as a heat-expandable material with the heat-expandable microspheres in unexpanded form, may be applied to an inner face 506 of the outer wall 104 in an inactive form. The inactivated insulating material 216 may be applied as a full coat, thin film, or in a pattern that does not materially alter the thickness of the outer wall 104 before expansion. Applying the insulating, expandable material 216 to the inside of the outer wall 104 may also maintain the printability of the outer face of the outer wall 104. If the inactivated insulating, expandable material 216 on the outer wall 104 is assembled, for example, with a standard paper cup, it may maintain the slim profile of the cup. Maintenance of the slim profile may retain the efficient nesting qualities of a standard cup, allowing it to be efficiently cased, crated and shipped. Additionally, activation of the insulating material 216 at end use may create manufacturing efficiencies by reducing the activation or foaming or curing step during manufacturing of the container or sleeve and thereby also reducing energy used during manufacturing.

The insulating, expandable material 216 may be activated and thereby expanded by, for example, adding contents 206, such as hot liquid, beverage or food into the container 100. Alternatively or additionally, the container 100 may be prefilled with contents 206, such as beverage or food and the insulating material 216 may be activated upon heating such as by microwave or water bath. Activation may occur only at the consumption stage and not at the processing stage of the outer wall 104, such that the outer wall 104 may be shipped to the consumer with a substantially inactivated insulating, expandable material 216. For example, the activation point of the insulating, expandable material 216 may be about 120° F. or higher and/or less than 60° F., such that the insulating, expandable material 216 may be activated only by the temperature of hot (or cold) liquids, beverages, or food and not activated by ambient or body temperature. The activation may cause the expandable material to expand and "push back" the outer wall 104 from the container 100 creating an increased air gap. The air gap may create a thermal barrier between the hot beverage container 100 and the hand of the consumer. The activation may also enhance the stiffness and/or rigidity of the container, which may allow for a reduction in the material or thickness of the container wall. As described in more detail below, the insulating material 216 may also be activated, or at least partially activated, before reaching the consumer. Consequently, this ability of the insulating material 216 to respond to target temperature can make the container or sleeve "smart" in the sense that it can increase its insulation as the packaged content 206 gets hotter.

The insulating, expandable material 216 may be applied to the outer wall 104 in an unexpanded state. Expansion of the insulating material 216 may not occur until activated by adding hot fluid or solids, such as at the point of serving. This may be different from expanding the material during manufacture of the outer wall 104. Expansion during manufacture may increase the bulk of the outer wall 104. The insulating, expandable material 216 may be controlled to effect nesting efficiency. The properties of the insulating material 216 may be further controlled by, for example but not limited to, combining an outer wall 104 constructed from fluted corrugate material with patterned application of insulating, expandable material 216 to provide specific insulation, air flow characteristics and container rigidity enhancement. For example, the corrugation and/or the pattern of insulating, expandable material 216 applied to the outer wall 104 may direct heat convection upward, and may therefore reduce heat transfer horizontally toward the holding hand of consumer. Alternatively, the insulating material 216 may be extruded into a sheet to which a pattern may be applied, such as by fluting, die-cutting shapes, lines, channels, or other markings into the sheet before attaching the sheet of insulating material 216 to an outer wall 104. In other implementations, expansion may occur before shipping, such as before, during or after the manufacturing of the container 100.

Figure 17:
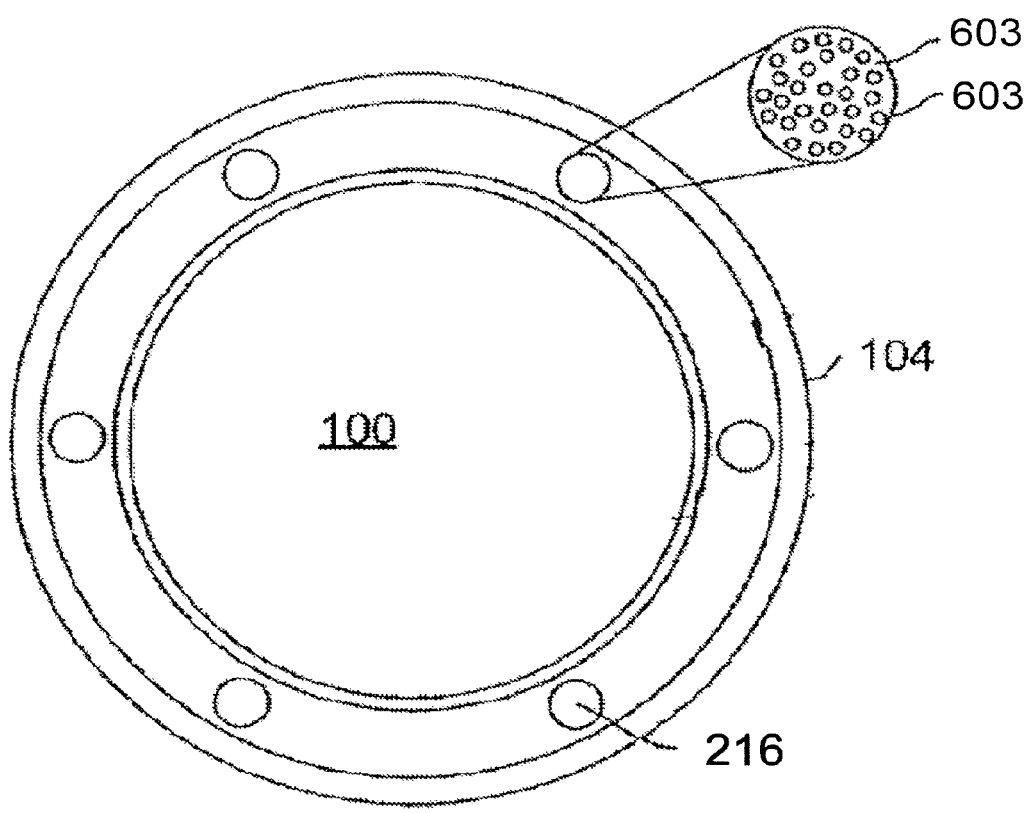
FIG. 17 is a top perspective view of a cross section of a cup assembled with an outer wall.

FIG. 17 is an exemplary top view of a cross-section of a container 100 assembled with an outer wall 104. This figure is illustrative only and not limiting. The insulating, expandable material 216 may be applied to an inner-face 506 of the outer wall 104. For example, the insulating, expandable material 216 may be applied between the outer wall 104 and the wall of the container 100 and may form an integrated two-layer cup with thermally-activatable insulated expandable material in between, or between an outer wall 104 and an inner wall of a container sleeve. The insulating, expandable material 216 may include, for example, in situ air voids, or expandable microspheres or foaming agents 603 dispersed in a binder or any other suitable material disclosed above and may include an adhesive property.

Figure 18:
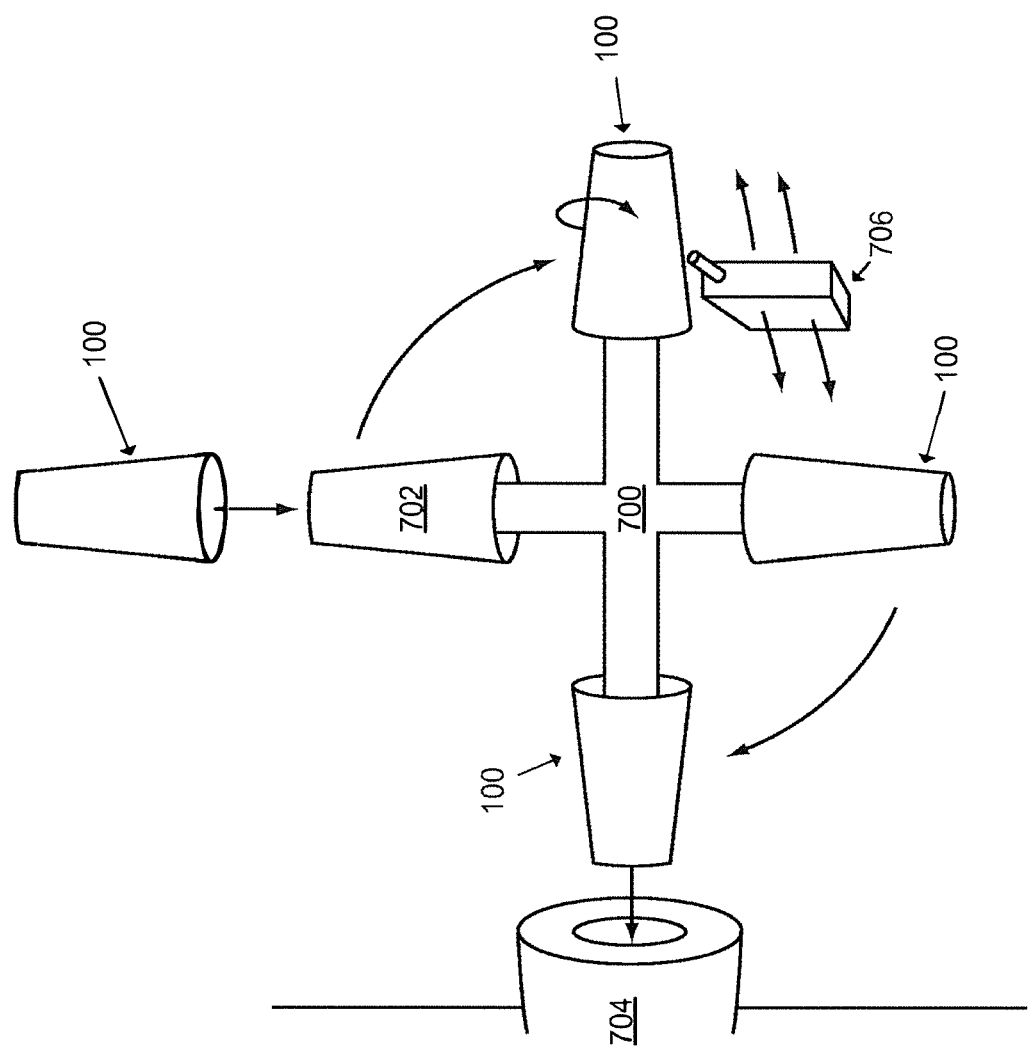
FIG. 18 is a view of a method of making a double wall cup.

FIG. 18 illustrates an exemplary method of applying the insulating material 216 to a container 100. The method may be adapted to a cup wrapping machine. In this example, the insulating material 216 may be applied continuously or intermittently via an applicator 706 such as a nozzle, glue gun, or slot die applicator onto the outside of, e.g., a paper cup 100 which may be secured to a mandrel 702. The pattern may be manipulated by movement of the container 100 relative to the applicator 706. For example, the mandrel 702 may be spun and/or moved up or down or in another direction to achieve a desired pattern, e.g., spiral, dotted, lined, and etc.

Alternatively or additionally, the applicator 706 may move relative to the container 100 to achieve a desired pattern. For example, mandrels 702 may be arranged on a rotating arm 700. Containers 100 such as cups may be loaded onto the mandrel 702 manually or by machine feed. The arm 700 may move the container 100 proximate to the applicator 706. The applicator 706 may apply patterns of insulating material 216 to the container 100 by moving relative to the container 100. The mandrel 702 may also move the container 100 relative to the applicator 706, such as by rotation. As an example, stripes may be applied to the cup by side to side movement of the applicator 706 combined with rotational movement of the mandrel 702. The spray from the applicator 706 may be constant or intermittent and may create broken lines, stripes, dots, or ellipses of foam. Swirls may be applied by constant spray from the applicator 706 combined with side movement and rotation of the mandrel 702.

The applicator 706 may be attached to a line which may deliver the insulating material 216. Gas, such as nitrogen gas, may be added to the insulating material 216 by a separate line and mixed in the applicator 706, or during application, or in the applicator feed line, or otherwise.

After the insulating material 216 has been applied, the arm 700 may move the container 100 to a different position where the cup may be removed from the mandrel for further processing. For example, an integrated double wall container, such as a cup, may be formed by inserting the container 100 into an outer wall 104. The outer wall 104 may be preformed and located in a cavity 704 into which the container 100 may be inserted.

Figure 19:
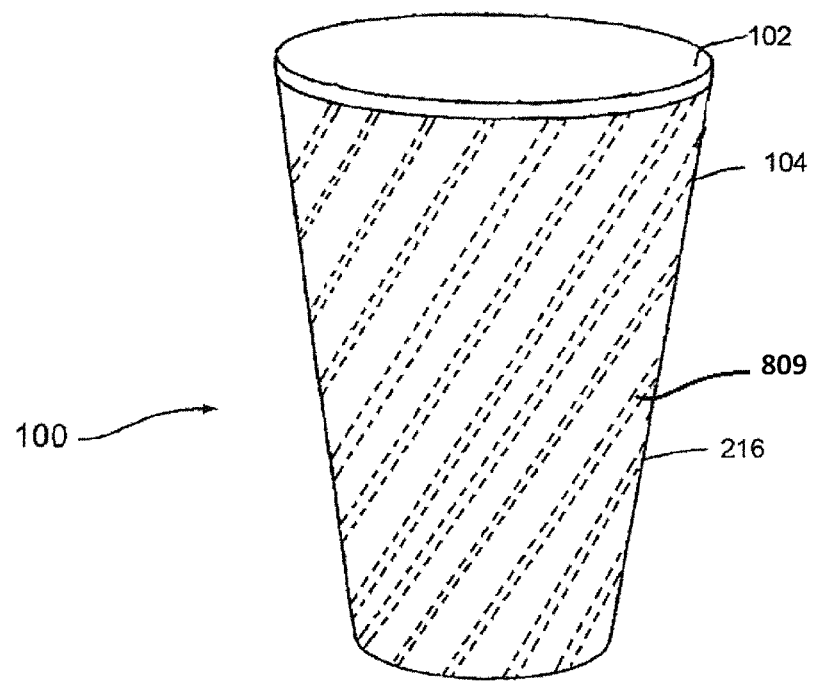
FIG. 19 is a view of a cup with insulating material applied in a pattern.

FIG. 19 illustrates an exemplary outer wall 104. This drawing is illustrative and not meant to be limited to a size or shape. The size and shape may be adapted to the dimensions of any container. An insulating, expandable material 216 may be applied to the outer wall 104. The insulating, expandable material 216 may be applied by a number of methods, such as but not limited to, a nozzle spray gun, printing, a slot coater, or other methods, such as those described above or in more detail below. Alternatively or additionally, the insulating material 216 may be extruded into a sheet and may be applied to a container, container sleeve, or die cut blank by laminating the sheet of insulating material to the blank of the container, container sleeve, or die cut blank. The insulating material 216 may be applied to the outer wall 104, for example, on an in-line cup wrapping machine, in-line on a folder/gluer, or by other suitable methods, such as off-line coating and drying. The insulating, expandable material 216 may be applied to the outer wall 104 in any suitable pattern, such as but not limited to, banded, dotted, waved, squares, circles, diamonds, random, a combination of these or any other pattern. For example, the insulating, expandable material 216 may be applied in a pattern that manipulates air flow and/or conducts heat, for example, vertically upward away from the holding fingers. The insulating, expandable material 216 may be applied such that it forms channels, or expands to form channels on activation. The channels may direct natural convection. The insulating, expandable material 216 may fully or only partially cover the surface being coated.

The outer wall 104 may be removably or permanently attached to a container 100 or cup by, for example, wrapping the outer wall 104 around the container 100. For example, a double wall cup or container 100 may be manufactured by laminating the outer wall 104 onto the container, using an insulating material 216 such as a starch based material, a hot melt and expandable material, an expandable material with adhesive properties, a combination of these or any other adhesive or sealing method. If the outer wall 104 is permanently attached to the container 100 during manufacture (for example, creating an integrated or one-piece double wall cup), it may increase the efficiency of using an outer wall 104 by eliminating an assembly step by the commercial end-user. Further, it may decrease the amount of storage space required by the commercial end-user (storing one item as opposed to two). The shape of the outer wall 104 in the drawing is not meant to be limiting. The shape of the outer wall 104 may be adapted to the shape of other containers, for example but not limited to, a container sleeve, a soup tub, press-formed container, or bulk beverage containers. Alternatively the container 100 may be a container sleeve that is open on both ends.

The outer wall 104 may, optionally, contain in-seam hot-melt 604 or cold-set glue. If the insulating, expandable material 216 is also an adhesive, the in-seam hot-melt or cold-set 604 may be omitted. The in-seam hot-melt/cold-set 604 glue may be used in addition to the insulating, expandable material 216, such as, for bonding reinforcement. The outer wall 104 may be applied to a container 100, such as a cup or sleeve by, for example, wrapping, laminating, or other manufacturing processes.

FIGS. 19 through 22B illustrate many examples of an outer wall 104 and outer wall blank 602. These examples are merely illustrative and not limiting. FIG. 19 illustrates outer wall 104 with insulating, expandable material 216 applied in a pattern 809 to channel the release of heat. The insulating material 216 may be made of, for example, corrugated paper, such as but not limited to fluted corrugate. Convection may be manipulated by corrugation, the pattern of application of the insulating material 216, or in another suitable manner.

Figure 20:
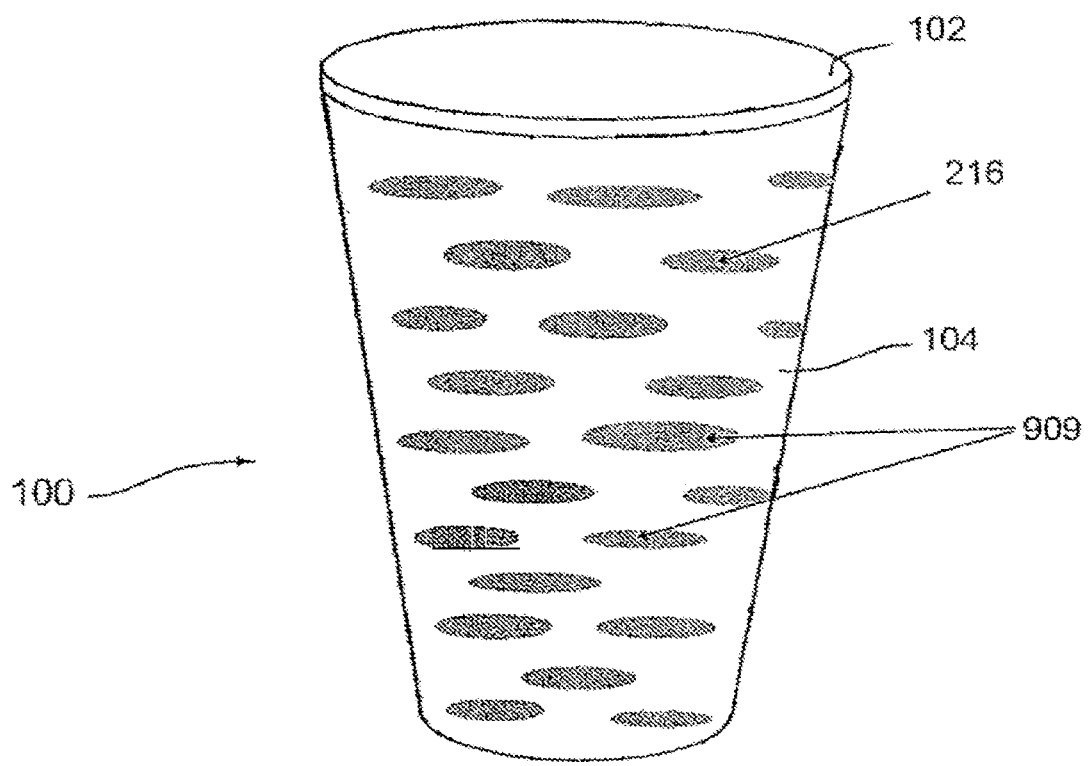
FIG. 20 is a view of a cup with insulating material applied in a pattern.
Figure 21:
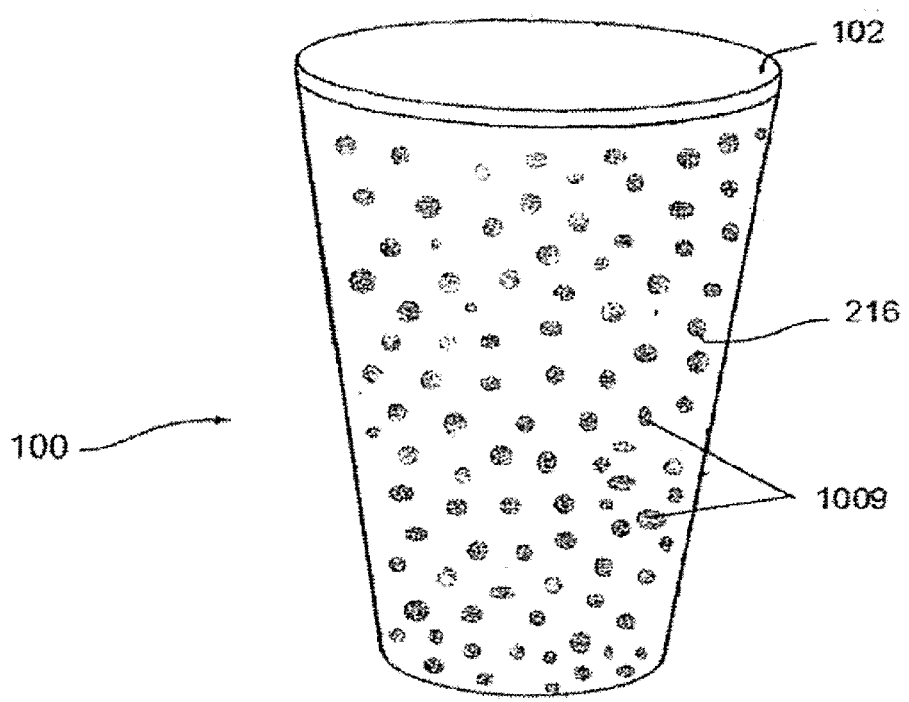
FIG. 21 is a view of a cup with insulating material applied in a pattern.
Figure 22:
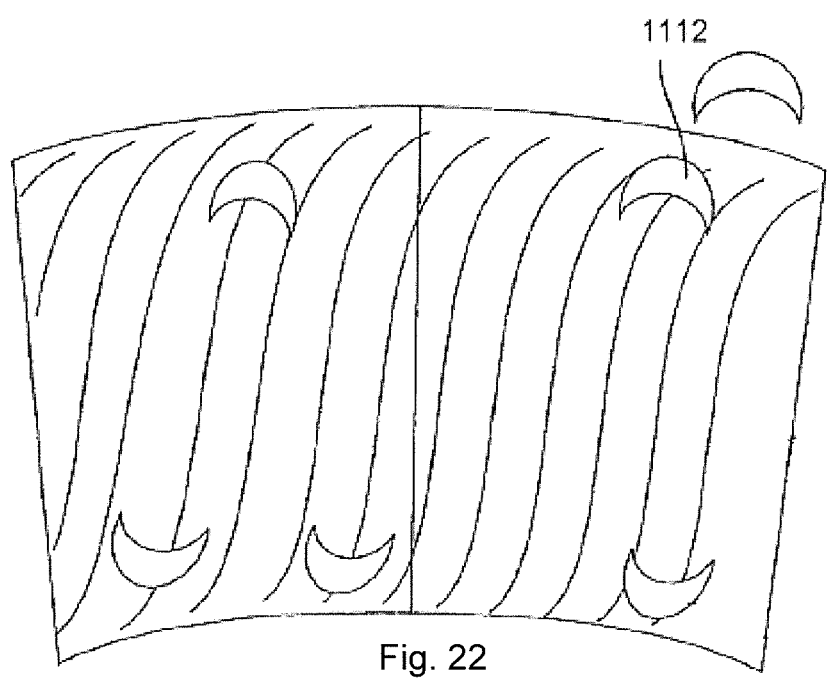
FIG. 22 is a view of an outer wall disassembled from a cup.
Figure 22A:
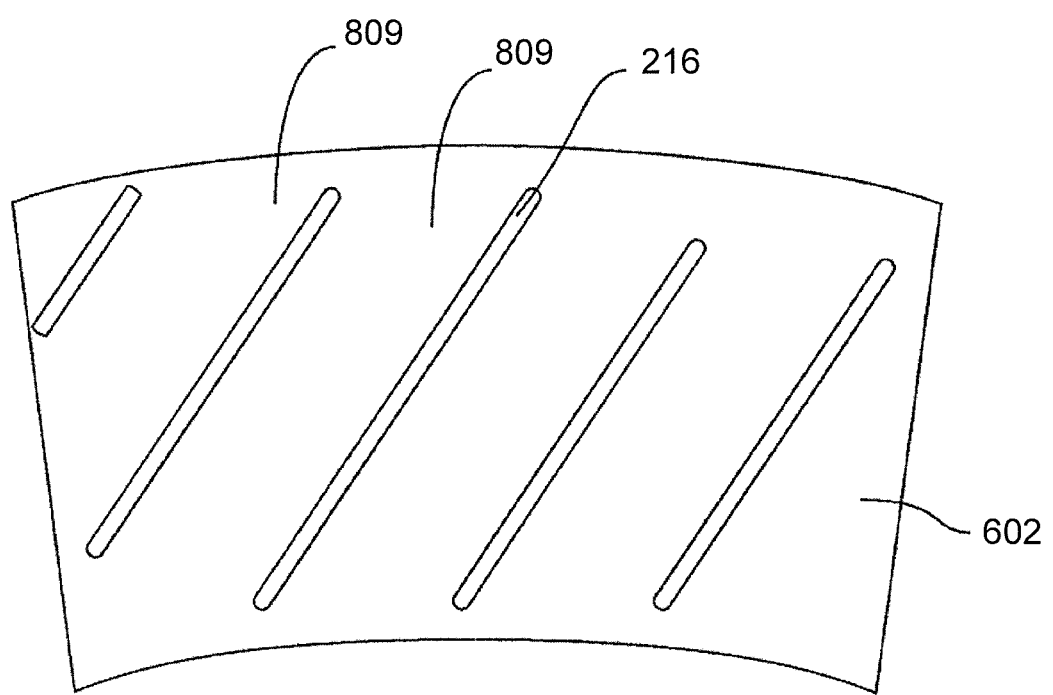
FIG. 22A is a view of an outer wall disassembled from a cup.
Figure 22B:
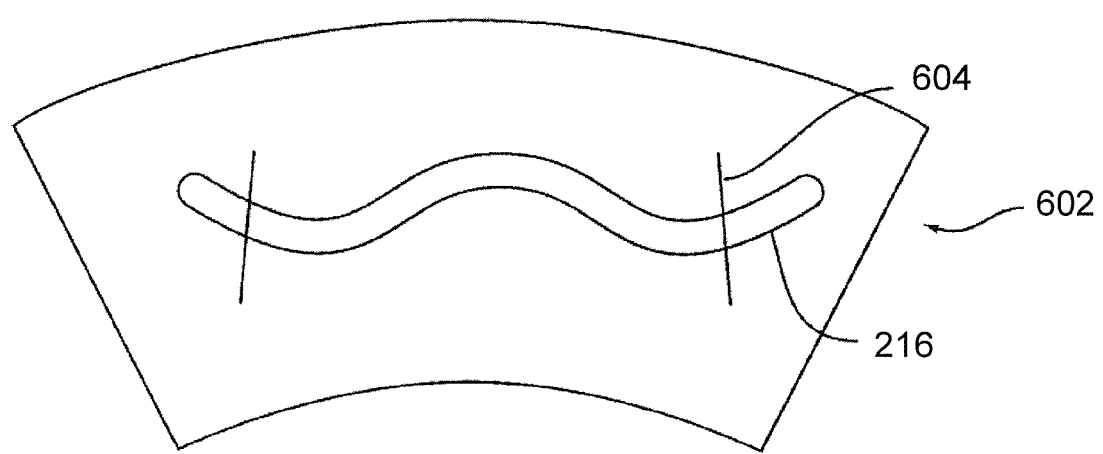
FIG. 22B is a view of an outer wall disassembled from a cup.
Figure 23:
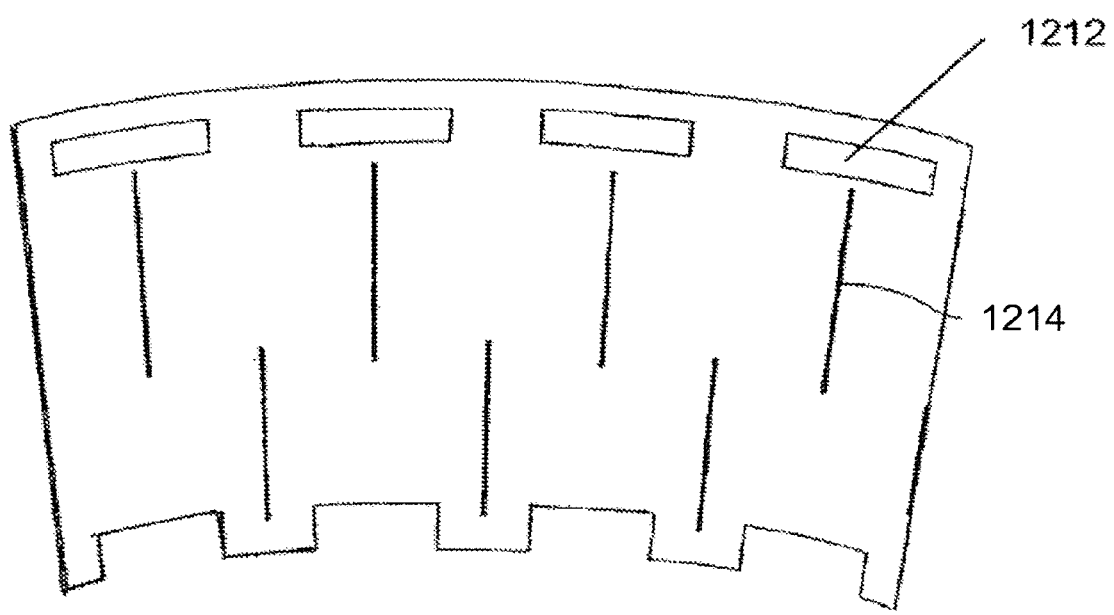
FIG. 23 is a view of an outer wall disassembled from a cup.
Figure 24:
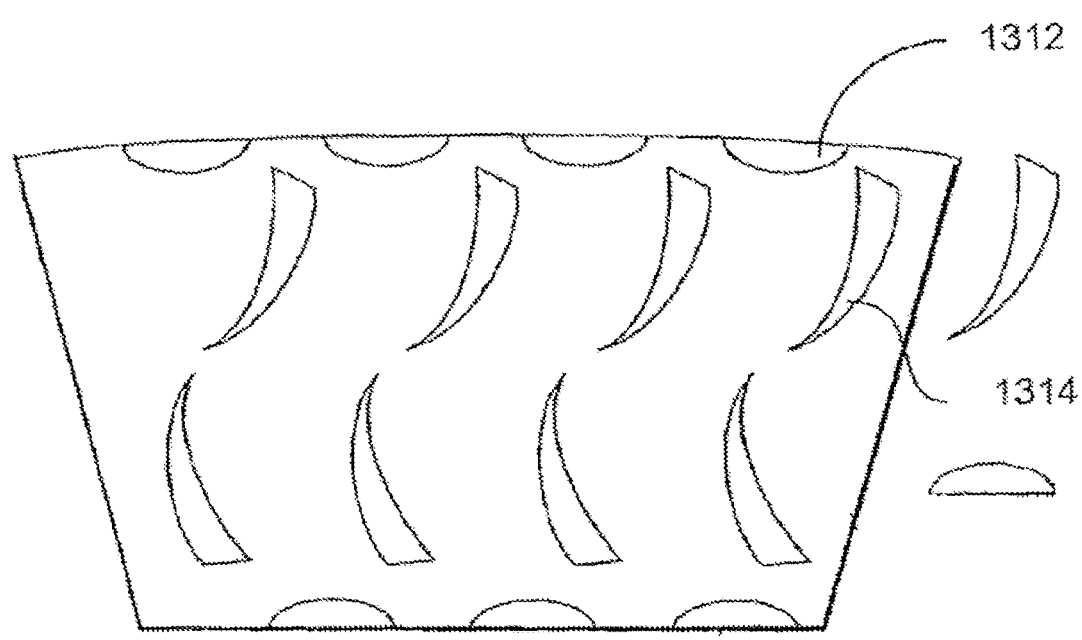
FIG. 24 is a view of an outer wall disassembled from a cup.
Figure 25:
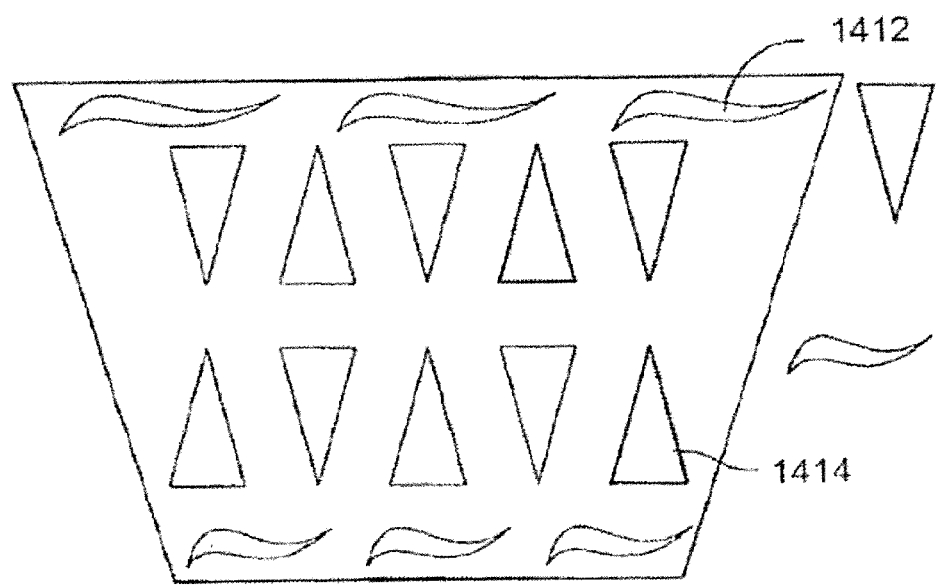
FIG. 25 is a view of an outer wall disassembled from a cup.

FIGS. 20 through 21 illustrate other possible, non-limiting examples of potential patterns of insulating, expandable material 216. The patterns of insulating, expandable material 216 are represented by numbers 909 and 1009, respectively. The insulating, expandable material 216 may be applied in patterns other than those illustrated in FIGS. 19-21. The insulating material 216, may vary in thickness and may provide graduated flow to channel heat to die cut openings.

FIGS. 22-25 illustrate patterns of die cut openings that may be used to allow air flow. Openings are represented by numbers 1112, 1212, 1312, and 1412, respectively. Openings may also be located and/or include shapes such as illustrated by numbers 1214, 1314, and 1414. There may be die cut openings at opposing ends of the blank, or only at one end. The shapes of the openings in FIGS. 22-25 are illustrative only and not limiting. For example, the patterns of insulating, expandable material 216 and the shape of the openings may be so arranged as to manipulate air flow, for example but not limited to, creating a Venturi effect.

Figure 26:
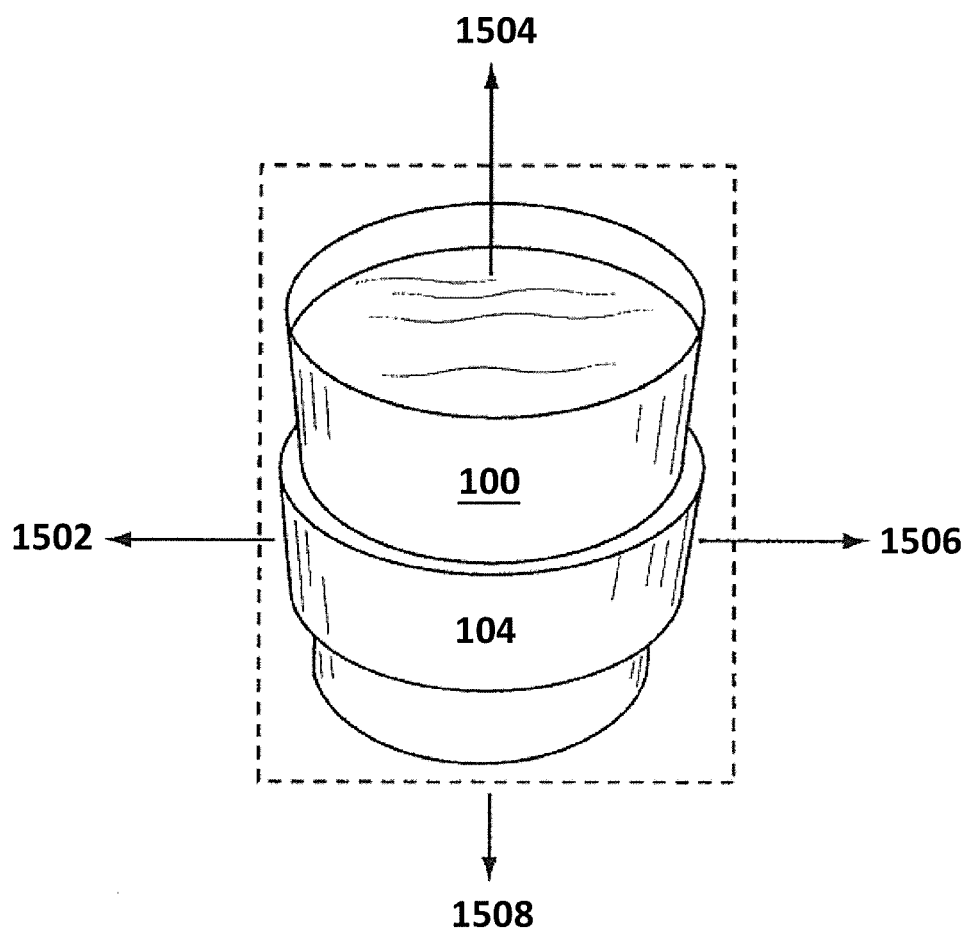
FIG. 26 is a view of a cup assembled with a sleeve illustrating heat transfer.

FIG. 26 is an illustrative example showing exemplary heat transfer. This example is not meant to be limiting, but merely illustrative of possible heat loss manipulation. Total heat loss of the system may be represented by the following equation:

$$Q^T[\text{Cal./second}] = Q_1 + Q_2 + Q_3 + Q_4$$

Where $Q^T$ is the total heat loss. $Q_1$ 1504 may be the heat loss due to water evaporation. $Q_2$, $Q_3$, and $Q_4$ represented by 1502, 1506, and 1508, respectively, may represent the convectional and conductional heat loss.

The objective of keeping contents hot may be achieved by minimizing $Q^T$. The outer wall 104 may minimize $Q^T$ by minimizing $Q_2$, $Q_3$, and $Q_4$. The low thermal conductivity of the insulating material may result in much lower heat loss due to $Q_2$, $Q_3$, and $Q_4$.

The objective of preventing consumer flesh burns may be achieved by, for example, minimizing $Q_2$, $Q_3$, and $Q_4$, especially $Q_2$, $Q_3$, while allowing $Q_1$ and $Q_4$ to channel the unavoidable high heat flux (due to the hot liquid) vertically up or down. This may be achieved by, for example, adding corrugated grooves to the outer wall 104. The grooves may be, for example, in a generally vertical or diagonally tilted.

Non-limiting examples follow.

Example 1

Figure 30:
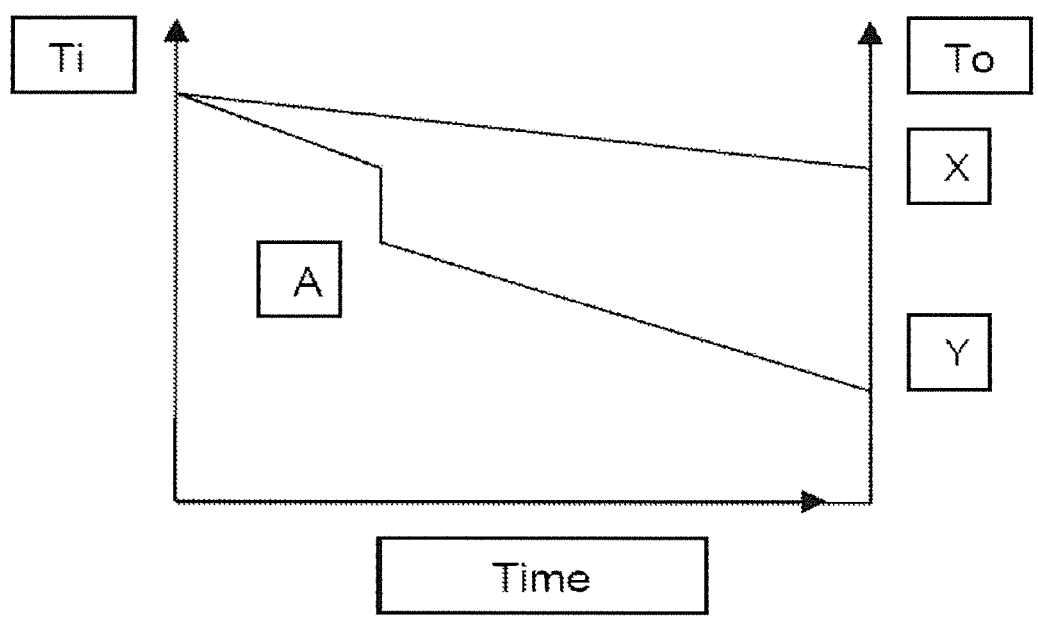
FIG. 30 shows a graphical representation of how an expandable material alters thermal conductivity of a cup.

FIG. 30 provides a graphical representation of how the insulating, expandable material 216 may alter thermal conductivity. The temperature on the inside of a cup may be represented by Ti. The temperature on the outside of the cup may be represented by To. The top line, X, may represent a container without the coated outer wall 104. The second line, Y, may represent a container assembled with a coated outer wall 104. This example may illustrate that, in a container without an outer wall 104 coated with the insulating material 216, the difference in the temperature inside versus the outside of the container may be very small. In a container with an outer wall 104 coated with the temperature activated insulating material 216, the difference in the temperature between inside and outside may be small when the hot food or beverage is added to the container. However, the food or beverage may activate the material, A, on contact, causing the material to expand. When the material expands, the difference in temperature Ti–To, may increase.

Example 2

Example 2 illustrates temperature sensory comparison of various outer wall 104 materials coated with the insulating, thermally-expandable material 216 compared to without the insulating, thermally-expandable material 216. The following experiment is for illustration only and is not limiting, other experimental results might be obtained.

An insulating material 216, such as a thermally, or other, expandable material may be applied to outer wall 104 blanks made of various materials, such as but not limited to paper, paperboard, and fluted corrugated paper. Each outer wall 104 blank may be wrapped around a container, such as a cup. The cup may be filled with hot water. The cups may then be handled with bare hands and a comparison made between the sensory responses to the two conditions. In each test, the cups with coated outer wall 104 were less "hot" to the touch than those with uncoated outer wall 104. Expansion occurred within a few minutes of pouring hot water into the cup.

Example 3

Coatings of insulating material 216 may be applied to a single face medium. By a non-limiting example, the application may be by smearing the coating to the single face medium. The coating may be expanded when wet using a MASTER-MITE 120 V, 475 W heat gun at 600 degrees F.

Example 4

Coatings of insulating material 216 may be applied to the outside of a 12 Oz cup and allowed to air-dry overnight. The next day, 190° F. hot water may be poured into the cup. Noticeable expansion may be observed shortly after filling the 190° F. hot water into the cup. Lids may be placed on the cup, and after 7 minutes more expansion may be observed, but still partial expansion. A benefit of post-heat activation may be that the hotter the liquid the more the coating expands.

Example 5

A coating of an insulating material 216 was applied to a cup. A 250 W IR heater manufactured by Fisher Scientific model no. 11-504-50 may be used to heat the insulating material 216. Expansion may be slow when the lamp is six inches away from the insulating material 216 and immediate when one inch away from the insulating material 216. Excess heat and time may cause coating deformation from the substrate surface.

Example 6

Coatings of insulating material 216 may be applied to paper, which may them be wrapped around a paper cup after the coating is allowed to air dry. Heat from a heat gun may be used to heat the part of the insulating material 216 coating indirectly through the paper shell for one minute. The coating expanded. Another part of the unheated insulating material 216 coating may be heated under an IR lamp through the paper. The insulating material 216 coating expanded.

Example 7

An insulating material 216, such as a heat expandable coating, may be applied within the walls of a double wall sleeve or container, such as a cup. During manufacture, the insulating material 216 may be adequately dried but not expanded, or not fully expanded. When the sleeve or container is exposed to high temperature, such as the temperature of coffee or soup, the insulating material 216 may expand pushing the walls of the double wall sleeve or container away from each other. This expansion through activation may "smartly" increase the air voids in the insulating material 216 as well as the insulation and rigidity of the package. The following details an experiment illustrating how use of the insulating material 216 decreases a weight of a material used in the manufacture of a container or container sleeve. Although the experiment employs a limited set of materials, they demonstrate the feasibility and benefits of the insulating material 216.

Figure 31:
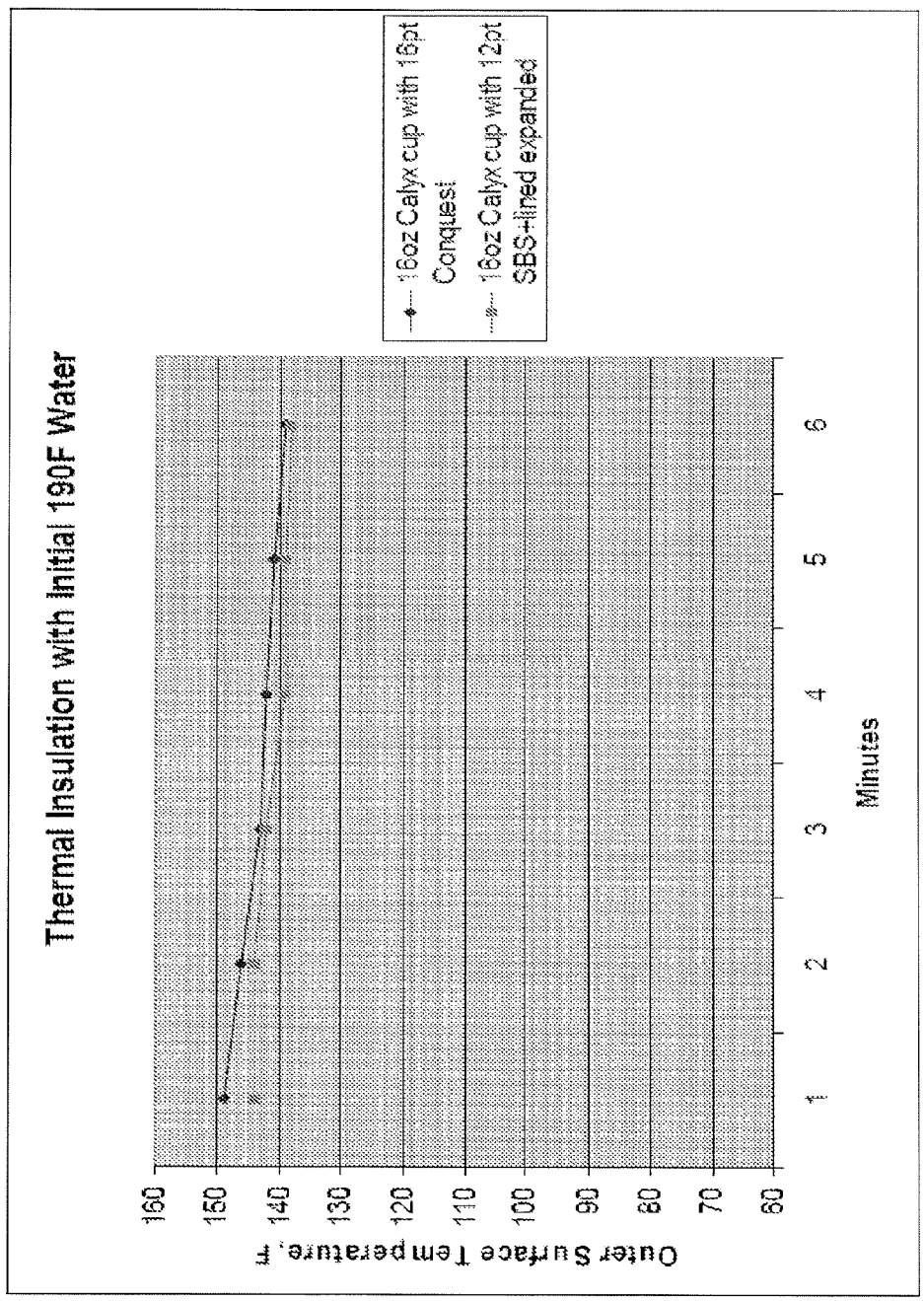
FIG. 31 is an example graph showing thermal insulation of example containers.

Two samples were compared. The reference container was a 16 ounce disposable cup with a 16 pt outer wrap. The experimental container was a 16 ounce disposable cup with a pattern of insulating material 216, in this case a foam coating, and a 12 pt outer wrap. Both cups were filled with 190° F. water. The insulating material 216 of the experimental container expanded upon addition of the 190° F. water. The outer surface temperature of each cup was measured and plotted in FIG. 31. The experimental cup displayed improved insulating properties during the first few minutes of the experiment.

A second trial illustrated the use of container sleeves. The reference container sleeve was an N-flute single face sleeve. The experimental container sleeve was an N-flute single face sleeve with an inside layer of insulating material 216, in this case, foam coating. A layer of kraft paper was laminated over the layer of insulating material 216 and the material was dried, but not expanded. The insulating material 216 was applied in two patterns: full coverage and lines running from the top to the bottom of the sleeve. To summarize, there were five formats of container sleeves tested:

N-flute single face sleeve with inner layer of kraft paper

Figure 32:
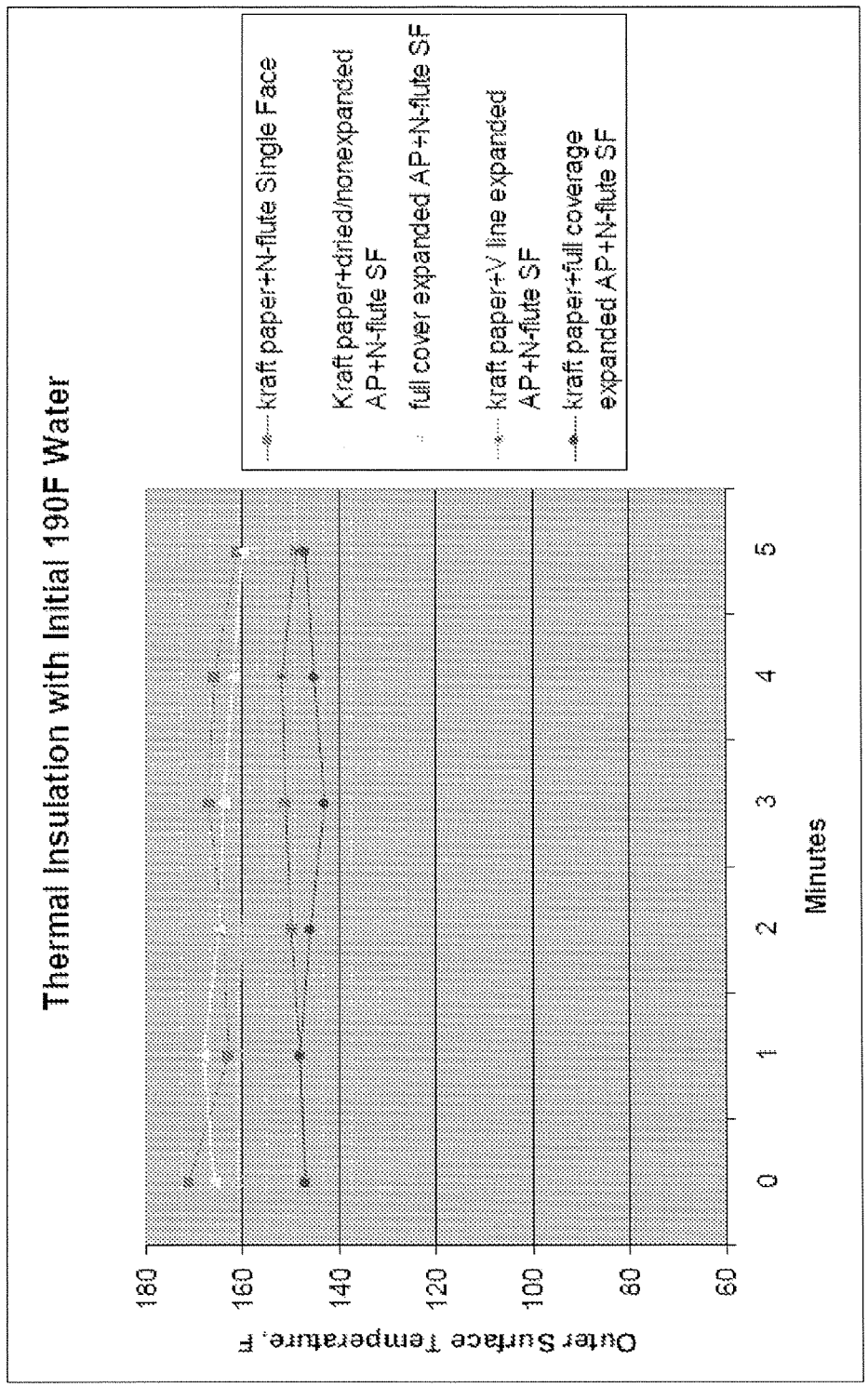
FIG. 32 is an example graph showing thermal insulation of example containers.

N-flute single face sleeve with inner layer of dried nonexpanded heat activatable aqueous coating ("AP") and an inner layer of kraft paper N-flute single face sleeve with inner layer of expanded heat activatable aqueous coating and no layer of kraft paper N-flute single face sleeve with inner layer of expanded heat activatable aqueous coating arranged in vertical lines and inner layer of kraft paper N-flute single face sleeve with a full coverage inner layer of expanded heat activatable aqueous coating and inner layer of kraft paper The sleeves were applied to a 16 oz disposable cup which was filled with 190° F. water. After filling, the temperature of the outside of the cup was tested at one minute intervals for 5 minutes. The results are charted in FIG. 32.

The cups and sleeves containing the foam coatings also had higher rigidity, even at a reduced paper stock. The patterned foamed coating prevented even the 12 pt outer wrap from collapsing into the inner wall during handling. This may allow the use of lower basis weight and caliper paper board while maintaining good insulation.

Figure 27:
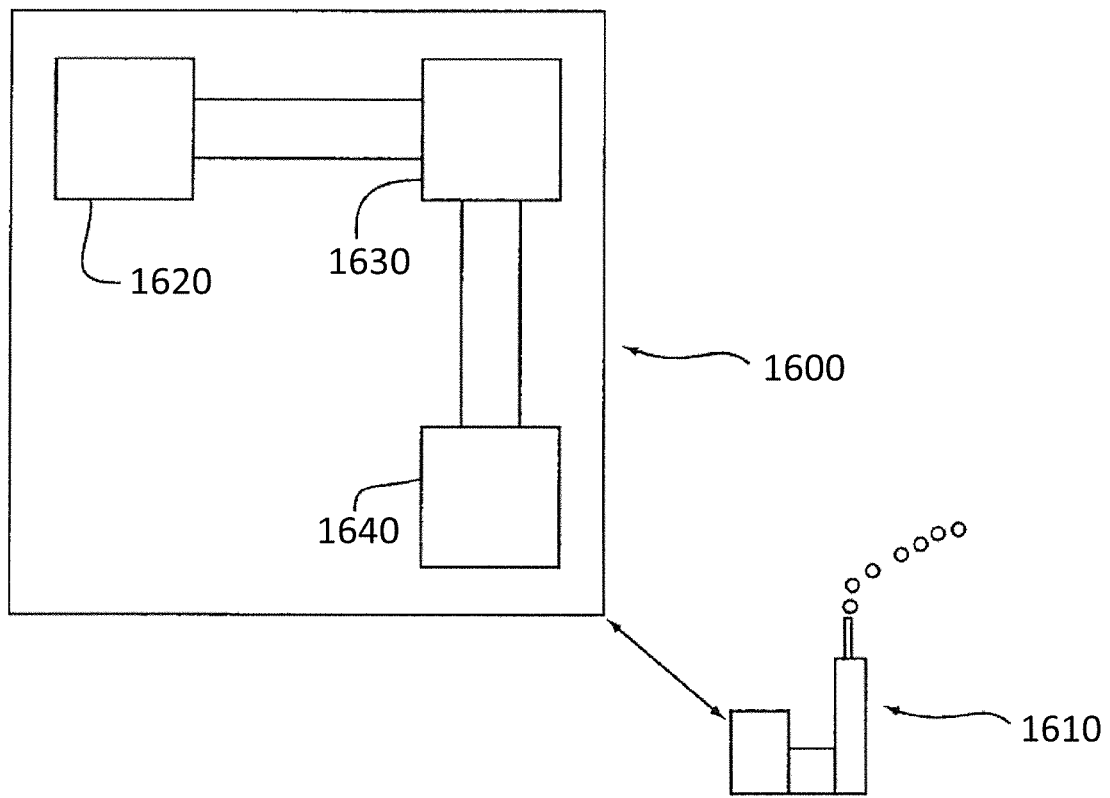
FIG. 27 is a block diagram of an exemplary process for applying an insulating material to substrates.

FIG. 27 is a block diagram of an exemplary process for applying a microparticle coating to substrates. The process may include applying a microsphere or other expandable coating to any of a substrate, die cut blank, container, sleeve, catering trays, double-wall cups, press-formed tray, soup tub and bag-in-the box containers. The process may include inline 1600 and off-line 1610 procedures. The inline procedure 1600 may include stacking stations 1620, manufacturing stations 1630, and packaging stations 1640 used for the manufacturing of the container from paper or die cut stock. The stacking, manufacturing and packaging stations may be completely automated and/or include manual stations.

Coating application processes may occur in-line 1600 or offline 1610, at the same or another facility. In-line application may include the application of the insulating material 216 at one or more of the stacking stations 1620, manufacturing stations 1630, and packaging stations 1640. The insulating material 216 may be applied in various ways, including but not limited to brushes, sponges, printing, a nozzle, spray, a slot die coater, or by lamination to an extruded sheet of coating. Any of these applications, or various combinations of them, may occur in-line 1600 or offline 1610, where the off-line process may occur before the stacking stage 1620.

Application with a brush or brushes may occur by feeding the insulating material with pressure through a tube to the brush. The brush may be manufactured from different materials such as horse hair or synthetic materials. The brush may include hollow filaments such that the insulating material is applied through the filaments. The brush may apply a swatch or pattern of the insulating material. The amount of insulating material to the brush may be controlled such that the amount of insulating material applied to the substrate may be metered. As an illustrative and not limiting example, the amount may be controlled such that a 1/64th inch layer of insulating material is applied, which may expand to 1/16 or 1/32 of an inch, or the distance of the gap between an inner and outer layer of a double-wall cup. It may be preferable that the insulating material does not deform a shape of the outer layer once expanded. The insulating material 216 may be distributed in a uniform or varying pattern. The brush may be used for broader applications, such as to coat the inside of a bag-in-the-box container.

Application with a printing press may occur by running substrates through rollers. The substrates may be roll or web form of paper stock, or alternatively in sheet form. The insulating material 216 may be press applied in spots or patterns or with full coverage, depending on an implementation.

Figure 28:
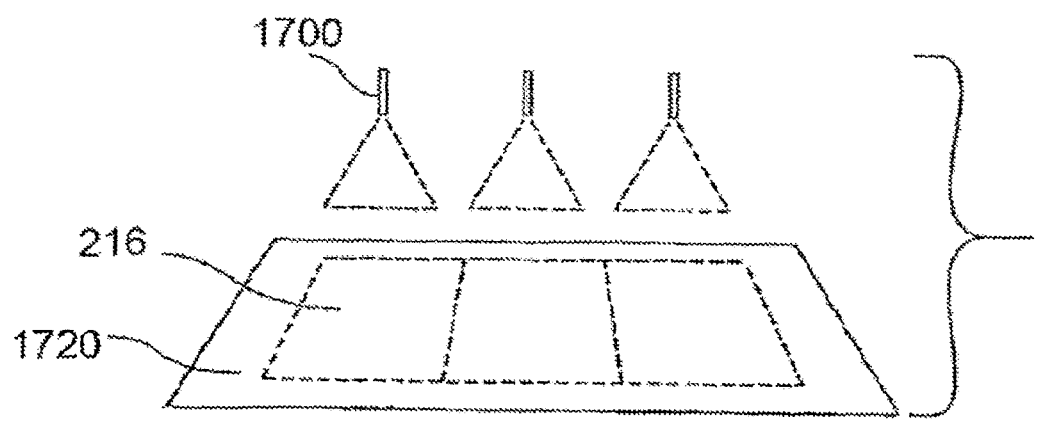
FIG. 28 is a schematic of applying an insulating material to a substrate with spray nozzles.

In FIG. 28, spray nozzles 1700 may be used to apply an insulating material 216 to a substrate 1720. The nozzles may diffuse the insulating material to apply a thin, uniform layers of the insulating material 216 on the substrate. One or more spray nozzles may be used to form continuous or interrupted patterns of the insulating material 216. The nozzles may be arranged such that the applied insulating materials 216 overlap, are side-by-side and/or are separated by a space. The spray may be metered to control a thickness of the applied insulating material 216. The nozzle may also be positioned to direct spray of the insulating material 216 onto designated portions of the substrate, such as at a corner.

Figure 29:
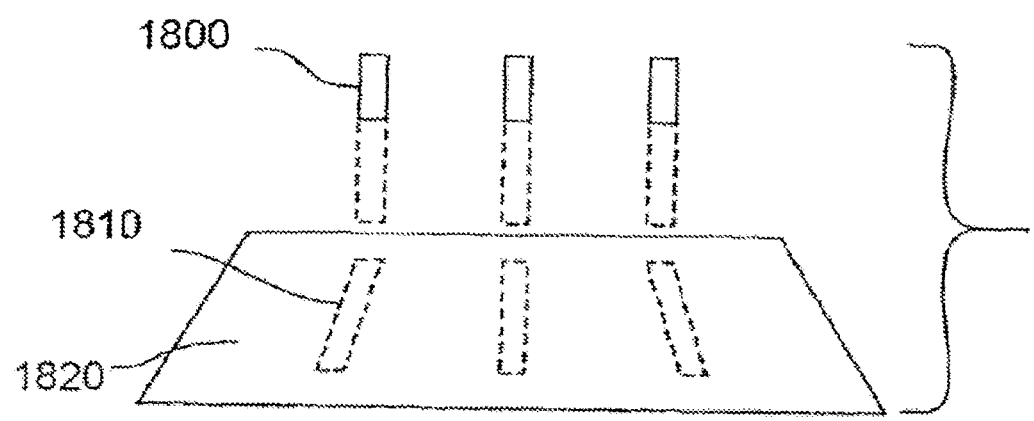
FIG. 29 is a schematic of applying an insulating material to a substrate with non-spray nozzles.

In FIG. 29, non-spray nozzles 1800 may be used to apply a stream 1810 of insulating material 216 to the substrate 1820. The stream may be metered through the nozzle to apply a precise amount. The nozzle may be sized to control a specified width and height of the stream 1810. Flow from the nozzles may be turned on and off to accommodate a specified pattern of the insulating material 216 to the substrate.

In a trough or a dip insulating material 216 application, substrates may be moved through the trough that contains insulating material 216. One or both sides of the substrate may be run through the trough. A thickness of the insulating material 216 being applied to the trough may be controlled by how long the substrate sits in the material. A temperature of the insulating material 216 and substrate may be controlled to activate or not activate the expandable insulating material 216 during the application process. A control blade may be used to meter off excess insulating material 216. The substrates may be belt fed though the through or individually held in the trough.

With any of the above application processes, and with any other process, the applied insulating material 216 may be dried or set, such as by applying or blowing cool air or warm air without activating the insulating material 216, if it is desired to expand the insulating material 216 in a later process, such as during manufacturing or at the time of consumer use. The insulating material 216 may also be expanded after manufacturing and before consumer use, such as at the stacking station. The insulating material 216 may be expanded before or after stacking the containers.

Coated or uncoated blanks may be fed to the stacking station. The insulating material 216 may be applied during in-line or off-line processing. If applied in-line, the insulating material 216 may be allowed to dry before the cups, sleeves, containers, etc. are formed, or they may be formed while the insulating material 216 is wet. Depending on the properties of the insulating material 216, it may take a couple of seconds to several minutes to dry. The insulating material 216 may be activated during the in-line manufacturing or afterwards, such as at the consumer stage. To activate the insulating material 216 in-line, any or all of infrared (IR), air, convection or conductive heating methods may be used. The insulating material 216 may take a couple of seconds to several minutes to fully expand. For example, a mandrel, which holds a container from the inside of the container, and/or a collar, which holds a cup from the outside of the container, may be used to apply heat to expand the insulating material 216 during the container manufacturing process. If a wet or partially dry insulating material 216 contacts the mandrel during process, the mandrel may be manufactured to include a non-stick material, such as TEFLON to prevent sticking or transfer of the insulating material 216 onto the mandrel. Lower activation temperatures may be preferred if the activation occurs in-line. By activating the insulating material 216, the insulating material 216 expands to form a reinforced air gap. The insulating material 216 may be partially expanded during manufacturing of the container, and then the expansion may continue to the consumption stage.

Figure 33:
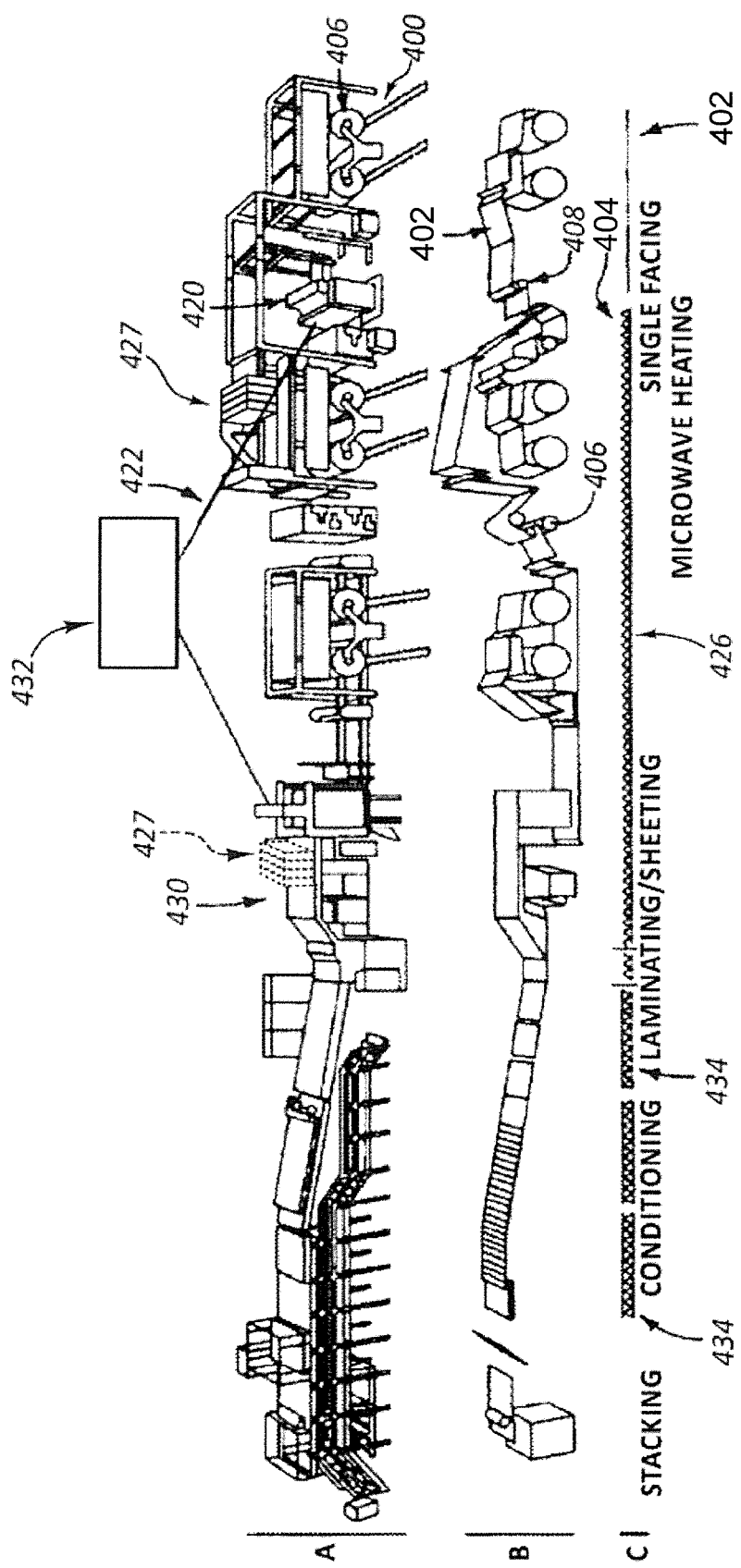
FIG. 33 is a side view of an exemplary machine system for making packaging materials and substrate for containers.

FIG. 33 is a view of an exemplary machine system 400 for manufacturing packaging substrate material that can be used later for making containers such as the container 100 discussed above. For example, but not limited to, the machine system 400 may be a conveyor-type machine system with a number of stages, such as the Asitrademicroflute lamination machine made by Asitrade AG of Grenchen, Switzerland, cited as merely one example. Other types of printer, coater and laminator can be used to make similar monolayer and multilayer substrate materials. FIG. 33 provides three parallel views of a process: a view of the machinery, A, a view of a manner in which the sheet material may travel through the machine, B, and across-section view of the resulting manufactured product, C. The machine system 400 may extend longitudinally over a considerable length and may include a number of workstations along its length. The sheet materials assembled into the packaging material or substrate travel from right to left along the machine as displayed in FIG. 33.

The machine system 400 may use a first sheet material 402 which may be provided in bulk as a roll or web. The first sheet material 402 may be fed into the machine system 400 and through the various steps of the process by a wheel-based, belt-based, or other conveyance system. FIG. 33 illustrates the use of a wheel-based system; for example, a conveyor belt (1213 in FIGS. 41-42) may be moved along by wheels 406 and a series of belts. Alternatively or additionally, as shown in FIG. 33, the machine system 400 may use sheet material, which may be pre-printed. Different machine systems may use die-cut blanks of the particular packaging, for example, blanks of cups, containers, plates, clam shells, trays, bags or beverage container holders, among others, in which case the sheet material 402 can be blanks.

The first sheet material 402 may be composed of a generally flat material having some rigidity and being capable of being bent or scored to facilitate bending along determined lines. For example, the sheet material 402 may be single-face liner paper, for example but not limited to Kraft paper, clay-coated news board, white-top liner, containerboards, solid bleached sulfate (SBS) boards or other materials. The material may be treated, such as to provide increased water or fluid resistance and may have printing on selected portions of the material. Alternatively or additionally, the sheet material 402 may be composed of paper, paperboard, recycled paper, recycled paperboard, corrugated cardboard, chipboard, plywood, metalized paper, plastic, polymer, fibers, composite, mixtures or combinations of the foregoing, or the like. The first sheet material 402 may be made of recyclable materials or may be compostable, biodegradable, or a combination of these.

The first sheet material 402 may be conveyed by a roller 408 to a first workstation 420. The first workstation 420 may be a corrugating or coating or printing station. The first workstation 420 may also include a corrugating roll. The corrugating roll may shape the first sheet material 402, or other medium paper, into a series of waves or flutes. In the alternative, a monolayer or single sheet substrate may be passed in directly, without corrugation, as the first sheet material 402 or paper medium.

The first workstation 420 may also include an applicator, which may apply a securing material to a side, i.e. to the flute top, of the first sheet material 402 or to the side of other medium paper. For example, the applicator may have a trough containing a securing material, such as an adhesive, and coating roll applicator possibly with a metering tool, like rod or roll. The trough may be stationed near the corrugating roll such that the adhesive is applied to the tips of the waves or flutes generated by the corrugating roll. Additionally or alternatively, the securing material may be applied by spraying, brushing, nozzle extrusion or otherwise. For example, an applicator may apply the securing material by spraying it onto a side of the first sheeting (or other medium paper) material 402. The spray from the applicator may be constant or intermittent and may create broken lines, stripes, dots, or ellipses of securing material. Designs and patterns may be applied by moving the applicator or by moving the first sheet material 402 relative to the sprayer.

The securing material may be, for example, an adhesive, a thermal insulating material 216, or other materials or coatings, for example, those with securing or bonding properties. Various expandable insulating materials 216 were previously discussed in detail. Furthermore, the securing material may be a hot melt or a non-hot melt adhesive or a cold set adhesive, for example a hot-melt adhesive, starch-based adhesive, natural polymer adhesive, cellulose-based adhesive, glue, hot melt glues, polymeric binders, synthetics, foams, and the like.

The securing material may be delivered to the applicator from a line 422, which may originate at a conditioning and preparation station 432. The microspheres or other expandable insulation material may be premixed with starch, a binder, or other additive material in the conditioning and preparation station 432 before delivery to the applicator of the first workstation 420.

In some embodiments, the applicator may apply a pattern of a heat-expandable coating to the first sheet material or other paper medium, referred to herein as a monolayer sheet, which is then heated by a microwave heater to cause the heat-expandable coating to expand. This coated and patterned monolayer sheet may then be sent to be processed into a final product having the patterned coating.

In still other embodiments, the first sheet material 402 may also be incorporated with a second sheet 404, for example, by pressing the second sheet material 404 to the first sheet material 402. The second sheet material 404 may be secured to the first sheet material 402 by the securing material resulting in a two-layer sheet material 426, such as single-face fluted sheeting as shown in FIG. 33, C. Alternatively or additionally, the laminated material 426 may be flat two layer laminate of different substrate material discussed earlier.

Figure 41:
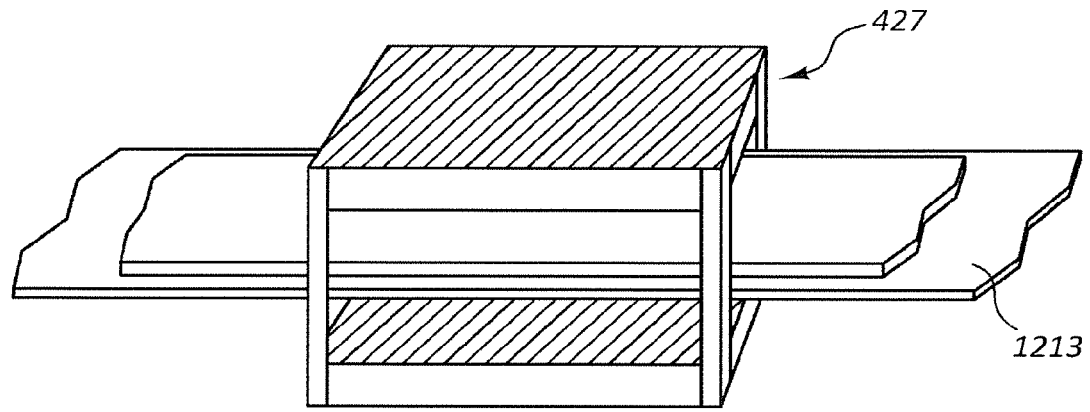
FIG. 41 is a perspective schematic view of an exemplary industrial microwave heater applicator as positioned over conveyor belts.

The two-layer sheet material 426 may then go past or through an industrial microwave heater 427, which may be built around the conveyor belt after the first workstation 420 to apply microwaves to the two-layer sheeting (FIG. 41). Moisture preferably remains within the heat-expandable insulating material 216 from the mixture prepared in the conditioning and preparation station 432. This moisture is susceptible to absorption of microwave power emanating from the microwave heater 427, and thus heats up rapidly, causing to expand the insulating material 216 of the adhesive/coating applied by the applicator under the appropriate processing conditions, e.g., temperature, pressure and time.

Figure 42:
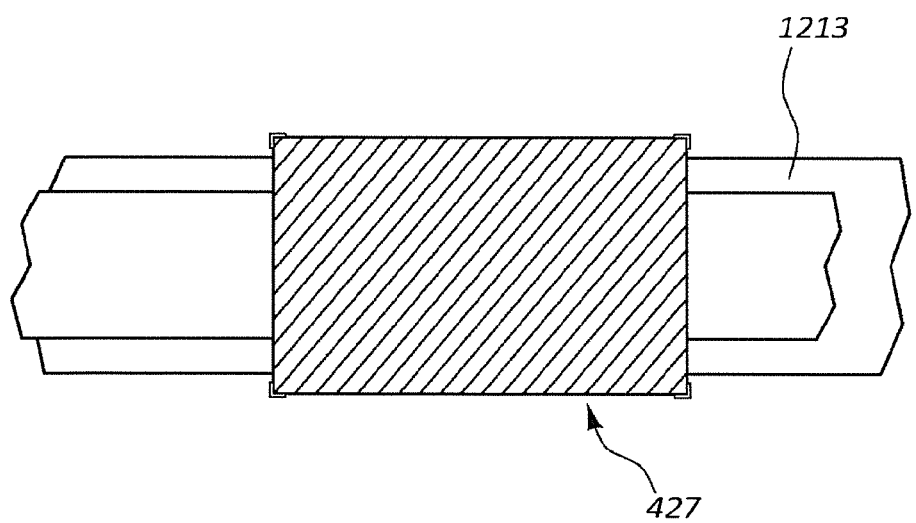
FIG. 42 is a top, plan schematic view of the microwave heater applicator of FIG. 41.

The microwave heater 427 is preferably a planar type operated at or near about 915 MHz or about 2.45 GHz, or at some other acceptable frequency. The microwave heater 427 may also be a tubular or other type of microwave heater that includes microwave applicators. These types of industrial microwave heaters may be used to dry water-containing mixtures or products, which contain polar molecules that absorb the electromagnetic energy in the microwave field, resulting in heating and drying the water, and sometimes in cooking the products. If planar, the microwave heater 427 may include a narrow, open slot in between two panels of the microwave guides or channels for a paper web or other substrate to go through, as seen in FIGS. 41-42. If the microwave heater is tubular, product with tubular or round cross section can be transported through microwave applicators of the heater in a desirable configuration. The microwave heater 427 may not only dry the paper web or substrate, but activate and expand the expandable materials pre-applied between or onto the paper layers.

The microwave heater may be designed differently or configured to heat the heat-expandable coatings and adhesives in substrate material or in products at different points during a manufacturing process, as illustrated and discussed with reference to FIG. 40.

The temperatures at which the microwave heater 427 may heat the substrate or product containing the heat-expandable materials such as microspheres may range between 100 and 500 degrees Fahrenheit. The temperature may vary greatly depending on the type of microspheres used and the thickness of the material substrate and binder being heated. For example, some commonly used microspheres are heated to temperatures ranging between 200 and 350 degrees Fahrenheit.

The two-layer material sheet 426 may exit the machine system 400 and go on to further processing such as die cutting, printing, conditioning, folding, and the like, which results in a final product. Alternatively, the two-layer sheet material 426 may be further processed by the machine system 400 as described below. Note that the microwave heater 427 may be alternatively located along stations of further processing down the machine system 400. For example, an expandable adhesive or coating may be applied at a later stage in the process, after which, at some point, the microwave heater 427 may be positioned to expand the adhesive/coating, as discussed later. The location of the microwave heater 427 is therefore not critical, but some locations may be better for ease-of-attachment to the machine system 400 parts or may be better-applied at further steps of the manufacturing and product preparation processes.

The two-layer material sheet 426 may be conveyed to a second workstation 430. The second workstation 430 may include an applicator, which may apply a securing material to a side of the two-layer sheeting 426. For example, the applicator may apply a securing material to the second sheet material 404 side of the two-layer sheeting 426, which may be the liner side of the two-layer sheeting 426. Alternatively or additionally, the applicator may apply a securing material to the first sheet material 402 side of the two-layer sheeting 426. The securing material may be or include an expandable adhesive or insulation coating. For example, the securing material may be an adhesive, for example a hot-melt adhesive starch-based adhesive, natural polymer adhesive, cellulose-based adhesive, glue, hot melt glues, cold set glues, binder, synthetics, polymeric binder, foams, and the like.

The securing material may be applied by spraying, brushing, or otherwise. For example, the applicator may have a trough containing a securing material and a metering tool. The trough may be stationed near the roll, which feeds the paper into the second workstation 430 such that the securing material is applied to the tips of the waves or flutes generated by the corrugating roll. As a second example, an applicator may apply the securing material by spraying it onto a side of the first sheeting material 402, the second sheeting material 404, or both. The spray from the applicator may be constant or intermittent and may create broken lines, stripes, dots, or ellipses of securing material. Designs and patterns may be applied by moving the applicator or by moving the first sheet material 402 relative to the sprayer.

The two-layer sheeting material 426 may be incorporated with a third sheet material 434, which may be a second liner, for example, by pressing the third sheet material 434 to the two-layer sheeting 426, creating a three-layer sheet material 434.

The three-layer sheet material 434 may be composed of a generally flat material having some rigidity and being capable of being bent or scored to facilitate bending along determined lines. For example, the three-layer sheet material 434 may be single-face liner paper, for example, but not limited to, Kraft paper. The material may be treated, such as to provide increased water or fluid resistance and may have printing on selected portions of the material. Alternatively or additionally, the third sheet material 434 may be composed of corrugated cardboard, chipboard, SBS, metalized paper, plastic, polymer, fibers, composite, mixtures or combination of the foregoing, or the like. The third sheet material 434 may be made of recyclable materials or may be compostable, biodegradable, or a combination of these.

The second workstation 430 may be a printer, coater or laminator. The layers of the multilayered sheeting, such as the three-layer sheet material 434, may improve the structural integrity and appearance of the resulting packaging material. The microwave heater 427 may alternatively be located at or near the second workstation 430 to radiate with microwave energy the multilayered sheeting passing through the second workstation 430, during lamination, for example. The microwave heater 427 may then rapidly heat, and thus expand, the adhesive or coating—that contains heat-expandable components such as microspheres—applied to the multilayered sheet as the securing material. The multilayered sheet material leaving the second workstation 430 may be further conditioned, cut or die-cut, and stacked for shipping, as will be discussed in more detail with reference to FIG. 40. The multilayered sheet material may then be formed into the container 100.

Several lab feasibility tests have been performed using a common office microwave oven and a pilot planar, industrial microwave heater. E-flute single-face corrugate board and F-flute single-wall corrugated board were used as substrates in these tests. The results from these tests confirmed the feasibility of activating and expanding the heat-expandable adhesive and coatings sandwiched between medium and liner. The tests also showed an enhancement in drying and reducing steam energy consumption. The tests also revealed that it is beneficial to design a suitable microwave energy field inside the microwave applicator to achieve optimal expansion efficiency of the heat expandable adhesives and coatings, and consequently increase line speed.

As one of the examples of the pre-activation method described earlier, FIG. 34 is a side view of a vacuum conveyor 500 through which blanks 503 may be coated with heat-expandable material in any desirable pattern. The vacuum conveyor 500 may be used independently or integrated into portions of an automated manufacturing system. The vacuum conveyor 500 may include a vacuum motor 510 that spins in the direction of desired travel of a conveyor belt 513, which direction is shown with a solid black arrow in FIG. 34.

A plain or printed blank 503 that may be a mono or multi-layer sheet material, for example, but not limited to sheet material made from the machine system 400 discussed above, may be processed through the vacuum conveyor 500. In one example, the blank 503 is for use in a cup or in a double wall cup. A glue gun (or coating or printing station) 505, or other applicator 505, may apply wet, heat-expandable, insulating material 216 containing microencapsulated particles 507. A microwave heater 427 or other source of heat energy supplies the energy to activate and expand the particles 507, causing the particles to expand into expanded particles 508. The expanded particles 508 may form a pattern on the blank 503 of a certain desirable height. The height of the expanded particles may vary to some degree.

Figure 34:
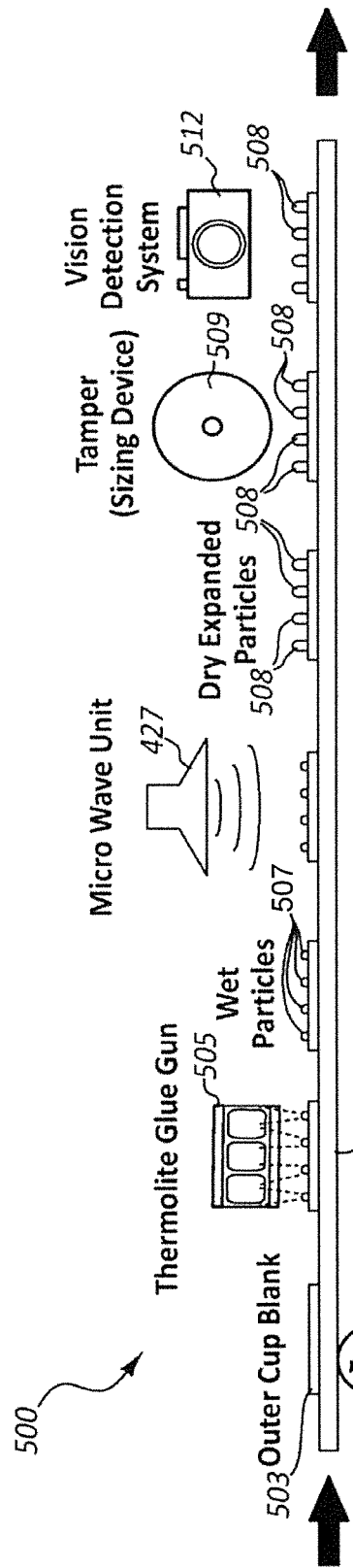
FIG. 34 is a side view of a vacuum conveyor through which blanks may be processed to which is adhered heat-expandable material.

The vacuum motor 510 of FIG. 34 may be used to help hold the blank 503 flat to allow uniform application of a proper amount of heat-expandable coating in a design pattern. In order to accomplish the proper delivery of the wet particles 507, a controller that drives the vacuum motor 510 may tightly control the RPMs of the vacuum motor. Alternatively or additionally, the glue gun or coating station 505 may be controlled in turning on and off, such as to intermittently lay down the proper amount of heat expandable material containing particles 507 in a design pattern on each respective blank.

A tamper or sizing device 509 such as a wheel, block or nip rolls may be used to tamper down the expanded particles 508 to a relatively uniform predetermined height. A vision inspection or detection system 512 may then detect the quality of the expanded particles 508, for quality control before further processing, e.g., by a double wall cup or container-building machine.

Figure 35:
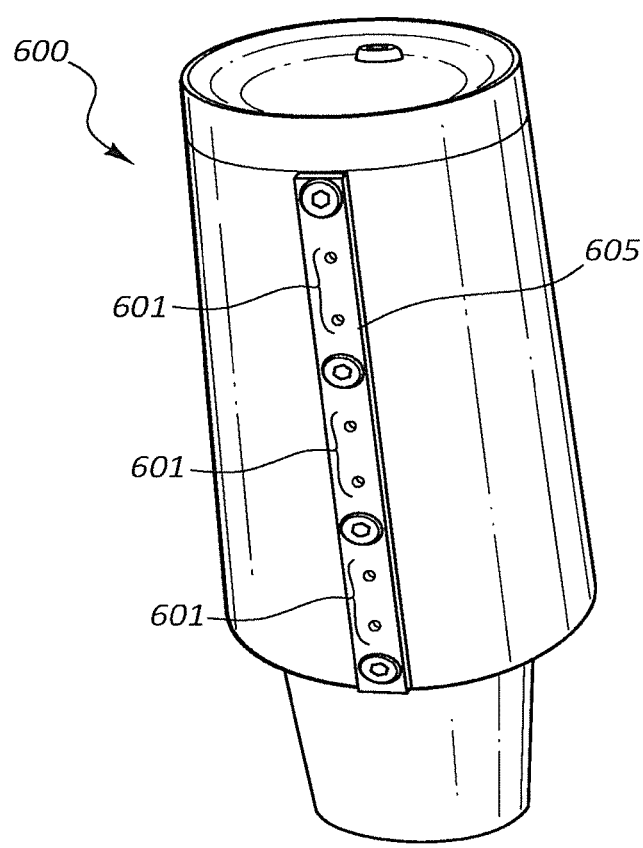
FIG. 35 is a modified mandrel adapted with a raised strip including vacuum holes.

FIG. 35 is a modified mandrel 600 adapted with one or two raised strips 605 having vacuum holes 601 in each raised strip 605 (where FIG. 35 shows only one raised strip by way of example). The raised strip 605 may be adapted at a height of approximately (or substantially) the uniform height of expanded particles 508 shown in FIG. 34. The height of the raised strip 605 is about the same as or slightly higher than the height of the expanded particles 508 to allow a smooth and proper wrap around of each blank 503 with expanded particles 508 onto the mandrel 600 to form a proper-fitting cup wrap for a double wall cup.

Figure 36:
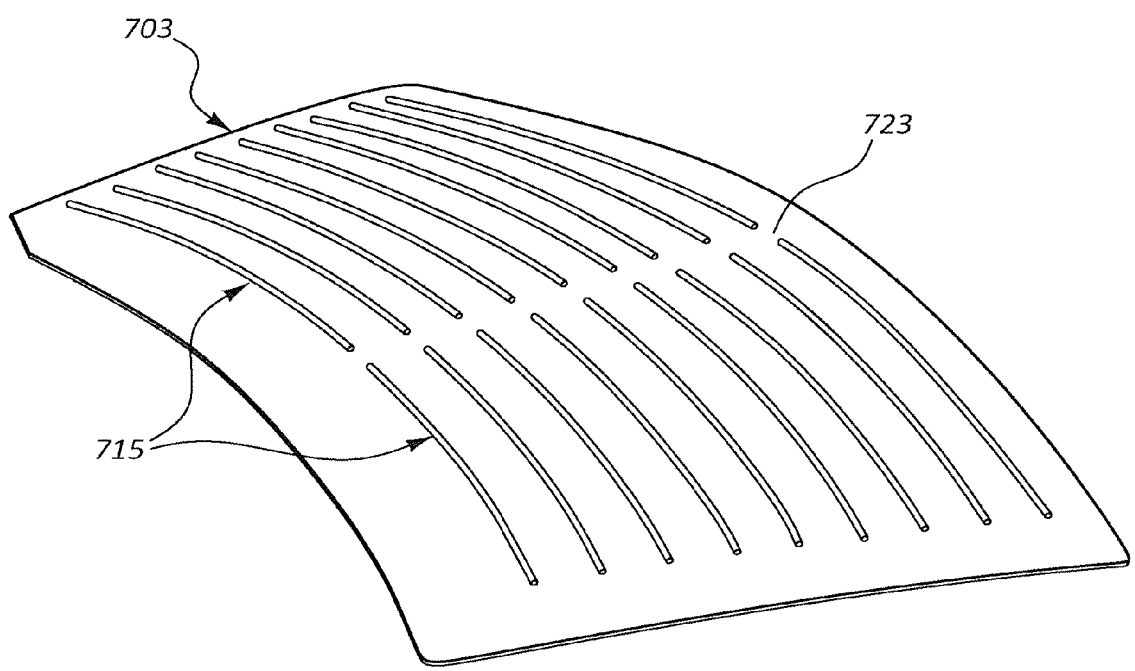
FIG. 36 is an example of an outer wall blank (or wrap) having a patterned coating of heat-expandable material having a gap into which the raised strip of the mandrel of FIG. 35 may be located.

FIG. 36 is an example of an outer wall blank 703 having a patterned coating 715 of heat-expandable, insulating material 216 having a gap 723 through which one of the raised strips 605 of the mandrel 600 may be located. In this way, the vacuum holes 601 may still create a sufficient suction on the smooth part of the inside of the blank 703 with which to hold the blank 703, which is wrapped around the mandrel to be transported. After the blank 703 is formed into an outer wrap of a cup, a single wall cup is placed inside the formed wrap in an automated process to make a double wall cup.

Figure 37:
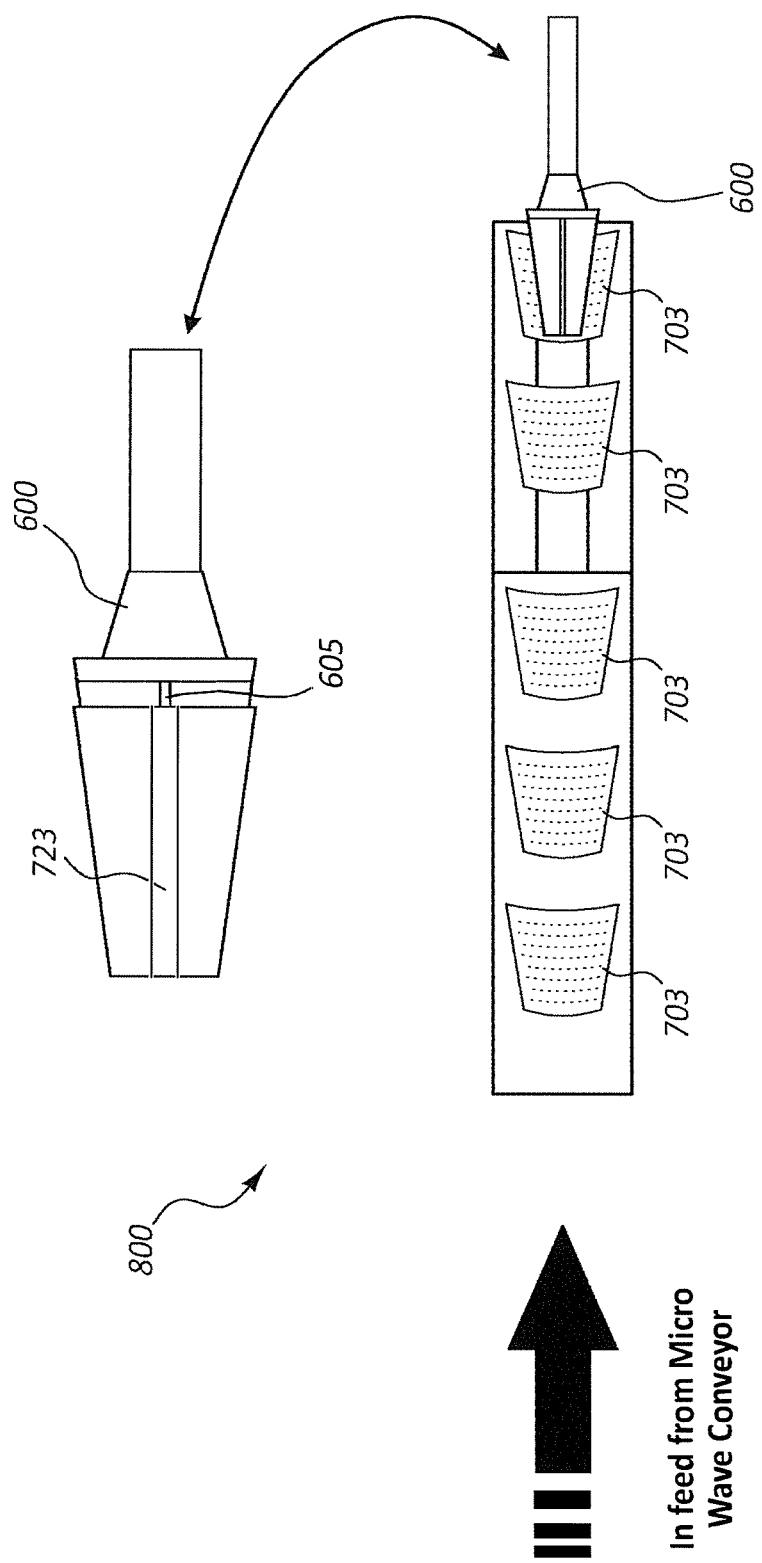
FIG. 37 is a perspective view of a vacuum tube conveyor using the mandrel of FIG. 35 to transport an outer wrap that includes heat-expanded particles on an inner side.

FIG. 37 is a perspective view of a vacuum conveyor 800 using the mandrel 600 such as that described with reference to FIG. 35 to transport a blank having heat-expanded particles adhered to an inner side of the blank. The vacuum conveyor 800 may receive the blanks 503 from the vacuum conveyor 500 of FIG. 34. The mandrel 600 may position one of its raised strips 605 within the gap 723 in the heat-expanded pattern 715 of heat-expanded particles of the blank 503 and the other raised strip 605 underneath a seam area of the wrap of the blank 503, e.g., where edges of the blank meet together to form the wrap. The vacuum holes 601 of the raised strips help holding the wrap around the mandrel 600, making it possible to remove the blank 503 from the vacuum conveyor 800 and transport the blank 503 through the cup outer wrap forming step.

In the steps taken in FIGS. 34-37, a machine assembly is made operable to build a double wall cup in a manner in which the heat-expandable, insulating material 216 on the substrate (blank 503) is first expanded before construction of the container (the double wall cup), which was previously referred to as the pre-activation method. As will now be explained, in a post-activation method, a double wall cup may also be constructed by first constructing the cup in a machine assembly process, and then later expanding the heat-expandable microspheres existing within the heat expandable material 216, to construct the insulating double wall cup.

Figure 38:
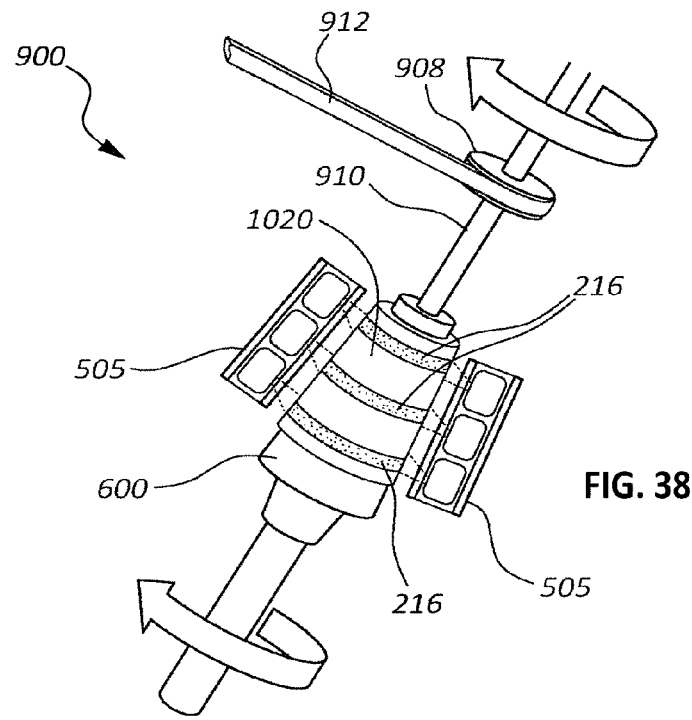
FIG. 38 is a perspective view of a cup-building machine, showing application of heat-expandable material to an outside of an inner cup.
Figure 39:
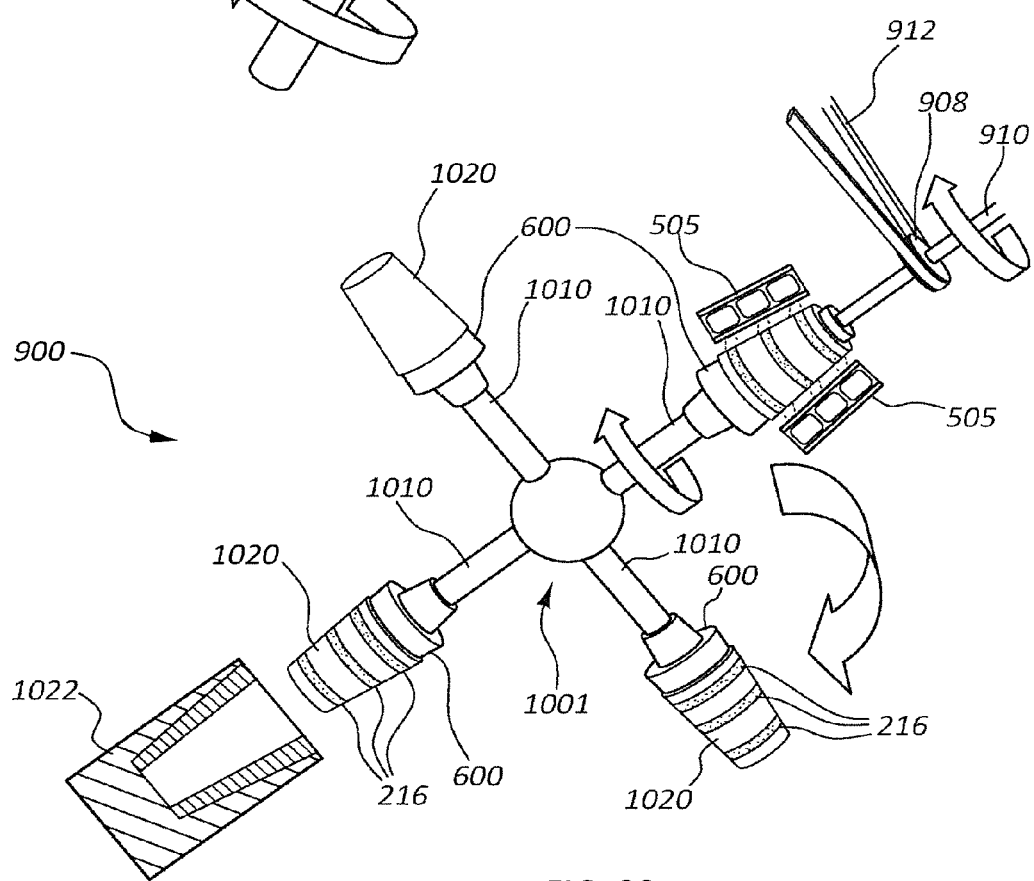
FIG. 39 is a perspective view of the cup-building machine of FIG. 38, showing insertion of the covered inner cup into an out cup blank (or wrap), to build a double wall cup.

As one non-limiting example of the many post-activation methods, FIGS. 38 and 39 show a perspective view of a cup-building machine 900. The cup-building machine 900 may include a set of glue guns 505, a pulley 908, a rod 910 and a belt 912. The machine 900 may also include a wheel 1001 operatively attached to the rod 910 and including multiple spokes 1010. The wheel 1001 may rotate in a direction tangential to the spoke 1010 while the cup on the cup mandrel 600 may spin about an axis parallel with the spokes 1010 when engaged by the rod 910. A mandrel 600 may be attached to the end of each spoke 1010. In the depicted embodiment, an inner cup 1020 of a double wall cup is prepared for adhesion to an outer wrap 1022 of the double wall cup (FIG. 39).

As the belt 912 is pulled, the pulley 908 is turned in the direction of the narrow arrow, causing the rod 910 to also be turned, which in turn rotates the inner cup 1020 on mandrel 600. As the inner cup 1020 rotates, the glue guns 505 spray the heat-expandable insulating material 216 onto the outer wall of the inner cup 1020. The material application guns or nozzles are offset to enable multiple and separate lines of insulating material 216 to be applied on the outside of the inner cup 1020 with predetermined spacing between the lines. The revolutions per minute (RPM's) of the speed at which the rod 910 turns may include a tight tolerance, e.g., the timing may be such so that the coating from the guns 505 is properly spaced and uniformly spread: not too thick, not too thin. The wheel 1001 may then be rotated to repeat on the inner cup 1020 of the next spoke, e.g., rotating clockwise (in direction of thick arrow). Each coated inner cup 1020 may then be inserted into the next outer wrap, thus forming a double wall cup.

The double walled cup that is formed may then be transported, stacked, bagged and placed in cartons that will be shipped on pallets. As will be explained with reference to FIG. 40, the microwave or other heat may be applied at the various stations after the cup has been formed to post-activate the heat expandable material 216, in addition to before the cup has been formed.

Figure 40:
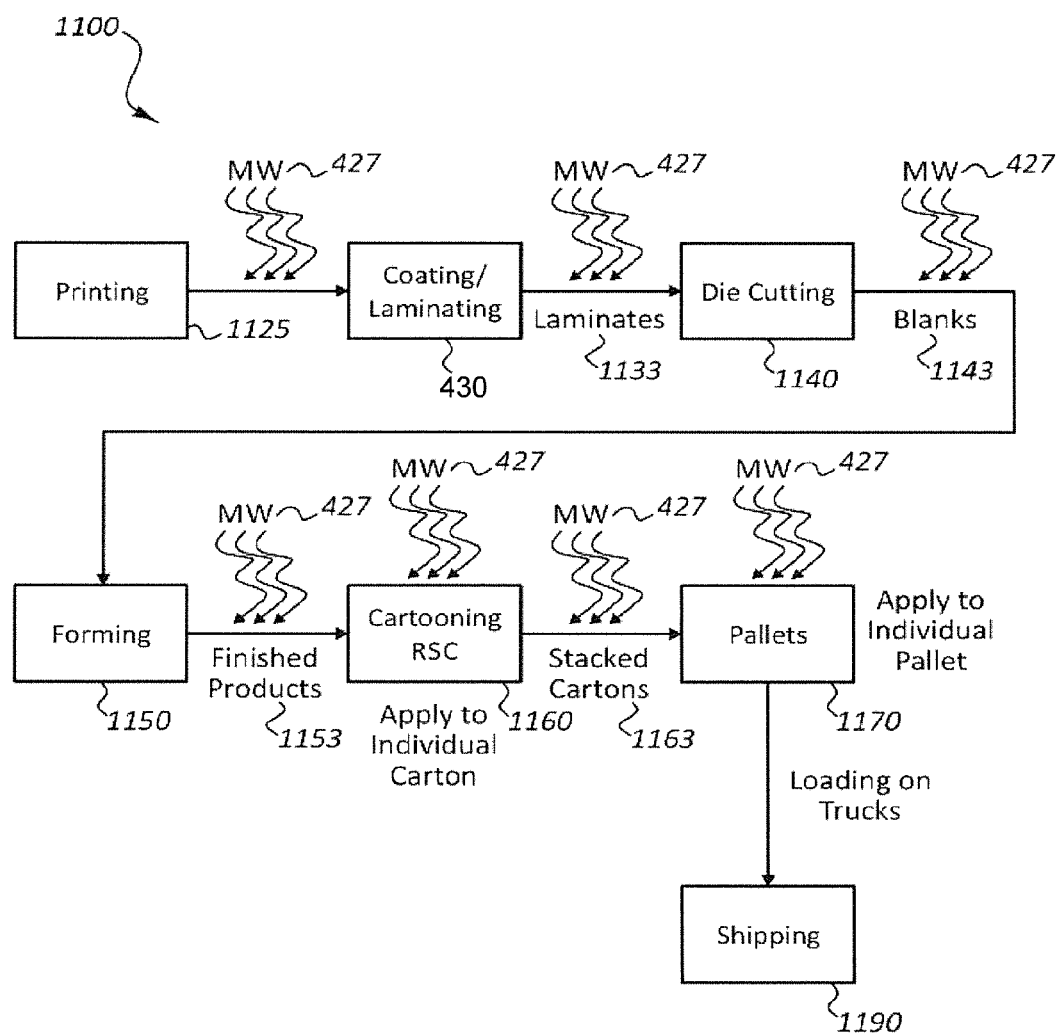
FIG. 40 is a flow diagram of multiple workstations or points of a manufacturing process for manufacturing packaging products, where microwave heat may be applied at or between these points to expand heat-expandable adhesives or coatings incorporated within or on substrate layers of packaging substrates and/or product(s).

FIG. 40 is a flow diagram 1100 of multiple workstations of the packaging product container manufacturing process at or between which microwave heat may be applied to expand heat-expandable microspheres (or other heat-expandable microparticle material) incorporated as a part of substrate layers of packaging substrates and/or containers. The manufacturing process includes the conveyance of the packaging substrates or containers between the workstations. That the workstations are numbered sequentially does not mean that an order is required, except where stated. Microwave heat may be applied to the substrate or containers at more than one workstation during the manufacturer assembly process, such that heat-expandable materials may be expanded during more than one manufacturing stage to achieve the desired final expansion of the heat-expandable materials.

In addition to the first workstation 1120, the machine system 400 may include a printing workstation 1125 configured for printing the substrate used to make containers that will be ultimately assembled for shipping. The printing ink may include heat-expandable microencapsulated microparticles. A microwave heater 427 may be used during or after printing to heat up the sheet material and the securing material to expand, at least to some extent, the microspheres or other heat-expandable compounds within the printing material.

As discussed with reference to FIG. 33, the second workstation 430 may be configured to apply a coating in any pattern or lamination to the packaging substrate material that has already been formed. The coating or laminating process may include application of additional layers of sheeting material or coating/laminating the multi-layered substrate, such as to improve the structural integrity and appearance of the resulting packaging material. A microwave heater 427 may then be used at some point thereafter to heat up the laminates 1133 formed of the sheet material and the coatings applied during lamination to expand, at least to some extent, the microspheres or other heat-expandable compounds within the coating and/or securing material.

A die cutting station 1140 may be configured to perform die cutting, either rotary die cutting, or platen die cutting or both, the result of which may include blanks 1143 that may be formed into a finished product. The blanks may include, for example, blanks 1143 of cups, containers, plates, clamshells, trays, bags or beverage container holders, among others. A microwave heater 427 may then be used to heat up the blanks to expand, at least to some extent, the microspheres or other heat-expandable compounds within any coating, lamination or securing materials of the blanks 1143, when having not yet been expanded.

A forming workstation 1150 may be configured to form finished products 1153 from the blanks 1143. A microwave heater 427 may then be used to heat up the finished products 1153 to expand, at least to some extent, the microspheres or other heat-expandable compounds within any coating, lamination or securing materials of the finished products 1153, when having not yet been expanded.

A cartoning workstation 1160 may be configured to package the finished products 1153 into a shipping carton such as a regular slotted carton. The output from the cartooning workstation 1160 includes stacked cartons 1163 packed full of the finished products 1153. A microwave heater 427 may be used to heat through the shipping cartons 1163—during the cartoning process or after they are stacked—to expand, at least to some extent, the microspheres or other heat-expandable compounds within any coating, lamination or securing materials of the finished products 1153 packed in the shipping carton 1163, when having not yet been expanded.

Where the containers are cups or container, these may be conveyed through a tube that is part of the forming workstation 1150. A microwave heater 427 may be oriented around a portion of the tube through which the cups or containers travel to heat up the heat-expandable materials, when having not yet been expanded, in route as the cups or containers are sent through the tube to be packed in cartons and palletized.

A palletizing workstation 1170 may be configured to receive the stacked cartons of product containers onto pallets. A microwave heater 427 may be used to heat up a pallet of stacked cartons or containers to expand, at least to some extent, the microspheres or other heat-expandable compounds within individual product packed in the cartons, but for an entire pallet at a time, when having not yet been expanded. The pallets may then be loaded onto trucks for shipping at a shipping workstation 1190.

Figure 43:
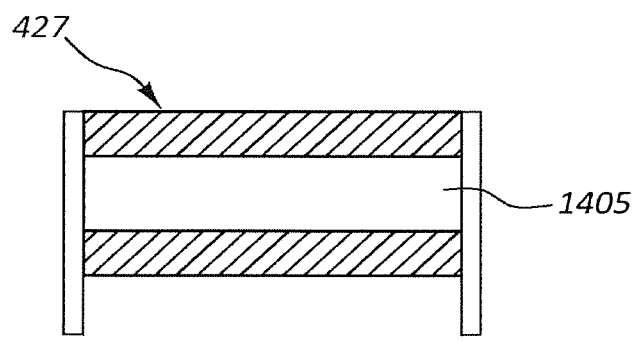
FIG. 43 is a side, plan schematic view of the industrial microwave heater applicator of FIG. 41.
Figure 44:
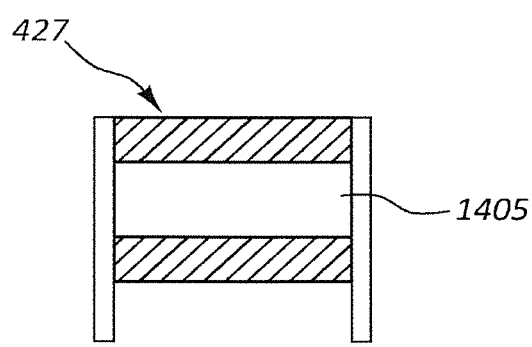
FIG. 44 is a front, cross-section schematic view of the industrial microwave heater applicator of FIG. 41.

FIGS. 41 through 44 include various schematic views of the microwave applicator guide(s) that may be used for the microwave heater 427, which may be installed around one or more conveyor belts 1213 that convey the paperboard, sheet material, or other substrate through the machine system 400. The microwave heater 427 of may be a planar type having a slot 1405 through which the web, sheet, or blank material passes. FIG. 43 shows a cross-machine side view while FIG. 44 shows a front or machine-direction view of the microwave heater 427. The microwave heater 427 may include a number of micro-waveguide channels that are connected together to provide increased surface area with which to apply microwave energy to the sheet material. The dimensions displayed in FIGS. 41 through 44 of the microwave heater 427 are but exemplary and not meant to be limiting. When tubular microwave applicator is used for 427, the cross section of the tubular applicator is generally circular, and there is an opening through the applicator to allow product to pass through.

Figure 45:
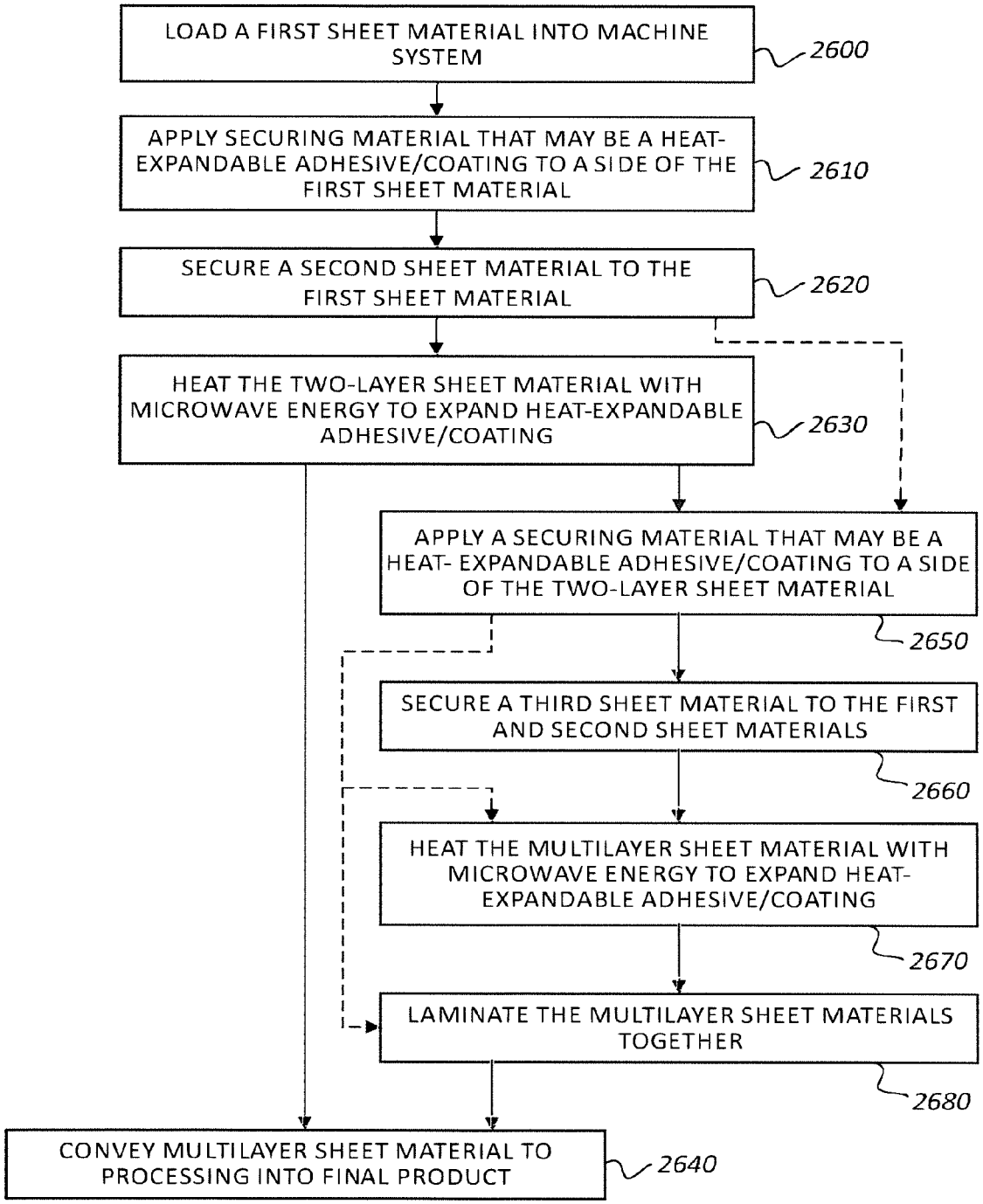
FIG. 45 is a flow chart of an exemplary method for manufacturing a multilayer sheet material in a process that includes microwave heating of the multilayer sheet material to expedite expansion of a heat-expandable adhesive or coating.

FIG. 45 is a flow chart of an exemplary method for manufacturing a multilayer sheet material in a process that includes microwave heating of the multilayer sheet material to expedite expansion of a heat-expandable adhesive or coating. The dashed lines in FIG. 17 indicate optional routes that may bypass one or more steps of the method. At block 2600, a first sheet material may be loaded into the machine system 400 and may be corrugated. At block 2610, a securing material may be applied to a side of the first sheet material. The securing material may be a heat-expandable adhesive or coating, which may include a starch and microspheres or some other composition. At block 2620, a second sheet material may be applied to the first sheet material. If this two-layer sheet material has a securing material that includes the heat-expandable coating, the two-layer sheet material may be heated at block 2630 with microwave energy to expand the heat-expandable adhesive/coating. At block 2640, the two-layer sheet material may be conveyed to processing into a final product, such as by printing, die cutting, removing from blanks, and/or being assembled.

At block 2650, a second securing material may be applied to a side of the two-layer sheet material. The second securing material may be a heat-expandable adhesive or coating, which may include starch and microspheres and/or some other adequate composition. Following this step, the multilayer sheet material may skip forward certain steps and get heated and/or laminated without first having a third sheet material applied. Otherwise, at block 2660, a third sheet material may be applied to an exposed side of the first or second sheet materials. At block 2670, if the second securing material is a heat-expandable adhesive or coating, the multilayer sheet material may be heated with microwave energy to expand the heat-expandable adhesive or coating. At block 2680, the multilayer sheet material may be laminated. That is, if the first, second, and third sheet materials have been applied together, then the first, second and third sheet materials may be laminated together at block 2680. At block 2640, the multilayer sheet material or substrate may then be processed into a final product, which may include printing, die cutting, being removed from blanks, and/or being assembled. In addition, or alternatively, microwaves may be applied to the multilayer sheet material or substrate at any of these various stages (or workstations), including but not limited to: printing, coating and/or laminating, die cutting, forming, cartoning RSC and preparing pallets of cartons or containers for shipment.

For example, the resulting multilayer sheet material may be further processed such as by application—and subsequent removal of—packaging blanks from the sheet material and assembly of the blanks into the final product (block 2640). The final product of the process (which may be, e.g., a cup, container holder, containers sleeve, clamshell, tray, and the like) may be made of one or more layers of one or more of the aforementioned materials. Where multiple layers of material are used, they may be joined such as, but not limited to, being laminated, glued, or otherwise fastened together for increased strength.

As mentioned, use of the insulating material 216 may help to reduce the thickness of substrate, such as paper, needed to make the container, sleeves, etc., while maintaining bulk of the laminated substrate and provide a more rigid feel to the consumer. The insulating material 216 may also improve insulation properties of the container, and to help keep the beverages or foods warm or cold longer, depending on the application. The substrates may be made of natural fibers, synthetic or both, such as natural or bleached paper, natural or bleached paperboard or boxboard with or without recycled fibers. In combination, the features and processes disclosed herein add significant flexibility and versatility to the conventional converting processes and broaden choices available to packaging converters to address any limitation of substrate supply in the supply chain. For example, laminates of two thin liner papers may be used to make a bulkier paper with an expanded adhesive between the thin papers with the same or better thermal insulation as a thicker paperboard. Hot sandwich wraps could be made of such a material, which can be more flexible than paperboard. As an additional example, laminates may be manufactured of a low gauge poly coated SBS board and a clay coated news board with the expandable adhesives therebetween. As an additional example, drinking cups for hot or cold fluids may be manufactured to include a laminate of two different low gauge boards with the expandable adhesives therebetween. The expandable adhesives can be activated during lamination, before or after the cup is formed. The expandable adhesive can also be applied in pattern to achieve localized expansion and therefore localized rigidity and insulation improvement. A sleeve materials, such as liner and medium, may be produced of 15 LB/3000 $ft^2$ to 100 LB/3000 $ft^2$ material, and preferably 18 LB/3000 $ft^2$ to 50 LB/3000 $ft^2$. The caliper of the paper substrate for hot or cold cups, soup tub, press-formed container and other non-corrugated containers may range from 9 point to 24 point, and preferably 10 point to 24 point, where a point is equal to $1/1000$ inch.

While various embodiments of the invention have been described, it will be apparent to those of ordinary skill in the art that many more embodiments and implementations are possible that are within the scope of the invention. For example, steps of a method as displayed in the figures or reflected in the below claims do require a specific order of execution by the way they are presented, unless specified. The disclosed steps are listed as exemplary such that additional or different steps may be executed or the steps may be executed in a different order.

What is claimed is:

1. A method of making insulated packaging, the method comprising:
   applying a thermally expandable material to at least one of a first substrate and a second substrate for being disposed therebetween, the expandable material comprising microspheres;
   applying an adhesive material different than the expandable material to at least one of the first substrate and the second substrate for being disposed therebetween at locations where the adhesive material does not overlap the thermally expandable material;
   attaching the first substrate to the second substrate with the adhesive material therebetween; and
   expanding the expandable material by expanding the microspheres thereof.

2. The method of claim 1 wherein the first substrate and the second substrate are comprised of paper stock material.

3. The method of claim 2 including providing the first and second substrates in roll or web form.

4. The method of claim 3 wherein the paper stock is flexible for being provided in roll or web form.

5. The method of claim 2 wherein the paper stock material of the first substrate is different from the paper stock material of the second substrate.

6. The method of claim 1 wherein applying the adhesive material comprises applying the adhesive material to the at least one of the first substrate and the second substrate in at least two sections such that at least a portion of the thermally expandable material is positioned between the two sections of adhesive material on the at least one of the first substrate and the second substrate.

7. The method of claim 6 wherein applying the adhesive material in at least two sections includes applying the adhesive material in two substantially linear sections with at least a portion of the thermally expandable material positioned between the two substantially linear sections of adhesive material.

8. The method of claim 1 wherein the expandable material is applied before forming of the insulated packaging.

9. The method of claim 1 wherein the expandable material is applied during forming of the insulated packaging.

10. The method of claim 1 wherein the expandable material is expanded during forming of the insulated packaging.

11. The method of claim 1 wherein the expandable material is expanded after forming of the insulated packaging.

12. The method of claim 1 wherein the expandable material engages both the first substrate and the second substrate, and the expandable microspheres have an activation temperature not exceeding 190° F.

13. The method of claim 1 wherein the adhesive material is a hot melt adhesive.

14. The method of claim 1 further comprising forming an insulated bag using the attached first and second substrates having the expandable material and the different adhesive material therebetween.

15. The method of claim 1 including feeding the first and second substrates into a conveyor-type machine system in which the thermally expandable material is applied to the at least one of the first substrate and the second substrate.

16. The method of claim 1 wherein after the expandable material is expanded, non-ruptured, expanded microspheres are disposed between the attached first and second substrates.

17. The method of claim 1 wherein attaching the first substrate to the second substrate with the adhesive material comprises engaging both the first substrate and the second substrate with the adhesive material.

18. The method of claim 1 wherein the first substrate comprises one or more of paperboard, paper, foil, film, fabric, foam, and plastic and the second substrate comprises one or more of paperboard, paper, foil, film, fabric, foam, and plastic.

19. The method of claim 1 wherein applying the adhesive material at locations where the adhesive material does not overlap the thermally expandable material includes applying at least a portion of the adhesive material to a location spaced apart from the thermally expandable material.

* * * * *